United States Patent
Uchiyama et al.

(10) Patent No.: US 8,807,762 B2
(45) Date of Patent: Aug. 19, 2014

(54) PROJECTOR

(75) Inventors: Takayuki Uchiyama, Yokohama (JP); Nobuhiro Fujinawa, Yokohama (JP); Erika Koishi, Yokohama (JP); Akira Ohmura, Tokyo (JP); Takayuki Suga, Tokyo (JP)

(73) Assignee: Nikon Corporation, Tokyo (JP)

( * ) Notice: Subject to any disclaimer, the term of this patent is extended or adjusted under 35 U.S.C. 154(b) by 743 days.

(21) Appl. No.: 12/812,459

(22) PCT Filed: Jan. 9, 2009

(86) PCT No.: PCT/JP2009/050241
§ 371 (c)(1),
(2), (4) Date: Oct. 12, 2010

(87) PCT Pub. No.: WO2009/088080
PCT Pub. Date: Jul. 16, 2009

(65) Prior Publication Data
US 2011/0018897 A1 Jan. 27, 2011

(30) Foreign Application Priority Data

Jan. 11, 2008 (JP) ................................. 2008-004218
Jan. 11, 2008 (JP) ................................. 2008-004219
Jan. 11, 2008 (JP) ................................. 2008-004221
Jan. 11, 2008 (JP) ............................... 2008-0042220

(51) Int. Cl.
*G03B 21/00* (2006.01)
*G03B 21/14* (2006.01)
*G06K 9/00* (2006.01)
*G09G 5/02* (2006.01)

(52) U.S. Cl.
USPC .............. 353/69; 353/121; 382/108; 345/589

(58) Field of Classification Search
USPC ................. 353/29, 30, 312, 69, 121, 122, 31; 382/108; 345/77, 581, 589; 348/745, 348/747; 356/402
See application file for complete search history.

(56) References Cited

U.S. PATENT DOCUMENTS 7,475,995 B2 * 1/2009 Matsumoto et al. ............ 353/69
2003/0164927 A1 * 9/2003 Tsukada .......................... 353/31

(Continued)

FOREIGN PATENT DOCUMENTS

JP 04-053374 A 12/1992
JP 05-093953 A 4/1993

(Continued)

OTHER PUBLICATIONS

Office Action (Notification of Reason(s) for Refusal issued Oct. 30, 2012, in Japanese Patent Application 2008-004220 (with English Translation).

(Continued)

*Primary Examiner* — William C Dowling
*Assistant Examiner* — Ryan Howard
(74) *Attorney, Agent, or Firm* — Miles & Stockbridge P.C.

(57) ABSTRACT

A projector includes: an image forming unit that forms a projection image; a detection unit that detects a condition at a projection surface onto which the projection image is projected; a correction unit that corrects a source image based upon the condition at the projection surface to obtain the projection image; and a projection unit that projects the projection image.

10 Claims, 34 Drawing Sheets

(56) References Cited

U.S. PATENT DOCUMENTS

Figure 1:
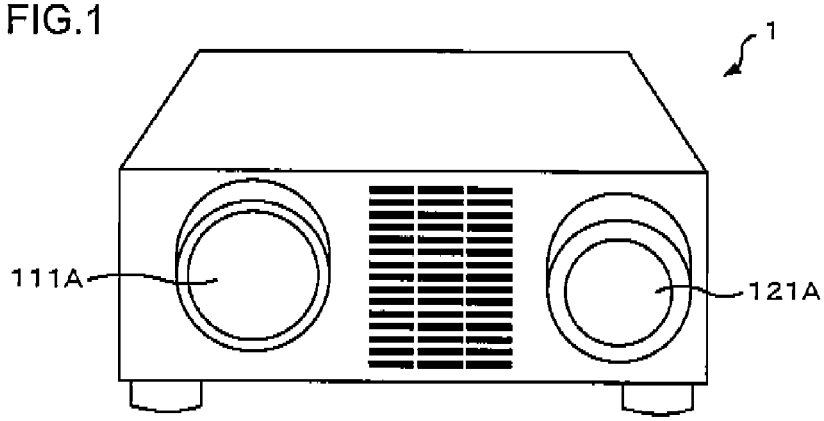

| 2005/0103976 | A1 | 5/2005 | Loka et al. | |
|---|---|---|---|---|
| 2005/0162619 | A1 | 7/2005 | Hamaya | |
| 2007/0115435 | A1* | 5/2007 | Rosendaal | 353/30 |
| 2008/0100806 | A1* | 5/2008 | Inazumi | 353/31 |

FOREIGN PATENT DOCUMENTS

| JP | 2004-032207 A | 1/2004 |
|---|---|---|
| JP | 2004-158941 A | 6/2004 |
| JP | 2004-222180 A | 8/2004 |
| JP | 2005-010353 A | 1/2005 |
| JP | 2005-148381 A | 6/2005 |
| JP | 2005-151310 A | 6/2005 |
| JP | 2005-236528 A | 9/2005 |
| JP | 2006-084991 A | 3/2006 |
| JP | 2006-287294 A | 10/2006 |
| JP | 2007-208698 A | 8/2007 |
| JP | 2007-235470 A | 9/2007 |
| JP | 2007-304284 A | 11/2007 |
| JP | 2007-322671 A | 12/2007 |

OTHER PUBLICATIONS

Office Action (Notification of Reason(s) for Refusal) issued Oct. 30, 2012, in Japanese Patent Application No. 2008-004221 (with English translation).

Office Action issued Jun. 18, 2013, in Japanese Patent Application No. 2009-004735.

* cited by examiner

FIG.4
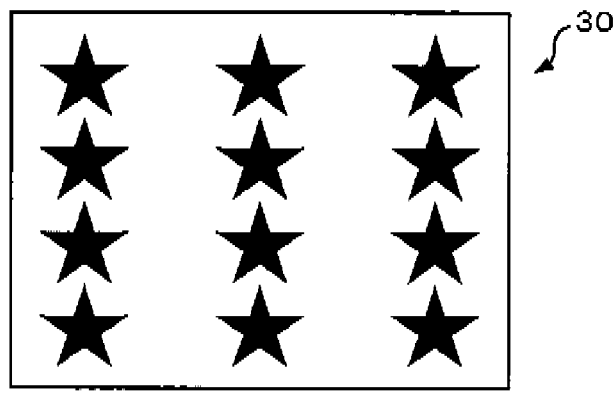
(a)
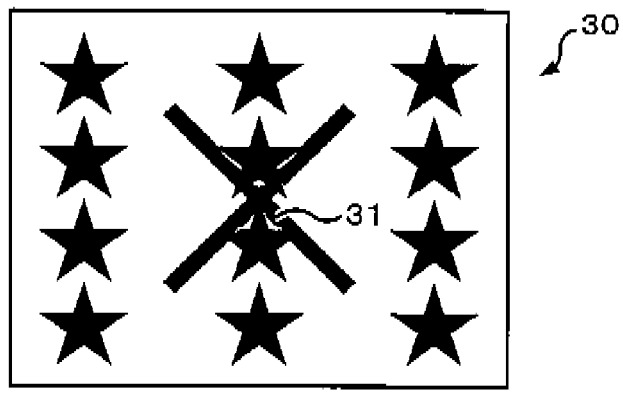
(b)
(c)

FIG.12
(a)
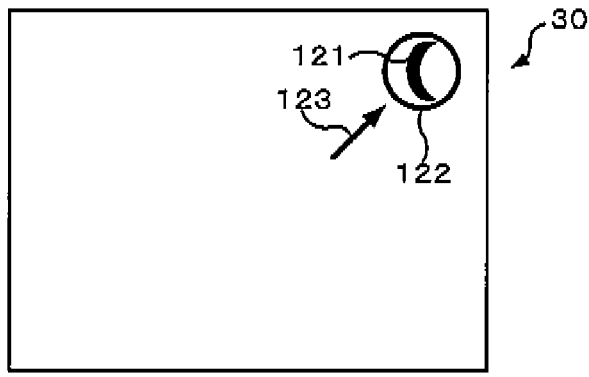
(b)
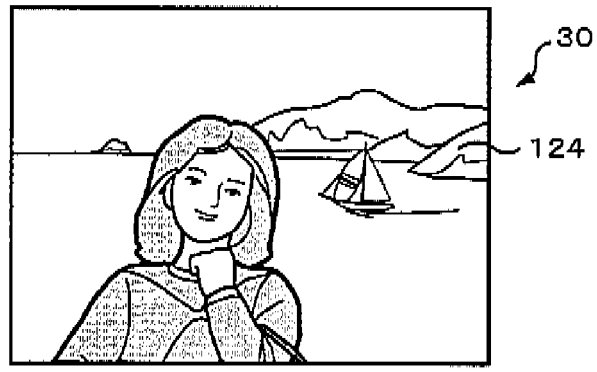
(c)
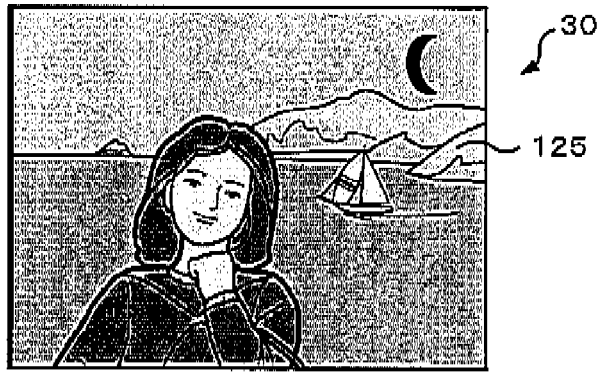

FIG.14 (a)
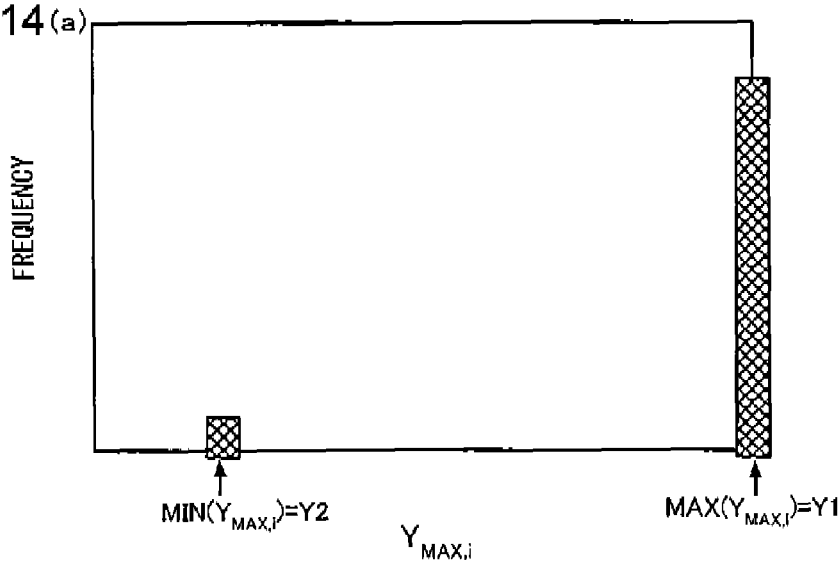
(b)
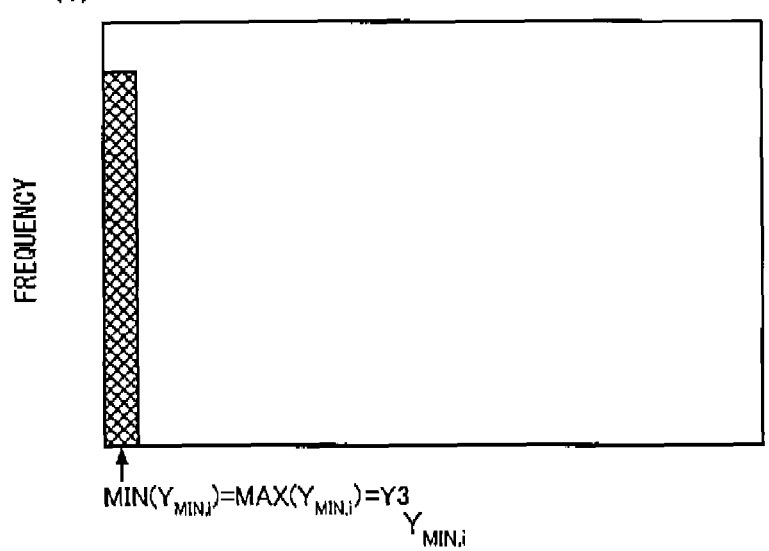
(c)
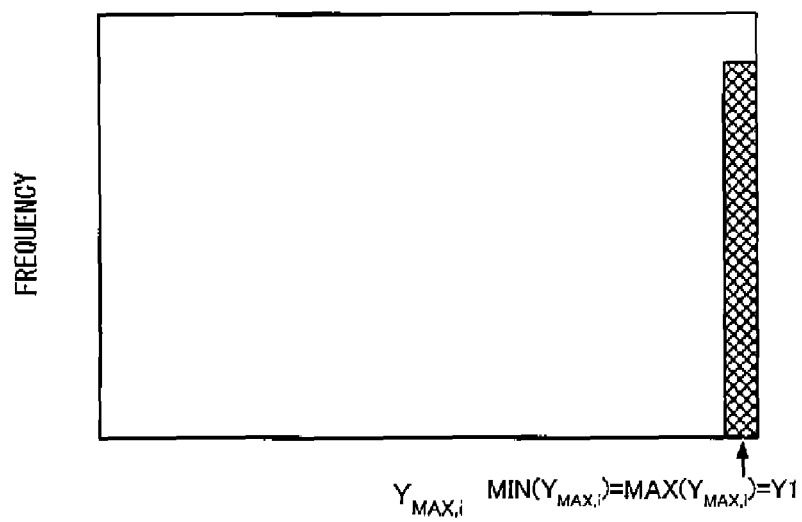

FIG.15
(a)
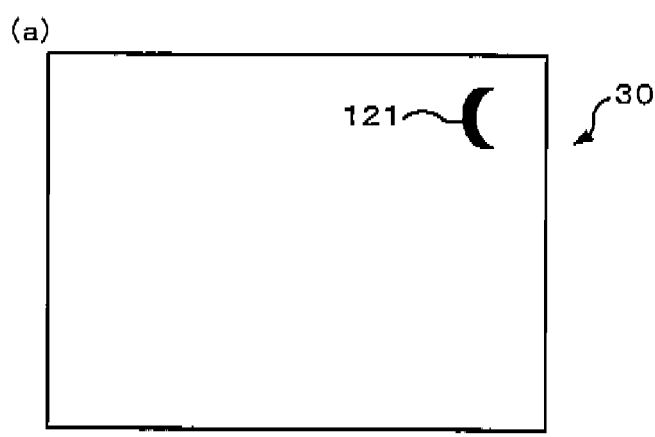
(b)
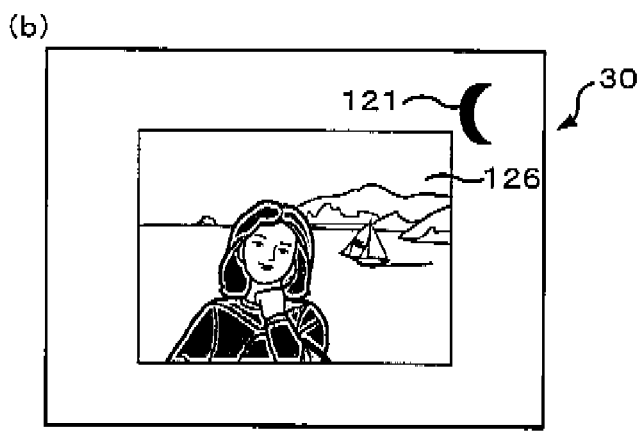

FIG.17
(a)
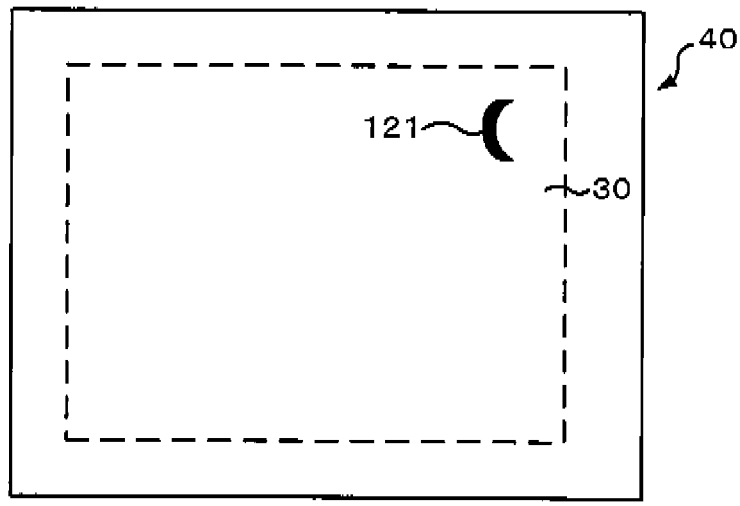
(b)
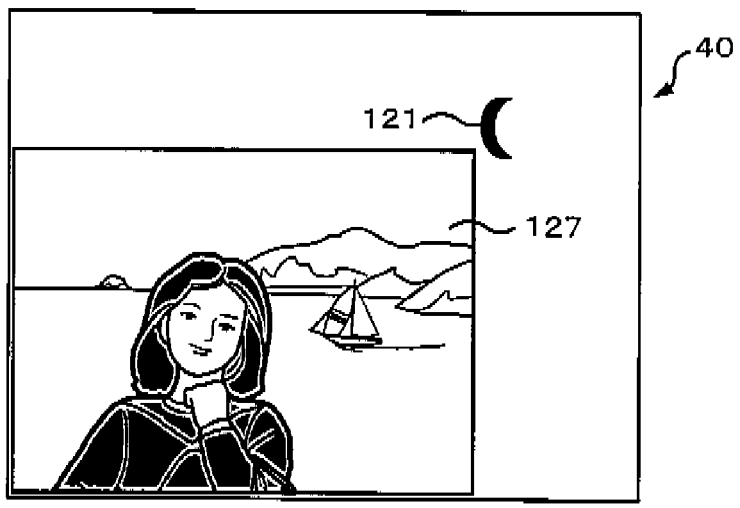

FIG.23
(a)
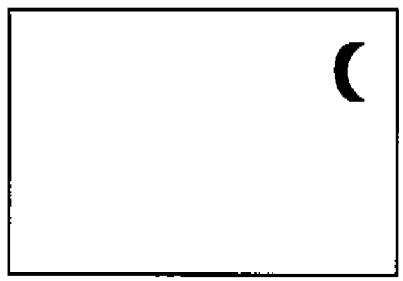
(b)
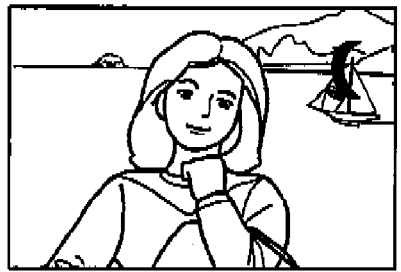
(c)
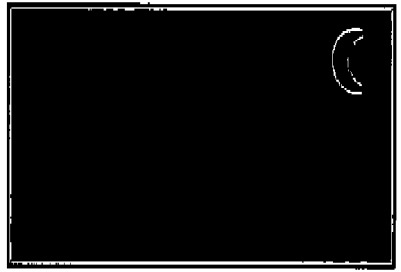
(d)
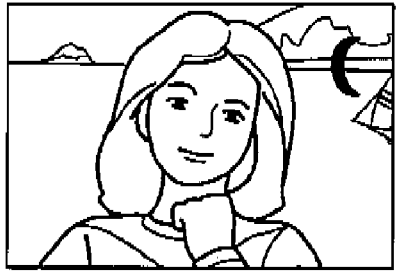
(e)
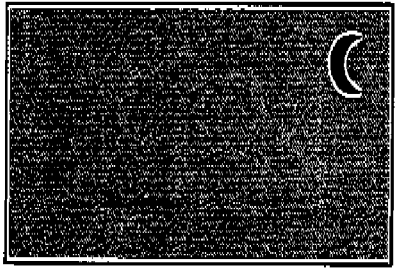
(f)
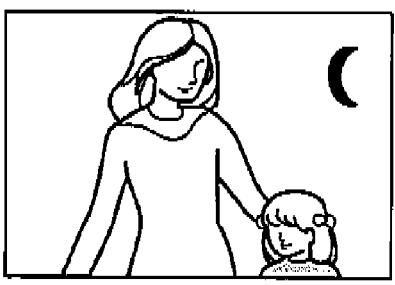
(g)
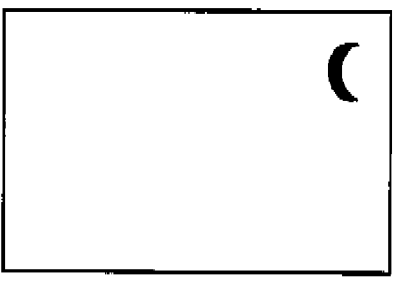
(h)
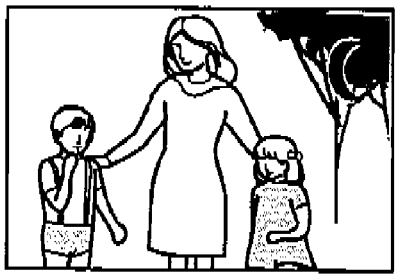
(i)
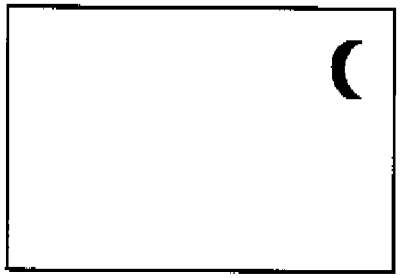
(j)
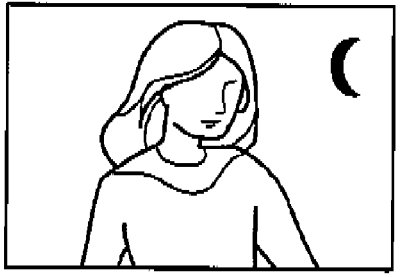

FIG.27
(a)
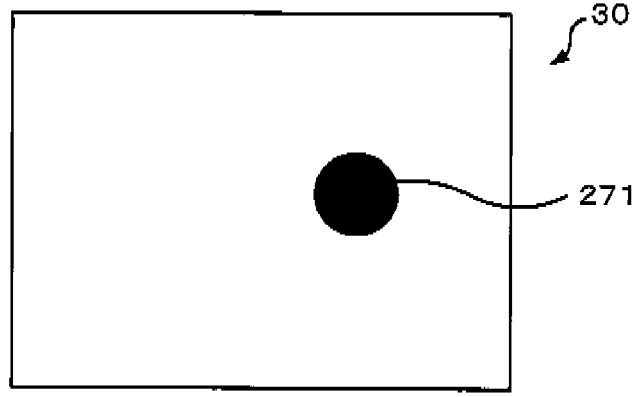
(b)

FIG.28
(a)
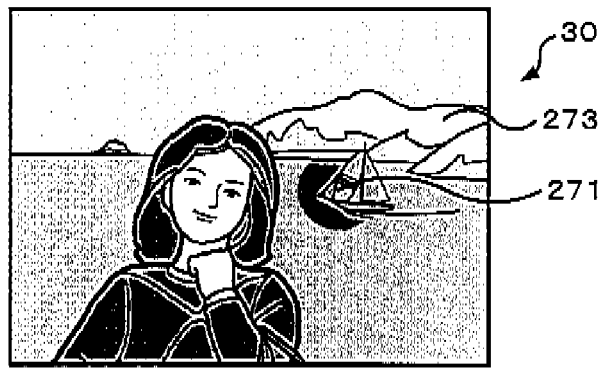
(b)
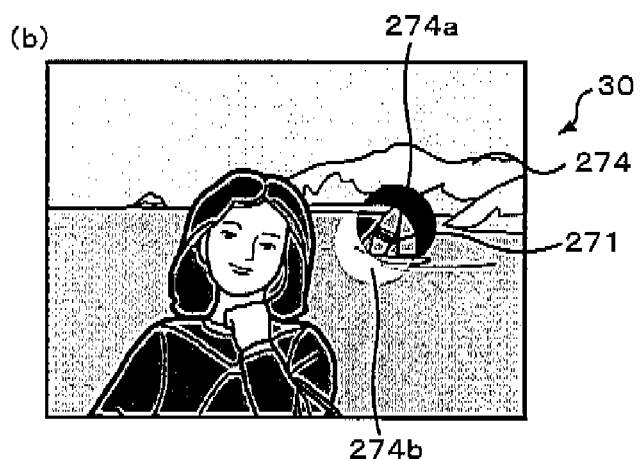
(c)
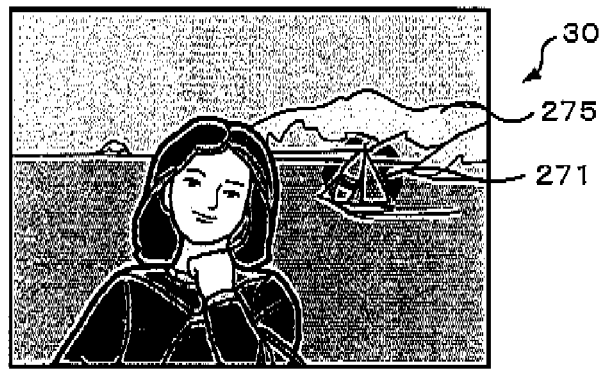

FIG.32
(a)
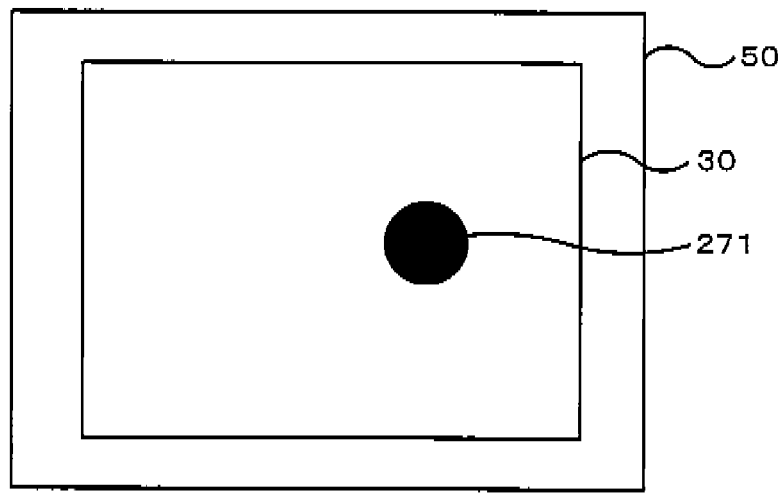
(b)
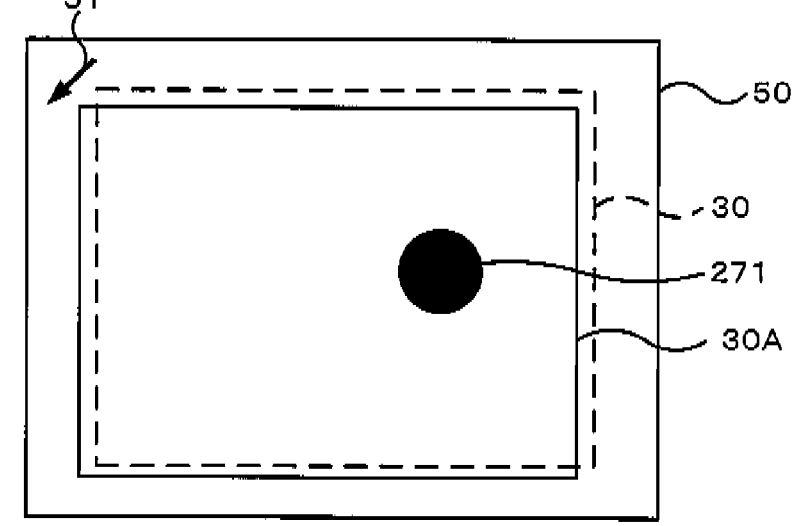

FIG. 33
(a)
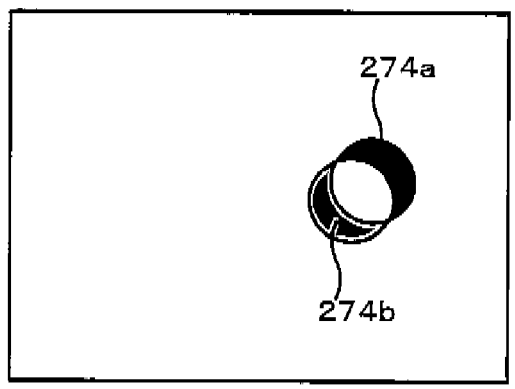
(b)
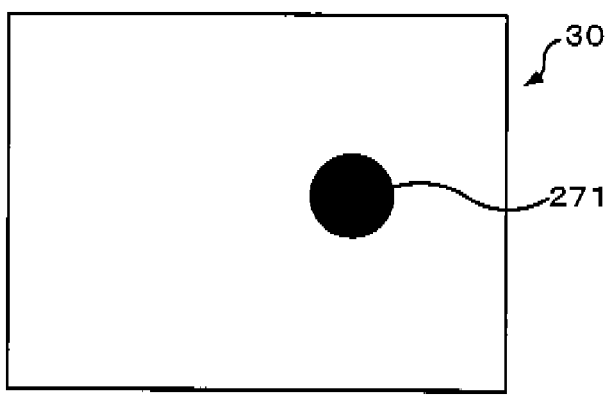
(c)
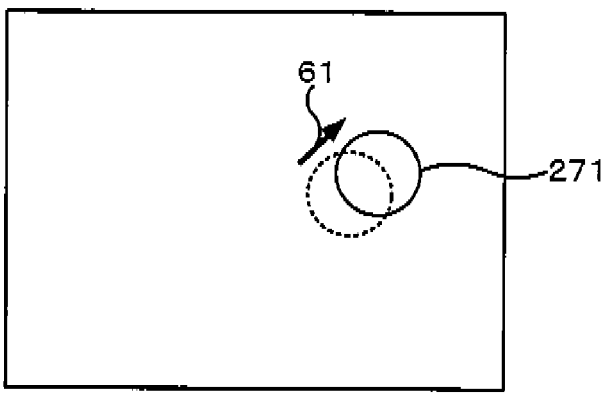

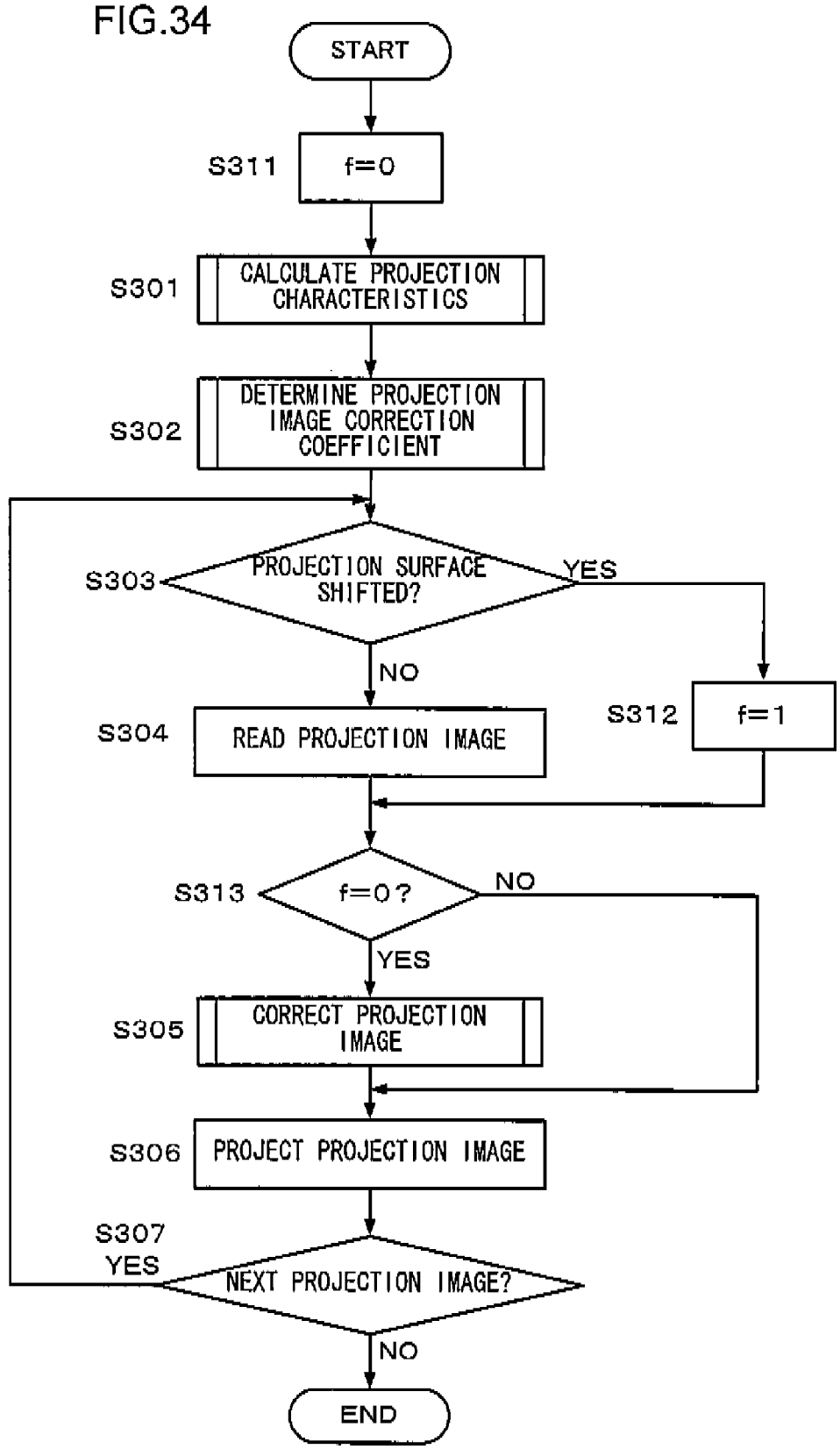

PROJECTOR

TECHNICAL FIELD

The present invention relates to a projector.

BACKGROUND ART

An image may be projected via a projector onto a patterned projection surface or a projection surface with uneven reflectance. In addition, the illumination provided through the projector itself may be uneven or the projection image may be affected by the illumination conditions in the surrounding environment to a significant extent. Under such circumstances, the pattern or the uneven reflectance at the projection surface will be superimposed over the projection image and thus, the projection image cannot be displayed with good fidelity. Patent literature 1 discloses a technology whereby the projection surface onto which a specific projection image is projected is photographed and a projection image is corrected to ensure that the dynamic range of the projection image is set between the maximum value among the smallest brightness values indicated at various pixels of the photographic image within the projection surface and the minimum value among the largest brightness values indicated at the various pixels of the photographic image within the projection surface, so as to cancel out the influence of the pattern and the like and allow the projection image to be displayed with fidelity.

Patent reference 1: Japanese Laid Open Patent Publication No. 2004-158941

DISCLOSURE OF THE INVENTION

Problems to be Solved by the Invention

An image projected onto a surface that is not well suitable for projection is bound to be of inferior quality. However, the user is not able to estimate in advance whether or not a projection surface will be optimal for image projection. If the projection surface includes an extremely dark (an area having a low level of brightness) or an area with a high level of chroma (or color saturation), the dynamic range of the overall projection image resulting from the correction will be extremely narrow due to the presence of such an area and the corrected projection image quality will become poor. In addition, the projection operation cannot be started immediately, since a correction coefficient, to be used to correct the projection image, must first be calculated, which requires a significant length of time. Furthermore, if the projector shifts for any reason during the projection operation, the projection image will be projected onto a projection surface different from the projection surface having been photographed for purposes of projection image correction. In such a case, the adverse effect of the pattern at the projection surface or the like cannot be cancelled from the corrected projection image.

Means for Solving the Problems

According to the 1st aspect of the present invention, a projector comprises: an image forming unit that forms a projection image; a detection unit that detects a condition at a projection surface onto which the projection image is projected; a correction unit that corrects a source image based upon the condition at the projection surface to obtain the projection image; and a projection unit that projects the projection image.

According to the 2nd aspect of the present invention, a projector comprises: a projection unit that projects a projection image; a detection unit that detects a condition at a projection surface by using a photographic image of the projection surface upon which a specific projection image is projected via the projection unit; a decision-making unit that makes a decision based upon the condition at the projection surface as to whether or not the projection surface is suitable for projection; and a decision-making result reporting unit that reports results of the decision made by the decision-making unit to a user.

According to the 3rd aspect of the present invention, in the projector according to the 2nd aspect, it is preferred that the decision-making unit extracts pixels indicating brightness values smaller than a product obtained by multiplying a largest brightness value in the photographic image by a predetermined minimum reflectance, among pixels constituting the photographic image, and determines that the projection surface is suitable for projection if a ratio of the extracted pixels to the pixels constituting the photographic image is less than a predetermined ratio.

According to the 4th aspect of the present invention, in the projector according to the 2nd aspect, it is preferred that, based upon a reflectance threshold value $R_i$ ($i=1, 2, \ldots N$) assuming a plurality of predetermined values and a pixel ratio threshold value $C_i$ ($i=1, 2, \ldots N$) assuming a plurality of predetermined values, the decision-making unit extracts pixels indicating brightness values smaller than a product obtained by multiplying a largest brightness value in the photographic image by the reflectance threshold value $R_i$ among pixels constituting the photographic image, and determines that the projection surface is suitable for projection if a ratio of the extracted pixels to the pixels constituting the photographic image is less than the pixel ratio threshold value $C_i$ for all values taken for i, ($i=1, 2, \ldots N$); and a reflectance threshold value $R_j$ assumed when $i=j$ ($j=1, 2, \ldots N-1$) is smaller than a reflectance threshold value $R_{j+1}$ assumed when $i=j+1$ and a pixel ratio threshold value $C_j$ assumed when $i=j$ ($j=1, 2, \ldots N-1$) is smaller than a pixel ratio threshold value $C_{j+1}$ assumed when $i=j+1$.

According to the 5th aspect of the present invention, in the projector according to the 2nd aspect, it is preferred that the decision-making unit extracts a plurality of successive pixels indicating brightness values smaller than a product obtained by multiplying a largest brightness value in the photographic image but a predetermined minimum reflectance, among pixels constituting the photographic image, and determines that the projection surface is suitable for projection if a ratio of the extracted pixels to the pixels constituting the photographic image is less than a predetermined ratio.

According to the 6th aspect of the present invention, in the projector according to the 2nd aspect, it is preferred that the decision-making unit determines that the projection surface is suitable for projection if a condition whereby a ratio of pixels that indicate brightness values smaller than a product obtained by multiplying a largest brightness value in the photographic image by a predetermined minimum reflectance, extracted from pixels constituting the photographic image, to the pixels constituting the photographic image is less than a predetermined ratio exists for all photographic images obtained by photographing the projection surface onto which pixel primary color images inherent to the projector are individually projected color by color.

According to the 7th aspect of the present invention, a projector comprises: a correction unit that corrects a projection image based upon a photographic image obtained by photographing a projection surface onto which a specific projection image is projected; a projection unit that projects the projection image having been corrected by the correction unit; a detection unit that detects, based upon the photographic image, a low-brightness area or a high chroma area (or a highly saturated area) at the projection surface; and a reporting unit that reports to a user the low-brightness area or the high chroma area at the projection surface having been detected.

According to the 8th aspect of the present invention, a projector comprises: a correction unit that corrects a projection image based upon a photographic image obtained by photographing a projection surface onto which a specific projection image is projected; a projection unit that projects the projection image having been corrected by the correction unit; a detection unit that detects, based upon the photographic image, a low-brightness area or a high chroma area at the projection surface; and a control unit that controls a size of the projection image projected onto the projection surface so as to ensure that the projection image is not superimposed over the low-brightness area or the high chroma area at the projection surface having been detected.

According to the 9th aspect of the present invention, a projector comprises: a correction unit that corrects a projection image based upon a photographic image obtained by photographing a projection surface onto which a specific projection image is projected; a projection unit that projects the projection image having been corrected by the correction unit; a detection unit that detects, based upon the photographic image, a low-brightness area or a high chroma area at the projection surface; and a control unit that controls a projection position and a size of the projection image projected onto the projection surface so as to ensure that the projection image is not superimposed over the low-brightness area or the high chroma area at the projection surface having been detected.

According to the 10th aspect of the present invention, in the projector according to the 8th or the 9th aspect, it is preferred that the projector further comprises: a reporting unit that reports to a user the low-brightness area or the high chroma area at the projection surface having been detected if the projection image projected onto the projection surface is superimposed over the low-brightness area or the high chroma area at the projection surface having been detected even after the control unit reduces the size of the projection image to a size smaller than a predetermined size.

According to the 11th aspect of the present invention, in the projector according to the 7th or the 10th aspect, it is preferred that the projector further comprises: an input unit via which the user enters information indicating that the low-brightness area or the high chroma area has been eliminated from the projection surface. If the information indicating that the low-brightness area or the high chroma area has been eliminated from the projection surface is entered via the input unit, the correction unit corrects the projection image by using a photographic image obtained by photographing the projection surface from which the low-brightness area or the high chroma area has been removed.

According to the 12th aspect of the present invention, a projector comprises: a correction unit that corrects a projection image based upon a photographic image obtained by photographing a projection surface onto which a specific projection image is projected; a projection unit that projects the projection image having been corrected by the correction unit; and a detection unit that detects, based upon the photographic image, a low-brightness area or a high chroma area at the projection surface. The projection unit increases luminance at a light source providing light when projecting the projection image, if the detection unit detects a low-brightness area or a high chroma area at the projection surface.

According to the 13th aspect of the present invention, a projector comprises: a correction coefficient calculation unit that calculates a correction coefficient used for projection image correction by using a photographic image of a projection surface onto which a specific projection image is projected; a correction unit that corrects projection images by using the correction coefficient calculated by the correction coefficient calculation unit; and a projection unit that projects the projection images having been corrected by the correction unit. The correction unit corrects projection images by using a predetermined correction coefficient until the correction coefficient calculation unit calculates the correction coefficient in correspondence to the projection surface, and corrects projection images by using the correction coefficient provided via the correction coefficient calculation unit once the correction coefficient calculation unit has calculated the correction coefficient for the projection surface.

According to the 14th aspect of the present invention, a projector comprises: a correction coefficient calculation unit that calculates a correction coefficient used for projection image correction by using a photographic image of a projection surface onto which a specific projection image is projected; a correction unit that corrects projection images by using the correction coefficient calculated by the correction coefficient calculation unit; and a projection unit that projects the projection images having been corrected by the correction unit. The correction unit adjusts the correction coefficient used for projection image correction, which initially assumes a predetermined correction coefficient value, in stages until a value of the correction coefficient calculated by the correction coefficient calculation unit is assumed.

According to the 15th aspect of the present invention, a projector comprises: a correction coefficient calculation unit that calculates a correction coefficient used for projection image correction by using photographic images of a projection surface onto which a plurality of specific projection images are individually projected; a correction unit that corrects projection images by using the correction coefficient having been calculated by the correction coefficient calculation unit; and a projection unit that projects the projection images having been corrected by the correction unit. The correction coefficient calculation unit calculates the correction coefficient used for projection image correction based upon photographic images each obtained by photographing the projection surface onto which one of the plurality of specific projection images is projected during a projection image switch-over period elapsing while a projection image projected via the projection unit is switched to another image; and the correction unit corrects projection images by using a predetermined correction coefficient until the correction coefficient calculation unit calculates the correction coefficient in correspondence to the projection surface, and corrects projection images by using the correction coefficient provided via the correction coefficient calculation unit once the correction coefficient calculation unit has calculated the correction coefficient for the projection surface.

According to the 16th aspect of the present invention, a projector comprises: a storage unit in which projection characteristics of a wall are stored in relation to a pattern present at the wall; a correction coefficient calculation unit that calculates a correction coefficient by comparing a photographic image of a projection surface onto which a specific projection image is projected with the pattern at the wall stored in the storage unit; a correction unit that corrects a projection image by using the correction coefficient having been calculated by the correction coefficient calculation unit; and a projection unit that projects the projection image having been corrected by the correction unit.

According to the 17th aspect of the present invention, a projector comprises: a flash light emitting unit that emits flash light; a correction coefficient calculation unit that calculates a correction coefficient used for projection image correction based upon a photographic image obtained by photographing a projection surface irradiated with the flash light emitted from the flash light emitting unit; a correction unit that corrects a projection image by using the correction coefficient having been calculated by the correction coefficient calculation unit; and a projection unit that projects the projection image having been corrected by the correction unit.

According to the 18th aspect of the present invention, a projector comprises: a correction coefficient calculation unit that calculates a correction coefficient used for projection image correction by using a photographic image of a projection surface onto which a specific projection image is projected; a correction unit that corrects a projection image by using the correction coefficient calculated by the correction coefficient calculation unit; and a projection unit that projects the projection image having been corrected by the correction unit. The correction coefficient calculation unit calculates a plurality of correction coefficients by photographing the projection surface onto which the specific projection image is projected a plurality of times and designates a median or an average of the plurality of correction coefficients as a correction coefficient.

According to the 19th aspect of the present invention, in the projector according to the 18th aspect, it is preferred that the correction coefficient calculation unit excludes any value indicating an anomaly among the plurality of correction coefficients used to calculate the median or the average.

According to the 20th aspect of the present invention, a projector comprises: a correction coefficient calculation unit that calculates a correction coefficient used for projection image correction by using a photographic image of a projection surface onto which a specific projection image is projected; a correction unit that corrects a projection image by using the correction coefficient calculated by the correction coefficient calculation unit; and a projection unit that projects the projection image having been corrected by the correction unit. The correction coefficient calculation unit recalculates the correction coefficient if a change is detected in a photographic image of the projection surface with a specific projection image projected thereupon, which is captured during a projection image switch-over period elapsing while the projection image projected by the projection unit is switched to another image.

According to the 21st aspect of the present invention, a projector comprises: a correction coefficient calculation unit that calculates a correction coefficient used for projection image correction by using a photographic image of a projection surface onto which a specific projection image is projected; a correction unit that corrects a projection image by using the correction coefficient calculated by the correction coefficient calculation unit; a projection unit that projects the projection image having been corrected by the correction unit; and a shift detection unit that detects a shift of the projection surface. The correction coefficient calculation unit recalculates the correction coefficient upon detecting, via the shift detection unit, a shift of the projection surface; and the correction unit corrects projection images by using a predetermined correction coefficient until the correction coefficient is recalculated and corrects projection images by using the correction coefficient provided via the correction coefficient calculation unit once the correction coefficient has been recalculated.

According to the 22nd aspect of the present invention, in the projector according to the 21st aspect, it is preferred that the correction coefficient calculation unit recalculates the correction coefficient based upon a photographic image obtained by photographing the projection surface onto which the specific projection image is projected during a projection image switch-over period elapsing while the projection image projected by the projection unit is switched to another image.

According to the 23rd aspect of the present invention, in the projector according to the 21st or the 22nd aspect, it is preferred that the shift detection unit detects a shift by detecting movement of the projector.

According to the 24th aspect of the present invention, in the projector according to the 21st or the 22nd aspect, it is preferred that the projector further comprises: a photographic image calculation unit that determines through calculation a photographic image that will be obtained by capturing a photographic image of the projection surface onto which the projection image having been corrected by the correction unit is projected. The shift detection unit detects a shift based upon a photographic image obtained by photographing the projection surface onto which the projection image corrected by the correction unit is projected and the photographic image having been calculated by the photographic image calculation unit.

According to the 25th aspect of the present invention, a projector comprises: a correction coefficient calculation unit that calculates a correction coefficient used for projection image correction by using a photographic image of a projection surface onto which a specific projection image is projected; a correction unit that corrects a projection image by using the correction coefficient calculated by the correction coefficient calculation unit; a projection unit that projects the projection image having been corrected by the correction unit; and a movement detection unit that detects a movement of a main body. The projection unit projects projection images without correcting the projection images via the correction unit once the movement detection unit detects movement of the main body.

According to the 26th aspect of the present invention, in the projector according to the 25th aspect, it is preferred that the projection unit projects projection images without correcting the projection images via the correction unit upon detecting via the movement detection unit that the main body has moved continuously.

According to the 27th aspect of the present invention, a projector comprises: a correction coefficient calculation unit that calculates a correction coefficient used for projection image correction by using a photographic image of a projection surface onto which a specific projection image is projected; a correction unit that corrects a projection image by using the correction coefficient calculated by the correction coefficient calculation unit; a projection unit that projects the projection image having been corrected by the correction unit; and a photographic image calculation unit that determines through calculation a photographic image that will be obtained by capturing a photographic image of the projection surface onto which the projection image having been corrected by the correction unit is projected. The correction coefficient calculation unit recalculates the correction coefficient based upon a photographic image obtained by photographing the projection surface onto which the projection image corrected by the correction unit is projected and the photographic image having been calculated by the photographic image calculation unit.

Advantageous Effects of the Invention

According to the present invention, a projection image of optimal quality is provided.

BRIEF DESCRIPTION OF THE DRAWINGS (FIG. 1) An external view of the projector achieved in an embodiment of the present invention.

(FIG. 2) A block diagram illustrating the structure adopted in the projector in the embodiment of the present invention.

(FIG. 3) A flowchart of the image processing executed in the image processing unit.

(FIG. 4) Illustrations provided to facilitate an explanation of the projection surface decision-making processing executed in the embodiment of the present invention.

(FIG. 5) A flowchart of the projection surface decision-making processing executed in a first embodiment of the present invention.

(FIG. 6) A flowchart of the projection surface decision-making processing executed in a second embodiment by allowing the correction quantity, which indicates the extent to which the projection image is to be corrected, to be lessened.

(FIG. 7) A flowchart of the projection surface decision-making processing executed in a third embodiment based upon a plurality of combinations of $R^*\_min\_th$ and $C\_th$.

(FIG. 8) A flowchart of the projection surface decision-making processing executed in a fourth embodiment based upon information at successive pixels.

(FIG. 9) A flowchart of the projection surface decision-making processing executed in a fifth embodiment based upon the projection surface chroma (or color saturation).

Figure 9:
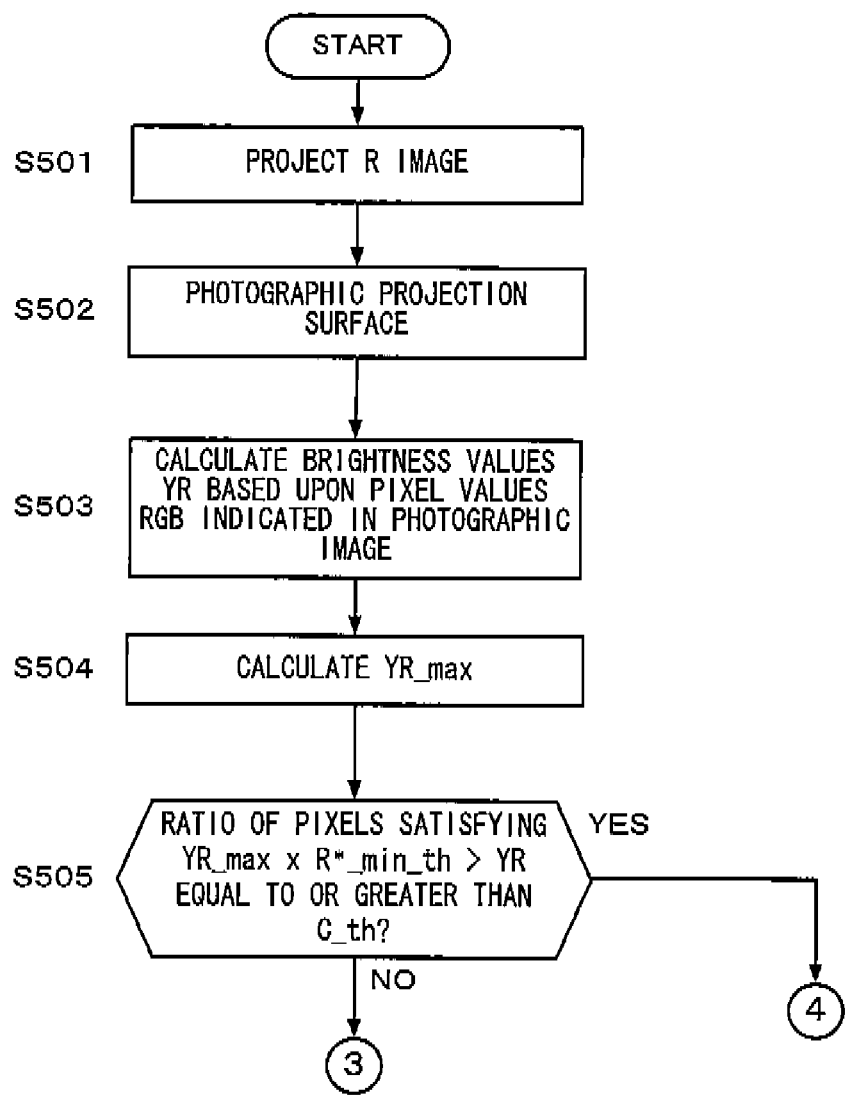

(FIG. 10) A flowchart of the processing in continuation from FIG. 9.

Figure 10:
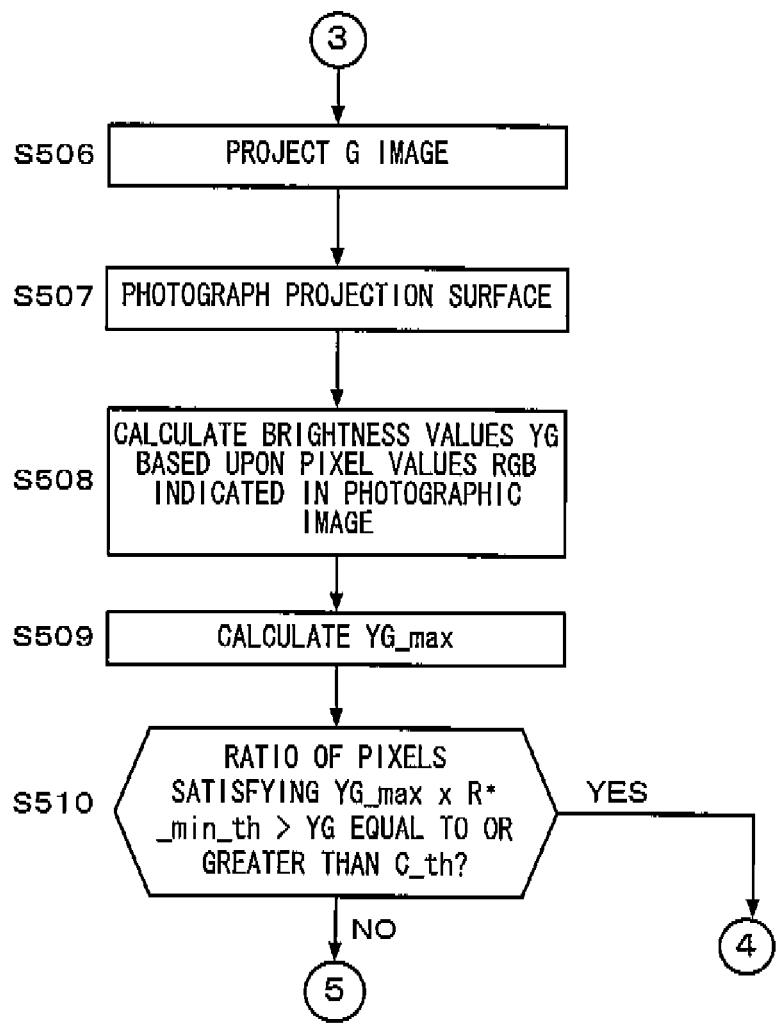

(FIG. 11) A flowchart of the processing in continuation from FIG. 10.

(FIG. 12) Illustrations provided to facilitate an explanation of how a projection image, projected after having undergone the image processing executed in a sixth embodiment of the present invention, may be displayed.

(FIG. 13) A flowchart of the image processing executed in the sixth embodiment of the present invention.

(FIG. 14) Brightness distributions that may manifest when a white image is projected.

(FIG. 15) Illustrations provided to facilitate an explanation of the image processing executed in a seventh embodiment of the present invention to exclude a projection surface area with extremely low brightness from the projection surface by reducing the projection image plane projection size.

(FIG. 16) A flowchart of the image processing executed in the seventh embodiment of the present invention to exclude a projection surface area with extremely low brightness from the projection surface by reducing the projection image plane projection size.

(FIG. 17) Illustrations provided to facilitate an explanation of the image processing executed in an eighth embodiment of the present invention to exclude a projection surface area with extremely low brightness from the projection surface by reducing the projection size as well as shifting the projection image projection position.

(FIG. 18) A flowchart of the image processing executed in the eighth embodiment of the present invention to exclude a projection surface area with extremely low brightness from the projection surface by reducing the projection size as well as shifting the projection image projection position.

(FIG. 19) Illustrations provided to facilitate an explanation of the image processing executed in a ninth embodiment of the present invention.

(FIG. 20) A flowchart of the image processing executed in the ninth embodiment.

(FIG. 21) Illustrations provided to facilitate an explanation of image processing executed for projection images by switching the correction coefficient gradually.

(FIG. 22) A flowchart of the image processing executed for projection images by switching the correction coefficient gradually.

(FIG. 23) Illustrations provided to facilitate an explanation of how a photographic image of the projection surface may be captured during a projection-target image changeover period.

(FIG. 24) Illustrations provided to facilitate an explanation of how the projection image correction coefficient may be determined by using wall data.

(FIG. 25) An external view of the projection-capable camera achieved in an 11th embodiment of the present invention.

(FIG. 26) A block diagram illustrating the structure of the projection-capable camera in the 11th embodiment of the present invention.

(FIG. 27) Illustrations of a projection surface and a projection image.

(FIG. 28) Illustrations provided to facilitate an explanation of how a projection image, projected after having undergone the image processing executed in the 11th embodiment of the present invention, may be displayed.

(FIG. 29) A flowchart of the image processing executed in the 11th embodiment of the present invention.

(FIG. 30) Illustrations provided to facilitate an explanation of the processing executed in a 12th embodiment of the present invention to project a specific projection image and capture a photographic image of the projection surface onto which the projection image is projected during a projection target image changeover period.

(FIG. 31) Illustrations provided to facilitate an explanation of how a photographic image and an estimated photographic image may be compared in a 13th embodiment of the present invention.

(FIG. 32) Illustrations provided to facilitate an explanation of the relationship that may exist between the wide-range area and the projection surface in a 14th embodiment of the present invention.

(FIG. 33) Illustrations provided to facilitate an explanation of how the direction or the extent of projection surface shift may be detected by comparing the photographic image and the estimated photographic image in the 14th embodiment of the present invention.

(FIG. 34) A flowchart of the image processing executed in a 15th embodiment of the present invention, whereby the projection image is not corrected if a projection surface shift is detected.

BEST MODE FOR CARRYING OUT THE INVENTION

—First Embodiment—

The following is a description of the first embodiment of the present invention, given in reference to drawings. The projector according to the present invention corrects an input image used to project an image onto the projection surface so as to improve the visual quality and appearance of the projected image in correspondence to the conditions at the projection surface. Prior to a projection operation, an image projected onto the projection surface is photographed, a decision as to whether or not the projection surface is suitable for projection is made based upon the photographic image and the user is notified of the decision-making results.

FIG. 1 shows a projector 1 achieved in the embodiment of the present invention viewed from the front side. FIG. 1 shows a projection lens 111A constituting a projection optical system 111 (see FIG. 2) and a photographic lens 121A constituting an imaging optical system 121 (see FIG. 2), both disposed on the front side of the projector 1. The projector 1, placed on a desktop or the like, projects projection information such as an image by means of a built-in projection unit 110 (see FIG. 2) toward a screen or the like present in front thereof.

Figure 2:
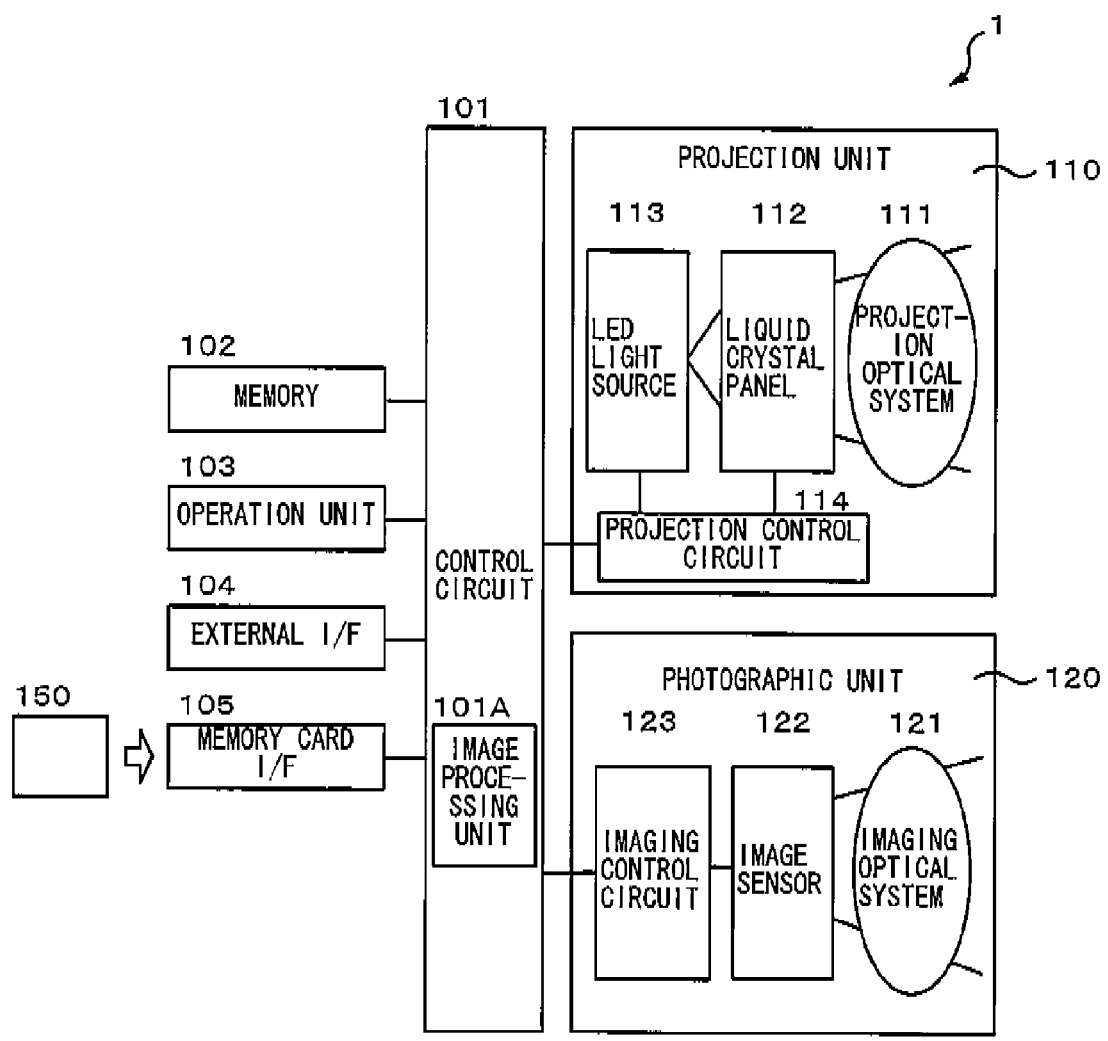

FIG. 2 is a block diagram showing an example of the structure that may be adopted in the projector 1. The projector 1 in FIG. 2 includes the projection unit 110, an photographic unit 120, a control circuit 101, a memory 102, an operation unit 103, an external interface (I/F) circuit 104 and a memory card interface (I/F) 105. A memory card 150 can be connected to the memory card interface 105.

The control circuit 101 is constituted with a microprocessor and its peripheral circuits. Based upon a control program, the control circuit 101 executes specific arithmetic operations by using signals input thereto from various internal units in the projector. The control circuit 101 outputs the arithmetic operation results to the individual units within the projector as control signals. The control circuit 101 thus controls a projection operation and an imaging operation executed at the projector 1. The control program is stored in a ROM (not shown) within the control circuit 101.

The control circuit 101 includes an image processing unit 101A. The image processing unit 101A executes image processing on image data obtained by the control circuit 101 via the external interface 104 or image data obtained by the control circuit 101 from the memory card 150. The image processing executed at the image processing unit 101A is to be described in detail later.

The memory 102 is used as a work memory by the control circuit 101. The operation unit 103, constituted with buttons and switches, outputs to the control circuit 101 an operation signal corresponding to a specific button or switch having been operated. Data can be written into, saved in and read out from the memory card 150 in response to instructions issued by the control circuit 101.

The projection unit 110 includes the projection optical system 111, a liquid crystal panel 112, an LED light source 113 and a projection control circuit 114. The LED light source 113 illuminates the liquid crystal panel 112 with luminance, the level of which corresponds to a supplied current. At the liquid crystal panel 112, an optical image is generated in response to a drive signal provided from the projection control circuit 114. The projection optical system 111 projects the optical image output from the liquid crystal panel 112. In response to an instruction issued by the control circuit 101, the projection control circuit 114 outputs control signals to the LED light source 113 and the liquid crystal panel 112.

The projection unit 110 assumes a structure that allows it to project an image expressed with image data saved in the memory card 150 or an image expressed with image data provided by an external apparatus via the external interface circuit 104 in response to an instruction issued by the control circuit 101. The image expressed with image data saved in the memory card 150 or the image expressed with image data provided by an external apparatus via the external interface circuit 104 is hereafter referred to as a projection source image. The image that is actually projected by the projection unit 110 (hereafter referred to as a projection image) is output as a result of the image processing executed on the projection source image by the image processing unit 101A in the control circuit 101.

The photographic unit 120, which includes the imaging optical system 121, an image sensor 122 and an imaging control circuit 123, captures an image of the projection surface in response to an instruction issued by the control circuit 101. The imaging optical system 122 forms a subject image on an imaging surface of the image sensor 122. The image sensor 122 may be a CCD image sensor or a CMOS image sensor. The imaging control circuit 123 controls the drive of the image sensor 122 in response to an instruction issued by the control circuit 101 and also executes specific signal processing on the image signals output from the image sensor 122. Image data resulting from the signal processing are recorded into the memory card 150 as an image file in a predetermined format.

The image processing executed by the image processing unit 101A in the control circuit 101 is described. Through the image processing executed in the embodiment of the present invention, the color of the projection source image is corrected based upon a photographic image of the projection surface captured via the photographic unit 120, so as to render a pattern and any stains that may be present at the projection surface less noticeable in the projection source image projected onto the projection surface. The image processing unit 101A is also capable of executing geometric correction in order to correct flaring, distortion and the like that will occur in the projection image when the optical axis of the imaging optical system 110 fails to extend perpendicular to the projection surface, as well as distortion in the projection image when the optical axis of the projection optical system 111 and the optical axis of the imaging optical system 121 are not in alignment. Since the color correction mentioned earlier characterizes the image processing executed in the first embodiment of the present invention, the following explanation focuses on the color correction.

Figure 3:
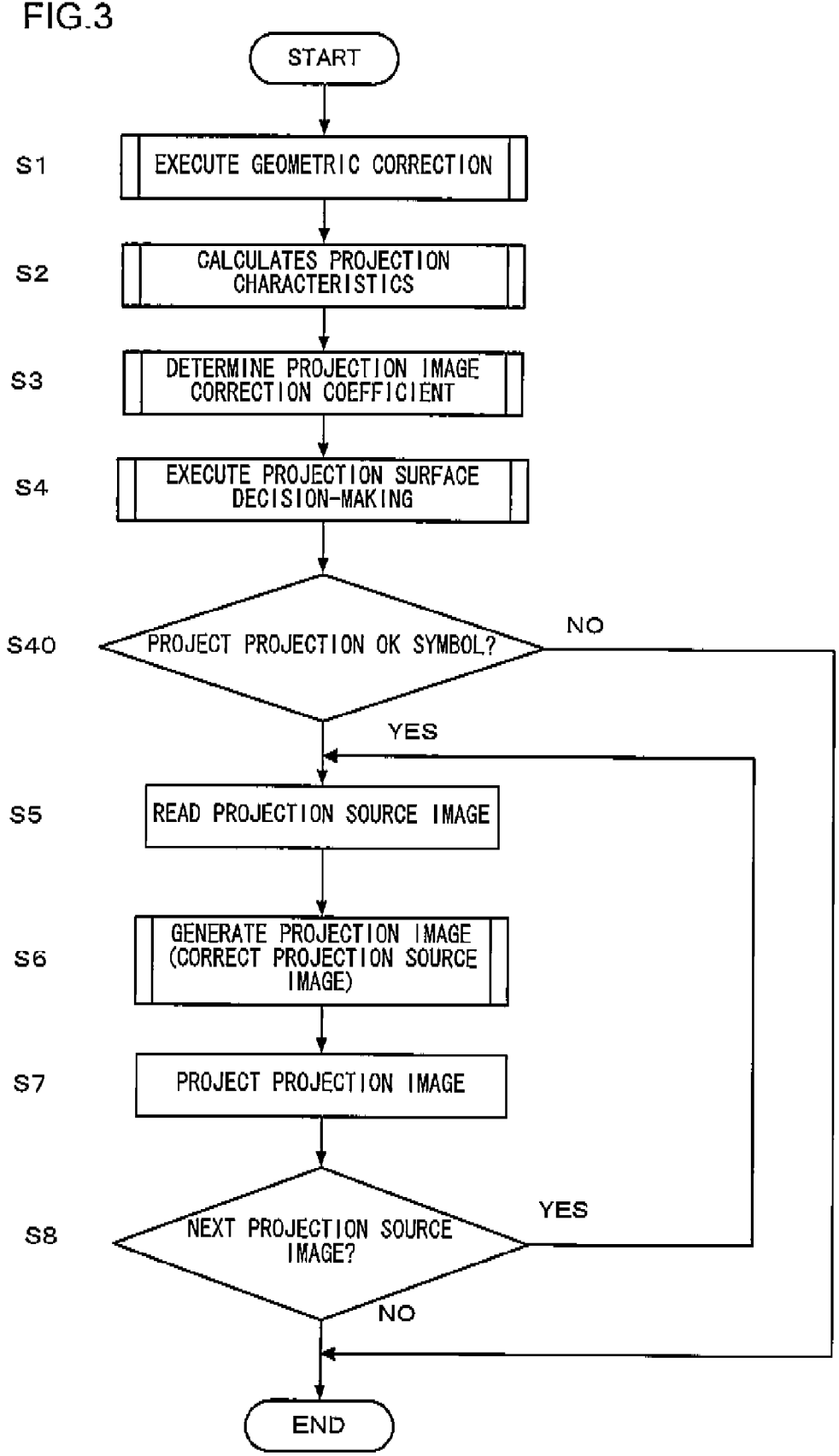

In reference to the flowchart presented in FIG. 3, the projection control executed by the control circuit 101, under which a projection image is projected, and the image processing executed by the image processing unit 101A in the control circuit 101 in order to generate the projection image are described. The processing in FIG. 3 is executed by the image processing unit 101A based upon a program started up as projection start processing begins.

In step S1, a geometric correction coefficient to be used in geometric correction of a projection source image is calculated. Since the geometric correction coefficient can be calculated through a method known in the related art, its description is not provided.

At this point, the image processing unit 101A in the control circuit 101 executes interpolation processing so as to adjust the number of pixels constituting the projection source image to match the resolution of the projector 1. The image processing unit 101A also executes interpolation processing so as to adjust the number of pixels constituting a photographic image of the projection surface photographed by the photographic unit 120 (hereafter referred to as a projection surface photographic image) to match the resolution of the projector 1. The photographic image having undergone the interpolation processing is used when correcting the projection source image having undergone the interpolation processing mentioned earlier as below and the image thus corrected is projected. The interpolation processing is executed in order to improve the processing speed by clearly defining the correspondence between the pixels constituting the projection source image and the pixels constituting the photographic image.

In step S2, the projection characteristics of the projection unit 110 are determined through calculation. The projection characteristics determined in this step indicate the relationship between pixel values (R, G, B) indicated in an input image and colorimetric values (X, Y, Z) detected in a projection image reproduced on the projection surface. The colorimetric values are affected by uneven illumination provided by the projection unit 110, any color or pattern that may be present at the projection surface and the brightness at the projection surface attributable to ambient illumination. Accordingly, a specific projection image represented by known pixel values (R, G, B) is projected via the projection unit 110, a photographic image of the projection image projected onto the projection surface is captured with the photographic unit 120 and the projection characteristics are calculated by detecting the colorimetric values (X, Y, Z) from the photographed image. As detailed later, the specific projection image is a white image, a black image, an R image, a G image or a B image. By first correcting the projection source image with a projection image correction coefficient determined based upon the projection characteristics and then projecting the corrected image, a desirable projection image, unaffected by uneven illumination provided from the projection unit 110, any color or pattern that may be present on the projection surface or the brightness at the projection surface attributable to ambient illumination, is obtained. Specific calculation processing that may be executed to determine the projection characteristics is to be described later.

In step S3, the projection image correction coefficient to be applied to the projection source image data is determined by using the projection characteristics having been determined in step S2, so as to optimally correct the projection source image and obtain a desirable projection image unaffected by the conditions at the projection surface, the ambient illumination conditions and the like. The projection image correction coefficient is determined based upon the projection surface photographic image. The processing executed in this step is to be described in detail later.

In step S4, projection surface decision-making is executed based upon the projection surface photographic image to determine whether or not the projection surface is suitable for projection. The projection surface photographic image is obtained as the control circuit 101 controls the projection control circuit 114 and the imaging control circuit 123 so that an image of the projection surface, onto which a specific projection image is projected by the projection unit 110, is captured via the photographic unit 120. The projection surface decision-making processing is also to be described in detail later.

An affirmative decision is made in step S40 if the projection surface has been judged to be suitable for projection through the projection surface decision-making processing executed in step S4 and a projection OK symbol, to be detailed later, is projected. If an affirmative decision is made in step S40, the operation proceeds to step S5. However, if the projection surface has been judged to be not suitable for projection and a projection NG symbol, to be detailed later, is projected, a negative decision is made in step S40 and the processing ends.

In step S5, the image data expressing the projection source image are read either via the external interface circuit 104 or from the memory card 150. The image data thus read are stored into the memory 102. In step S6, a projection image is generated by applying the projection image correction coefficient having been determined in step S4 to the projection source image data having been read in step S5 and then converting the image data to analog data. In step S1, the control circuit 101 controls the projection control circuit 114 so as to project via the projection unit 110 the projection image having been generated in step S6.

In step S8, a decision is made as to whether or not there is another projection source image to be read out to undergo correction and be projected as a projection image. If there is another projection source image, an affirmative decision is made in step S8 and the operation returns to step S5. If there is no projection source image, a negative decision is made in step S8 and the processing ends.

Next, the processing executed in steps S2, S3, S4 and S6 is described in further detail.

—Projection Characteristics Calculation—

The calculation executed in step S2 to determine the projection characteristics is now described.

When a projection image generated based upon projection source image data assuming a pixel value $(R, G, B)_i$ at an ith pixel thereof is projected via the projection unit 110, the colorimetric value $(X, Y, Z)_i$ assumed on the projection surface in correspondence to the pixel value at the ith pixel is expressed as in (1) below.

(Expression 1)

$$\begin{bmatrix} X \\ Y \\ Z \end{bmatrix}_i = R_i^* \cdot \left[ M_{pi} \cdot \begin{bmatrix} R^\gamma \\ G^\gamma \\ B^\gamma \end{bmatrix}_i + \begin{bmatrix} X_{kp} \\ Y_{kp} \\ Z_{kp} \end{bmatrix}_i \right] \quad (1)$$

$$= M_i \cdot \begin{bmatrix} R^\gamma \\ G^\gamma \\ B^\gamma \end{bmatrix}_i + \begin{bmatrix} X_k \\ Y_k \\ Z_k \end{bmatrix}_i$$

Note that the expression above adopts substitutions expressed in (2) and (3) below.

(Expression 2)

$$M_i = R_i^* \cdot M_{pi} \quad (2)$$

(Expression 3)

$$\begin{bmatrix} X_k \\ Y_k \\ Z_k \end{bmatrix}_i = R_i^* \cdot \begin{bmatrix} X_{kp} \\ Y_{kp} \\ Z_{kp} \end{bmatrix}_i \quad (3)$$

γ represents the gradation characteristics of the projection unit 110. $M_{pi}$ represents the color conversion matrix used when converting a pixel value $(R^\gamma, G^\gamma, B^\gamma)_i$ of the projection unit 110 to a colorimetric value representing the illumination provided via the projection unit 110. $(X_{kp}, Y_{kp}, Z_{kp})_i$ represents the illumination conditions at the projection surface including the ambient illumination, under which a black image is projected via the projection unit 110. $R^*_i$ represents the reflectance characteristics manifesting at the projection surface.

The subscript i is used for the following purposes. The projector 1 corrects uneven conditions within the surface attributable to uneven illumination conditions at the projection unit 110, ambient illumination and a black spot, in addition to uneven conditions pertaining to the reflectance at the projection surface attributable to a pattern or the like at the projection surface (these uneven conditions are hereafter collectively referred to as "non-uniformity"), based upon an image of the projection surface captured by projecting an image with known pixel values, such as a white image or a black image. Accordingly, the subscript i is used to indicate the projection characteristics that may vary from one pixel area to another at the projection surface.

$(X_k, Y_k, Z_k)_i$ in expression (1) is determined based upon a projection surface photographic image obtained by projecting a black image $((R, G, B)_i=0, 0, 0)_i$. The colorimetric value assumed in the projection image projected on the projection surface can be calculated through a predetermined type of color conversion processing executed by using the pixel value indicated in the photographic image. Assuming that the photographic image is profiled with sRGB data, $(X_k, Y_k, Z_k)_i$ can be determined by executing standard sRGB conversion processing on the pixel value.

Likewise, 3×3 matrix coefficients in the color conversion matrix are determined based upon photographic images obtained by capturing images of the projection surface onto which an R image $((R, G, B)_i=(255, 0, 0)_i)$ a G image $((R, Q, B)_i=(0, 255, 0)_i)$ and a B image $((R, G, B)_i=(0, 0, 255)_i)$ are individually projected. In more specific terms, with $(X_r, Y_r, Z_r)_i$, $(X_g, Y_g, Z_g)_i$ and $(X_b, Y_b, Z_b)_i$ respectively indicating the colorimetric values in the projection surface photographic images obtained by projecting the R image, a G image and the B image, the color conversion matrix $M_i$ may be expressed as in (4) below.

(Expression 4)

$$M_i = \begin{bmatrix} X_r - X_k & X_g - X_k & X_b - X_k \\ Y_r - Y_k & Y_g - Y_k & Y_b - Y_k \\ Z_r - Z_k & Z_g - Z_k & Z_b - Z_k \end{bmatrix}_i \quad (4)$$

—Determining the Projection Image Correction Coefficient—

The processing executed in step S3 to determine the projection image correction coefficient is now described.

A photographic image obtained by capturing an image of a projection surface manifesting a non-uniformity or a projection surface with a pattern present thereupon will assume pixel values reflecting the non-uniformity or the pattern instead of uniform pixel values, and for this reason, the color gamut allowing the maximum level display changes from one pixel to another. Accordingly, the range of the color gamut over which the maximum level display is enabled is determined. The brightness $Y_i$ at the projection surface may be calculated as expressed in (5) based upon expression (1).

(Expression 5)

$$Y_i = (Y_r - Y_k) \cdot R_i^\gamma + (Y_g - Y_k) \cdot G_i^\gamma + (Y_b - Y_k) \cdot B_i^\gamma + Y_k \quad (5)$$

The range of brightness over which the image can be displayed is determined in correspondence to the range that may be assumed for $Y_i$ when $0 \le R_i \le 255$, $0 \le G_i \le 255$ and $0 \le B_i \le 255$ in expression (5). Since $Y_r > Y_k$, $Y_g > Y_k$ and $Y_b > Y_k$ under normal circumstances, the range of brightness at which the data at a given pixel can be displayed can be defined by the display brightness assumed when a white image $((R, G, B)_i=(255, 255, 255)_i)$ is projected, which is designated as a display-enabling maximum brightness $Y_{MAX, i}$, and the display brightness assumed when a black image is projected, which is designated as the display enabling minimum brightness $Y_{MIN, i}$.

In order to reduce the extent to which the quality of the projection image is adversely affected by a non-uniformity or a pattern at the projection surface, the projection source image data must be corrected so that the maximum brightness $Y_{MAX}$ of the projection surface photographic image at the projection surface is adjusted to $MIN(Y_{MAX, i})$ and the minimum brightness $Y_{MIN}$ of the projection surface photographic image at the projection surface is adjusted to $MAX(Y_{MIN, i})$. Namely, the projection source image data must be corrected so that the maximum brightness $Y_{MAX}$ assumed as the correction target projection source image is projected matches the smallest brightness value $MIN(Y_{MAX, i})$ among the values indicated at the plurality of pixels constituting the photographic image obtained by projecting a white image. In addition, the projection source image data must be corrected so that the minimum brightness $Y_{MIN}$ assumed as the correction target projection source image is projected matches the largest brightness value $MAX(Y_{MIN, i})$ among the values indicated at the plurality of pixels constituting the photographic image obtained by projecting a black image.

However, if the data at all the pixels are corrected as described above in conjunction with a projection surface that includes, for instance, an extremely dark area, the dynamic range will become excessively narrow, which, in turn, will compromise the quality of the corrected projection image. Accordingly, the maximum brightness $Y_{MAX}$ is determined as expressed in (6) below by setting a brightness threshold value $Y_{th}$ and lessening the correction quantity representing the extent of correction for any pixel assuming a brightness value lower than the brightness threshold value $Y_{th}$ in the projection image.

(Expression 6)

$$Y_{MAX} = MAX(Y_{th}, MIN(Y_{MAX,i})) \quad (6)$$

When $Y_{th} > MIN(Y_{MAX, i})$ is true, the maximum brightness $Y_{MAX}$ is adjusted so as to assume the threshold value $Y_{th}$ instead of $MIN(Y_{MAX, i})$. Through these measures, the extent to which the pixel value at a pixel with lower brightness is corrected is lessened.

—Projection Image Correction—

The processing executed in step S6 to generate the projection image by correcting the projection source image is described.

Assuming that the projection source image is expressed in the sRGB color space, the colorimetric value $(X, Y, Z)_i$ assumed at the projection surface in correspondence to a pixel value $(R_0, G_0, B_0)$ in the projection source image may be calculated as expressed in (7) below.

(Expression 7)

$$\begin{bmatrix} X \\ Y \\ Z \end{bmatrix}_i = (Y_{MAX} - Y_{k0}) \cdot M_{sRGB \to XYZ} \cdot \begin{bmatrix} R_0^{2.2} \\ G_0^{2.2} \\ B_0^{2.2} \end{bmatrix}_i + \begin{bmatrix} X_{k0} \\ Y_{k0} \\ Z_{k0} \end{bmatrix}_i \quad (7)$$

A pixel achieving the maximum brightness $Y_{MIN} = MAX(Y_{MIN, i})$ among all the pixels when a black image is projected is designated as a black spot on the projection image plane and the pixel value at the black spot is notated as the black spot $(X_{k0}, Y_{k0}, Z_{k0})$ on the projection image plane. It is to be noted that $M_{sRGB \to XYZ}$ represents the conversion matrix used to convert the data in the sRGB color space to data in the XYZ color space.

Accordingly, expression (1) may be used to calculate a corrected pixel value $(R, G, B)_i$ that is input to the projection unit 110 as expressed in (8) below.

(Expression 8)

$$\begin{bmatrix} R^\gamma \\ G^\gamma \\ B^\gamma \end{bmatrix}_i = (M_i)^{-1} \cdot \begin{bmatrix} (Y_{MAX} - Y_{k0}) \cdot M_{sRGB \to XYZ} \cdot \\ \begin{bmatrix} R_0^{2.2} \\ G_0^{2.2} \\ B_0^{2.2} \end{bmatrix}_i + \begin{bmatrix} X_{k0} \\ Y_{k0} \\ Z_{k0} \end{bmatrix} - \begin{bmatrix} X_k \\ Y_k \\ Z_k \end{bmatrix}_i \end{bmatrix} \quad (8)$$

Expression (7) is written by assuming that $\gamma=2.2$ in an sRGB space for purposes of simplification. However, the pixel value may be calculated by combining a linear function and a $\gamma$ set to 2.4.

—Projection Surface Decision-Making—

In reference to FIG. 4, the projection surface decision-making processing executed in step S4 in FIG. 3 is explained. FIG. 4(a) illustrates a projection surface 30. The projection surface 30 is a wall patterned with stars. Before projecting a projection image, a white image is projected onto the projection surface 30. Upon determining that the projection surface 30 is not suitable for projection, an X mark 31 indicating that the projection surface 30 is not suitable is projected from the projector 1, as shown in FIG. 4(b). The user, recognizing the X mark 31 understands that the projection surface is not suitable for projection. The user is thus able to choose another surface for the projection surface before starting projection of a projection source image.

FIG. 4(c) presents an example demonstrating how a projection image projected onto the projection surface judged to be unsuitable may appear. Even after the projection source image is corrected, star marks are visible in the projection image 32 projected on the projection surface and thus, the projection image is not acceptable.

Figure 5:
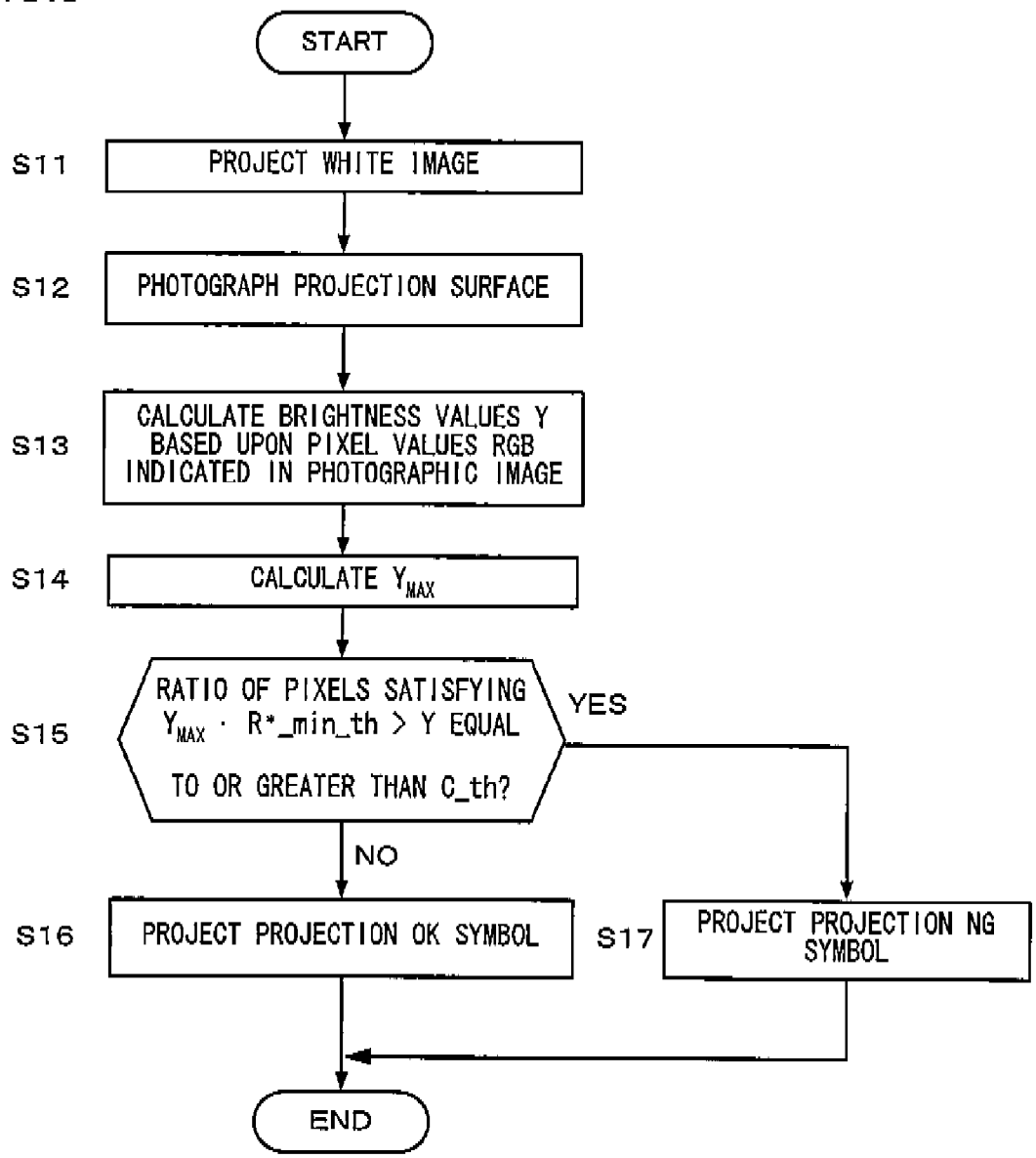

In reference to the flowchart presented in FIG. 5, the projection surface decision-making processing executed by the control circuit 101 is described. The processing in FIG. 5 is executed by the control circuit 101 based upon a program started up as projection start processing begins.

In step S11, a white image ((R, G, B)$_i$=(255, 255, 255)) is projected onto the projection surface from the projection unit 110. In step S12, a photographic image of the projection surface is captured via the photographic unit 120.

In step S13, brightness Y is calculated based upon the pixel values RGB indicated in the photographic image. The brightness Y is calculated as follows. The pixel values RGB indicated in the photographic image are converted to values in the XYZ colorimetric system by using a conversion matrix, which is stored in advance in the control circuit 101 to be used when converting data in the RGB colorimetric system to data in the XYZ colorimetric system (CIE 1931 colorimetric system), and thus, brightness values Y are calculated in correspondence to the individual pixels. It is to be noted that the conversion matrix used in this step is selected in correspondence to the spectral characteristics of the image sensor 122 in the photographic unit 120.

In step S14, the control circuit 101 calculates the maximum brightness $Y_{MAX}$, i.e., the largest brightness value among the brightness values calculated for the plurality of pixels constituting the photographic image. It is to be noted that since processing identical to the processing in steps S11~S14 is executed in step S3 in FIG. 3 as explained earlier, in order to ascertain the maximum brightness $Y_{MAX}$ achieved by projecting a white image, the maximum brightness obtained in step S3 may be utilized in the processing described below by skipping steps S11~S14. In step S15, pixels with brightness values Y thereof satisfying the relationship expressed as $Y_{MAX} \cdot R^*\_min\_th > Y$, among all the pixels constituting the photographic image, are extracted and a decision is made as to whether or not the ratio of extracted pixels, i.e., the ratio of the extracted pixels to all the pixels constituting the entire photographic image, is equal to or greater than C_th.

R*_min_th is a reflectance threshold value that may be set as described below. The correction quantity for projection source image data increases as the reflectance at the projection surface is lowered. When the level of reflectance is equal to or lower than a predetermined value, it becomes difficult to improve the quality of the projection image even through correction. Accordingly, the lowest level of reflectance at which the quality can still be improved through correction is designated as R*_min_th. R*_min_th may assume a value of, for instance, 0.02.

C_th, which may be equal to, for instance, 0%, may be set as described below. If there are numerous pixels with brightness values Y thereof each satisfying the relationship expressed as $Y_{MAX} \cdot R^*\_min\_th > Y$ even after the projection source image data have been corrected as described above, the quality of the projection image will be compromised due to the significant presence of pixels that have not been corrected fully. Accordingly, the value for C_th should be selected within the range over which the appearance of the projection image is not compromised in such a manner, and thus, C_th may be set to, for instance, 0%.

A negative decision is made in step S15 if the ratio of pixels with brightness values Y thereof each satisfying the relationship expressed as $Y_{MAX} \cdot R^*\_min\_th > Y$ is less than C_th, and in this case, the operation proceeds to step S16. An affirmative decision is made in step S15 if the ratio of pixels with brightness values Y thereof each satisfying the relationship expressed as $Y_{MAX} \cdot R^*\_min\_th > Y$ is equal to or greater than C_th and the operation proceeds to step S17.

In step S16, the control circuit 101 controls the projection control circuit 114 so as to project via the projection unit 110 a projection OK symbol (O mark), indicating that the projection surface is suitable for projection onto the projection surface, thereby giving the go-ahead for projection of the image having been corrected through the method described above. In step S17, the control circuit 101 controls the projection control circuit 114 so as to project via the projection unit 110 the projection NG symbol (X mark) indicating that the surface is not suitable as a projection surface.

The following advantages are achieved through the embodiment described above.

(1) A decision is made as to whether or not the projection surface is suitable for projection based upon a projection surface photographic image obtained by capturing an image of the projection surface onto which a specific projection image, e.g., a white image, is projected and the decision-making results are reported to the user. As a result, it is ensured that a projection surface manifesting a non-uniformity or a patterned projection surface, at which the quality of the image will be compromised even after the projection source image data are corrected, is never used for projection.

(2) The maximum brightness $Y_{MAX}$ representing the largest brightness value among the brightness values calculated for all the pixels constituting the projection surface photographic image is detected and a reference brightness value obtained by multiplying the brightness $Y_{MAX}$ by the minimum reflectance R*_min_th at the projection surface, is set. The ratio of the number of pixels with brightness values less than the reference brightness value, i.e., the ratio of the number of pixels with brightness values Y thereof each satisfying the relationship expressed as $Y_{MAX} \cdot R^*\_min\_th > Y$ to the overall number of pixels, is calculated and if the ratio thus calculated is equal to or greater than a threshold value C_th, the projection surface is judged to be unsuitable for projection. In other words, as long as the ratio of pixels projected with brightness lower than the reference brightness is less than the predetermined value, the projection surface is judged to be suitable for projection. Through these measures, an accurate decision can be made as to whether or not the projection surface is suitable for projection simply based upon the brightness values calculated for the pixels constituting the projection surface photographic image.

—Second Embodiment—

The projector in the second embodiment adjusts the extent to which the projection source image data are corrected in correspondence to the conditions at the projection surface by adopting the following decision-making criteria (a)-(c).

(a) The ratio of pixels with brightness values thereof less than a reference value (hereafter referred to as low-brightness pixels) in a projection surface photographic image obtained by capturing an image of the projection surface is smaller than a predetermined value.
(b) A low-brightness pixel within the projection surface photographic image assumes a peripheral position on the projection surface.
(c) The number of successive low-brightness pixels is small.

Namely, the correction quantity is reduced if the presence of a low-brightness area at the projection surface does not readily affect the quality of the projection image projected on the projection surface under circumstances such as those stated in (a)-(c) above. The data are corrected as expressed in (8) and (9) below.

The corrected pixel value $(R, G, B)_i$ that is input to the projection unit 110 can be calculated as expressed in (9) and (10) based upon the value of $Y_{MAX, i}$.

(1) For a pixel i satisfying $Y_{MAX, i} \leq Y_{MAX}$ (Expression 9)

$$\begin{bmatrix} R^\gamma \\ G^\gamma \\ B^\gamma \end{bmatrix}_i = (M_i)^{-1} \cdot \begin{bmatrix} (Y_{MAX} - Y_{k0}) \cdot M_{sRGB \to XYZ} \cdot \\ \begin{bmatrix} R_0^{2.2} \\ G_0^{2.2} \\ B_0^{2.2} \end{bmatrix}_i + \begin{bmatrix} X_{k0} \\ Y_{k0} \\ Z_{k0} \end{bmatrix} - \begin{bmatrix} X_k \\ Y_k \\ Z_k \end{bmatrix}_i \end{bmatrix} \quad (9)$$

(2) For a pixel i satisfying $Y_{MAX, i} < Y_{MAX}$ (Expression 10)

$$\begin{bmatrix} R^\gamma \\ G^\gamma \\ B^\gamma \end{bmatrix}_i = (M_i)^{-1} \cdot \begin{bmatrix} (Y_{MAX,i} - Y_{k0}) \cdot M_{sRGB \to XYZ} \cdot \\ \begin{bmatrix} R_0^{2.2} \\ G_0^{2.2} \\ B_0^{2.2} \end{bmatrix}_i + \begin{bmatrix} X_{k0} \\ Y_{k0} \\ Z_{k0} \end{bmatrix} - \begin{bmatrix} X_k \\ Y_k \\ Z_k \end{bmatrix}_i \end{bmatrix} \quad (10)$$

Expressions (9) and (10) are written by assuming that $\gamma=2.2$ in the sRGB space for purposes of simplification. However, the pixel value may be calculated by combining a linear function and a $\gamma$ set to 2.4 in exact compliance with the definition.

While the decision as to whether or not the projection surface is suitable for image projection is made in reference to the minimum reflectance R*_min_th and the threshold value C_th in the projector achieved in the first embodiment, second decision-making criteria detailed below are adopted in the second embodiment so as to facilitate correction quantity adjustment and ensure that the image quality is never compromised due to over-correction.

The second decision-making criteria pertain to the ratio of the number of pixels with brightness values Y thereof each satisfying a relationship expressed as $Y_{MAX} \cdot R*\_min\_th1 > Y$ to the overall number of pixels and their relationship to a second threshold value C_th1. It is to be noted that minimum reflectance R*_min_th1<minimum reflectance R*_min_th and that threshold value C_th1>threshold value C_th. The minimum reflectance R*_min_th1 may take on a value of, for instance, 0.02 and the threshold value C_th1 may be set to, for instance, 0.01 (1%).

Figure 6:
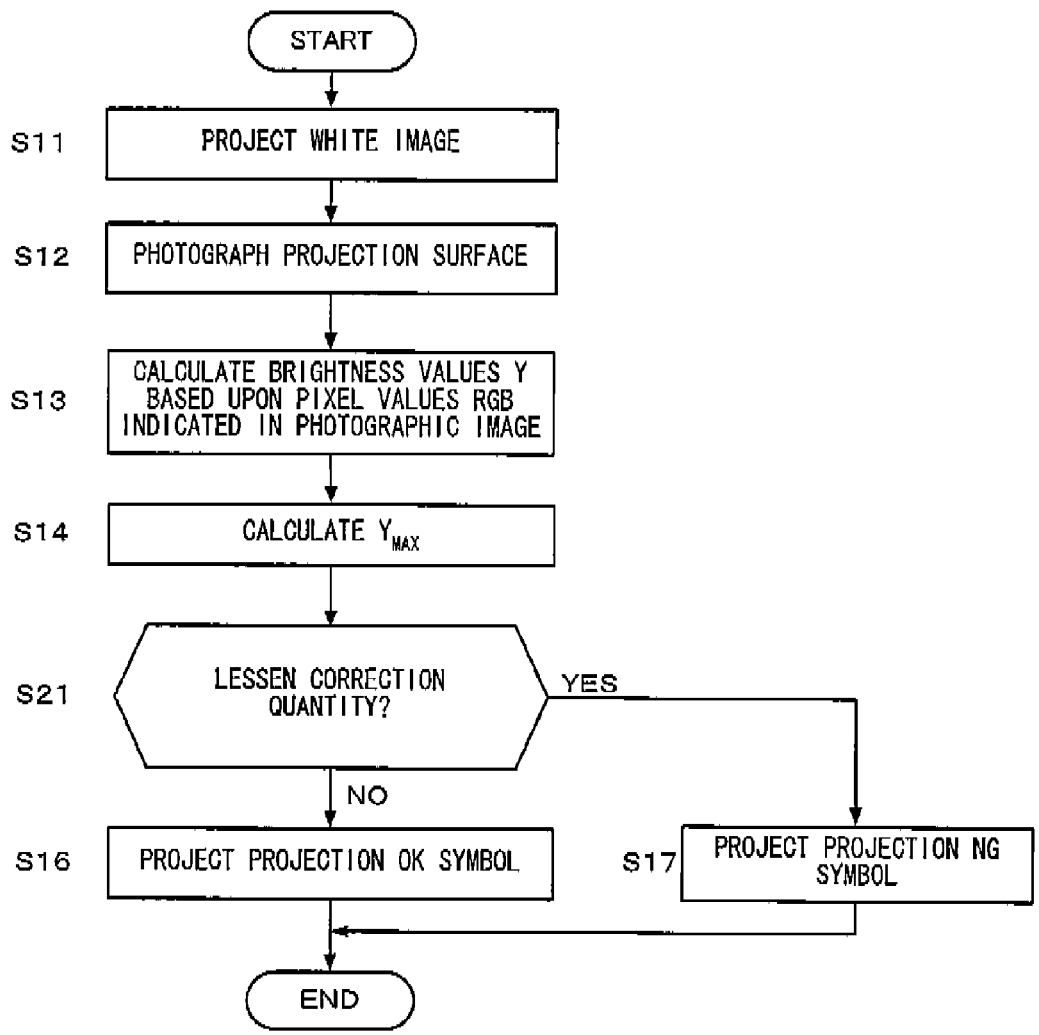

In reference to the flowchart presented in FIG. 6, the projection surface decision-making processing executed in the second embodiment is described. The processing in FIG. 6 is executed by the control circuit 101 based upon a program started up as projection start processing begins. The same step numbers are assigned to steps in which processing identical to the processing in FIG. 5 is executed and the following explanation focuses on processing different from that in FIG. 5.

Once the processing in step S14 is executed, the operation proceeds to step S21. In step S21, a decision is made as to whether or not to reduce the extent to which the projection source image data are to be correct, i.e., whether or not to lessen the correction quantity. Pixels with brightness values Y thereof satisfying the relationship expressed as $Y_{MAX} \cdot R*\_min\_th1 > Y$, among all the pixels constituting the photographic image, are extracted and a decision is made as to whether or not the ratio of the extracted pixels to all the pixels_constituting the entire photographic image is equal to or greater than the threshold value C_th1. The minimum reflectance R*_min_th1, which is the minimum reflectance at a predetermined projection surface, as explained earlier, assumes a value smaller than that of the reference reflectance R*_min_th used in the first embodiment. The threshold value C_th1, representing a predetermined ratio, is greater than the threshold value C_th, as explained earlier. A negative decision is made in step S21 if the ratio of pixels with brightness values Y thereof each satisfying the relationship expressed as $Y_{MAX} \cdot R*\_min\_th1 > Y$ is less than C_th1 and in this case, the operation proceeds to step S16. An affirmative decision is made in step S21 if the ratio of pixels with brightness values Y thereof each satisfying the relationship expressed as $Y_{MAX} \cdot R*\_min\_th1 > Y$ is equal to or greater than C_th1 and the operation proceeds to step S17.

C_th or C_th1 may be determined by factoring in the allowable range for the number of defective pixels at the liquid crystal panel 112 in the projection unit 110. While a decision is made in step S21 in reference to decision-making criterion (a) described earlier, a decision may be made in reference to decision-making criterion (b) or (c) or in reference to a combination of decision-making criteria.

—Third Embodiment—

A single decision-making reference value represented by the product of the minimum reflectance R*_min_th and the threshold value C_th is used as a decision-making criterion in the projector achieved in the first embodiment when making a decision as to whether or not the projection surface is suitable for image projection. In the projector achieved in the third embodiment, three different minimum reflectance levels R*_min_th2, R*_min_th3 and R*_min_th4 and three different threshold values C_th2, C_th3 and C_th4 are set and a first decision-making reference value represented by the product R*_min_th2×C_th2, a second decision-making reference value represented by the product R*_min_th3×C_th3 and a third decision-making reference value represented by the product R*_min_th4×C_th4 are used as decision-making criteria for reference when making a decision as to whether or not the projection surface is suitable for image projection.

The above three decision-making reference values, i.e., the first decision-making reference value R.*_min_th2×C_th2 (e.g. 0.002×0.001), the second decision-making reference value R*_min_th3×C_th3 (e.g., 0.02×0.01) and the third decision-making reference value R*_min_th4×C_th4 (e.g., 0.2×0.1), are used in the third embodiment in consideration of the fact that even when the uneven conditions at the projection surface are not very noticeable, the quality of the projection image is bound to be poor if the areal ratio of uneven areas is significant.

Figure 7:
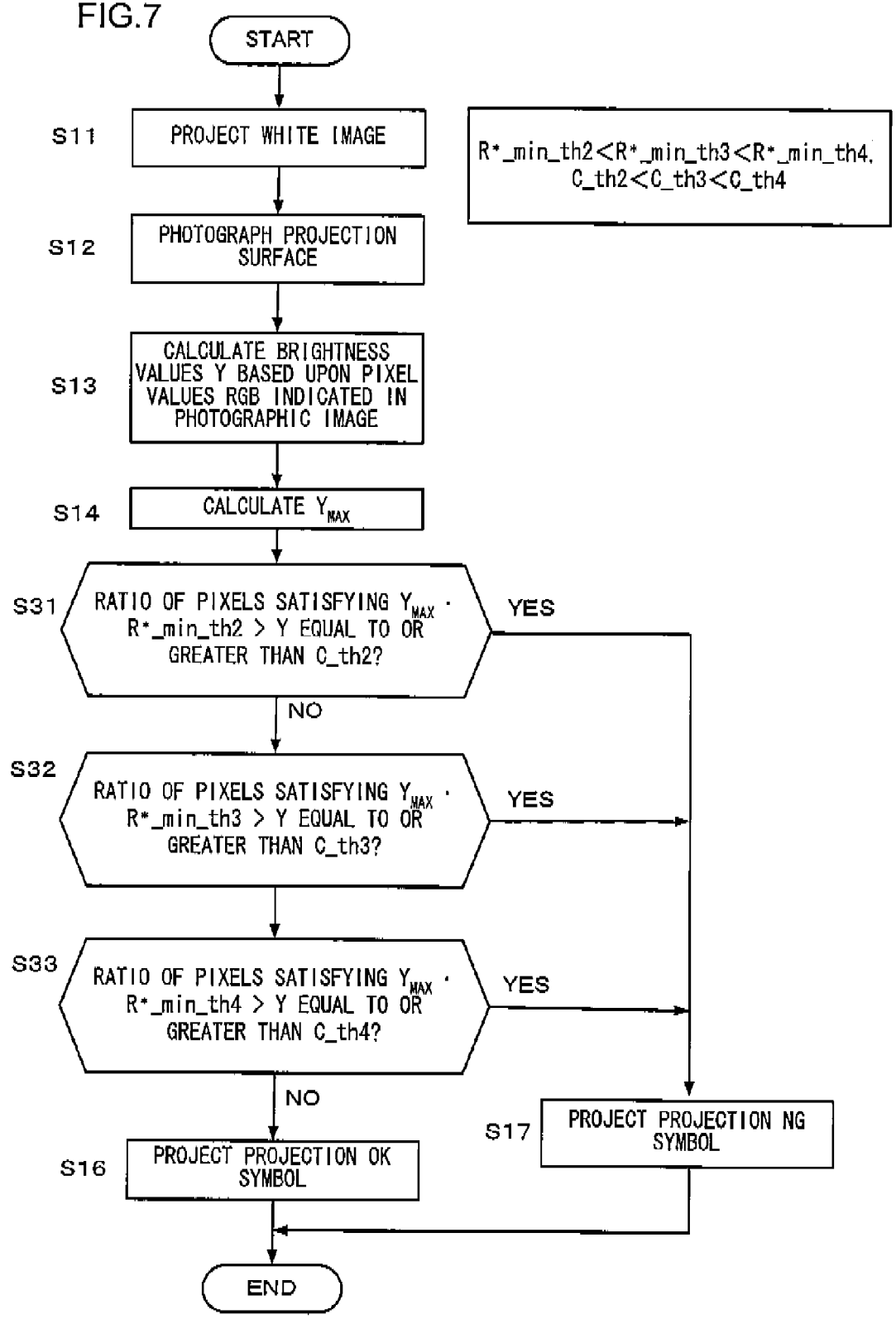

In reference to the flowchart presented in FIG. 7, the projection surface decision-making processing executed in the third embodiment is described. The processing in FIG. 7 is executed by the control circuit 101 based upon a program started up as projection start processing begins. The same step numbers are assigned to steps in which processing identical to the processing in FIG. 5 is executed and the following explanation focuses on processing different from that in FIG. 5. It is assumed that the value set for R*_min_th2 is smaller than the value set for R*_min_th3 and that the value set for R*_min_th3 is smaller than the value set for R*_min_th4. It is also assumed that the value set for C_th2 is smaller than the value set for C_th3 and that the value set for C_th3 is smaller than the value set for C_th4.

Once the processing in step S14 is executed, the operation proceeds to step S31. In step S31, pixels with brightness values Y thereof satisfying the relationship expressed as $Y_{MAX} \cdot R^*\_min\_th2 > Y$, among all the pixels constituting the photographic image, are extracted and a decision is made as to whether or not the ratio of the extracted pixels to the overall number of pixels is equal to or greater than C_th2. R*_min_th2 may be set to, for instance, 0.002 and C_th2 may be set to 0.1%. A negative decision is made in step S31 if the ratio of the number of extracted pixels to the overall number of pixels is less than C_th2 and in this case, the operation proceeds to step S32. An affirmative decision is made in step S31 if the number of extracted pixels to the overall number of pixels is equal to or greater than C_th2 and the operation proceeds to step S17.

In step S32, pixels with brightness values Y thereof satisfying the relationship expressed as $Y_{MAX} \cdot R^*\_min\_th3 > Y$, among all the pixels constituting the photographic image, are extracted and a decision is made as to whether or not the ratio of extracted pixels to the overall number of pixels is equal to or greater than C_th3. R*_min_th3 may be set to, for instance, 0.02 and C_th3 may be set to 1%. A negative decision is made in step S32 if the ratio of the number of extracted pixels to the overall number of pixels is less than C_th3 and in this case, the operation proceeds to step S33. An affirmative decision is made in step S32 if the number of extracted pixels to the overall number of pixels is equal to or greater than C_th3 and the operation proceeds to step S17.

In step S33, pixels with brightness values Y thereof satisfying the relationship expressed as $Y_{MAX} \cdot R^*\_min\_th4 > Y$, among all the pixels constituting the photographic image, are extracted and a decision is made as to whether or not the ratio of extracted pixels to the overall number of pixels is equal to or greater than C_th4. R*_min_th4 may be set to, for instance, 0.2 and C_th4 may be set to 10%. A negative decision is made in step S33 if the ratio of the number of extracted pixels to the overall number of pixels is less than C_th4 and in this case, the operation proceeds to step S16. An affirmative decision is made in step S33 if the number of extracted pixels to the overall number of pixels is equal to or greater than C_th4 and the operation proceeds to step S17.

The number of combinations of R*_min_th and C_th may be vary in correspondence to factors such as specific user requirements, the specifics of the photographic image to be projected, the specificity with regard to photographic conditions or the like.

—Fourth Embodiment—

The projector in the first embodiment adds up all the pixels with the brightness values Y thereof satisfying the relationship expressed as $Y_{MAX} \cdot R^*\_min\_th > Y$, including a lone pixel isolated from other such pixels and pixels in successive positions. The projector achieved in the fourth embodiment, on the other hand, adds up pixels with their brightness values Y satisfying the relationship expressed as $Y_{MAX} \cdot R^*\_min\_th > Y$ only if they occupy two or more consecutive positions, and calculates the ratio of the sum thus obtained to the entire number of pixels. Namely, it evaluates the projection surface by excluding pixels with brightness values Y thereof each satisfying the relationship expressed as $Y_{MAX} \cdot R^*\_min\_th > Y$ but occupying isolated positions.

Figure 8:
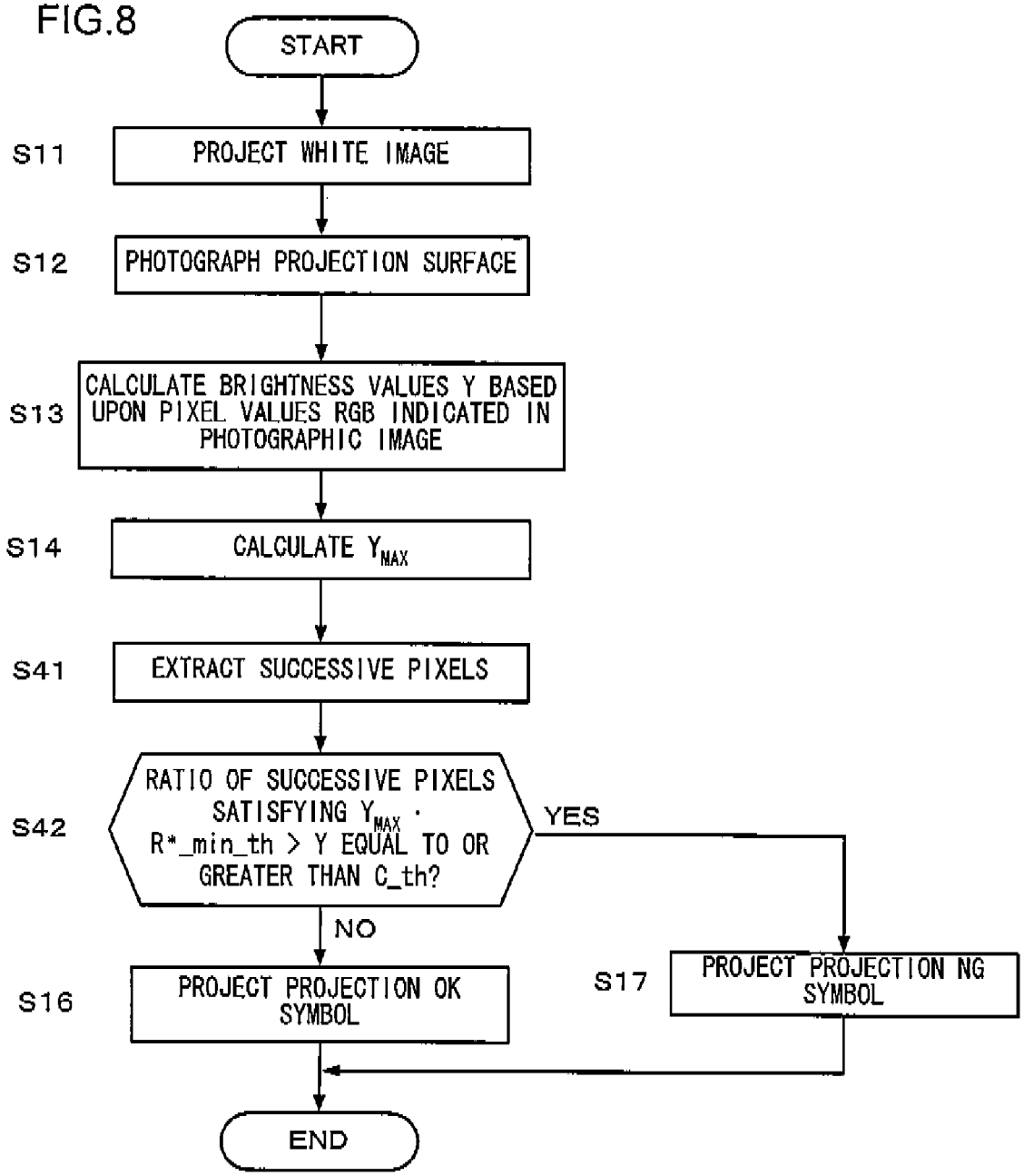

In reference to the flowchart presented in FIG. 8, the projection surface decision-making processing executed in the fourth embodiment is described. The processing in FIG. 8 is executed by the control circuit 101 based upon a program started up as projection start processing begins. The same step numbers are assigned to steps in which processing identical to the processing in FIG. 5 is executed and the following explanation focuses on processing different from that in FIG. 5.

Once the processing in step S14 is executed, the operation proceeds to step S41 in which successive pixels with brightness values Y thereof satisfying the relationship expressed as $Y_{MAX} \cdot R^*\_min\_th > Y$, among all the pixels constituting the photographic image, are extracted. In step S42, a decision is made as to whether or not the ratio of the pixels extracted in step S41 to the overall number of pixels is equal to or greater than C_th. A negative decision is made in step S42 if the ratio of the number of extracted pixels to the overall number of pixels is less than C_th and in this case, the operation proceeds to step S16. An affirmative decision is made in step S42 if the number of extracted pixels to the overall number of pixels is equal to or greater than C_th and the operation proceeds to step S17.

In this embodiment, too, the correction quantity may be lessened if (a) the ratio of pixels with the brightness thereof lower than a reference value (hereafter referred to as low-brightness pixels) in the projection surface photographic image obtained by capturing a photographic image of the projection surface is low, (b) the low-brightness pixels assume peripheral positions within the projection surface photographic image or (c) only a small number of low-brightness pixels occupy consecutive positions, as in the processing shown in FIG. 6. Upon determining that the correction quantity is to be lessened, the processing should be executed by using the second decision-making reference value having been described in reference to FIG. 6.

—Fifth Embodiment—

The projector in the first embodiment makes a decision as to whether or not the projection surface is suitable for projection based upon a monochrome image obtained by projecting a white image $((R, G, B)_i=(255, 255, 255))$ onto the projection surface from the projection unit 110. Instead, the projection surface may be evaluated by projecting chromatic images, such as an R image $((R, G, B)_i=(255, 0, 0))$, a G image $((R, G, B)i=(0, 255, 0))$ and a B image $((R, G, B)_i=(0, 0\ 255))$, onto the projection surface. If the projection surface is judged to include an area with a high level of chroma (or color saturation), for instance, that particular projection surface may be determined to be unsuitable for projection.

Figure 11:
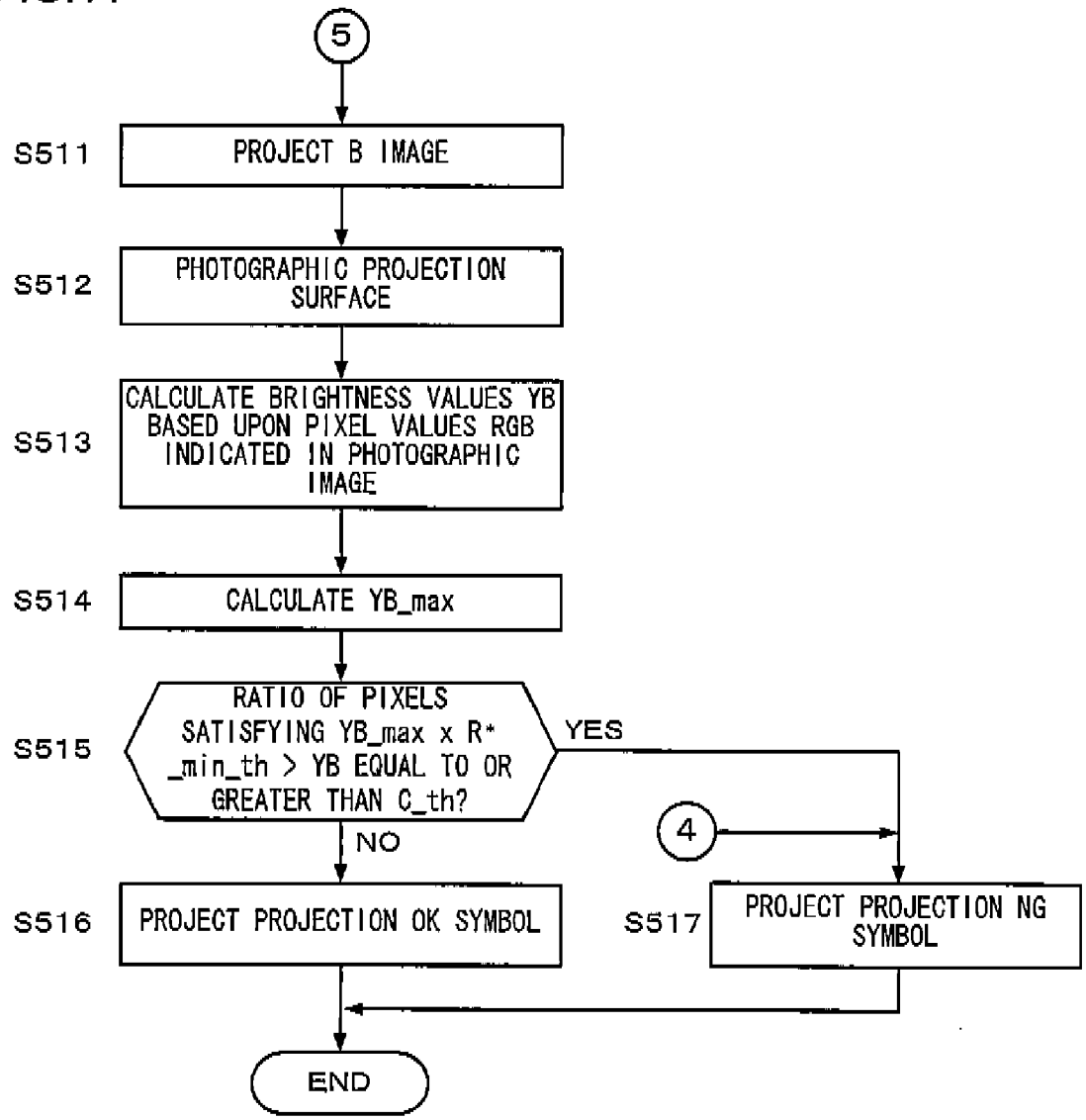

In reference to the flowchart presented in FIGS. 9-11, the projection surface decision-making processing executed in the fifth embodiment is described. The processing in FIGS. 9-11 is executed by the control circuit 101 based upon a program started up as projection start processing begins.

In step S501 in FIG. 9, an R image ((R, G, B)$_i$=(255, 0, 0)) is projected onto the projection surface via the projection unit 110. In step S502, a photographic image of the projection surface is captured by the photographic unit 120. In step S503, brightness values YR are calculated based upon the pixel values RGB indicated in the photographic image. In step S504, a maximum value YR*_max representing the largest value among the brightness values YR in the photographic image is calculated.

In step S505, pixels with brightness values YR thereof satisfying a relationship expressed as YR*_max·R*_min_th>YR, among all the pixels constituting the photographic image, are extracted and a decision is made as to whether or not the ratio of the extracted pixels to the overall number of pixels is equal to or greater than C_th. A negative decision is made in step S505 if the ratio of the number of extracted pixels to the overall number of pixels is less than C_th and in this case, the operation proceeds to step S506. An affirmative decision is made in step S505 if the number of extracted pixels to the overall number of pixels is equal to or greater than C_th and the operation proceeds to step S517.

In step S506 in FIG. 10, a G image ((R, G, B)$_i$=(0, 255, 0)) is projected onto the projection surface via the projection unit 110. In step S507, a photographic image of the projection surface is captured by the photographic unit 120. In step S508, brightness values YG are calculated based upon the pixel values RGB indicated in the photographic image. In step S509, a maximum value YG_max representing the largest value among the brightness values YG in the photographic image is calculated.

In step S510, pixels with brightness values YG_max thereof satisfying a relationship expressed as YG_max·R*_min_th>YG among all the pixels constituting the photographic image, are extracted and a decision is made as to whether or not the ratio of the extracted pixels to the overall number of pixels is equal to or greater than C_th. A negative decision is made in step S510 if the ratio of the number of extracted pixels to the overall number of pixels is less than C_th and in this case, the operation proceeds to step S511. An affirmative decision is made in step S510 if the number of extracted pixels to the overall number of pixels is equal to or greater than C_th and the operation proceeds to step S517.

In step S511 in FIG. 11, a B image ((R, G, B)$_i$=(0, 0, 255)) is projected onto the projection surface from the projection unit 110. In step S512, a photographic image of the projection surface is captured by the photographic unit 120. In step S513, brightness values YB are calculated based upon the pixel values RGB indicated in the photographic image. In step S514, a maximum value YB_max representing the largest value among the brightness values YB in the photographic image is calculated.

In step S515, pixels with brightness values YB thereof satisfying a relationship expressed as YB_max·R*_min_th>YB, among all the pixels constituting the photographic image, are extracted and a decision is made as to whether or not the ratio of extracted pixels to the overall number of pixels is equal to or greater than C_th. A negative decision is made in step S515 if the ratio of the number of extracted pixels to the overall number of pixels is less than C_th and in this case, the operation proceeds to step S516. An affirmative decision is made in step S515 if the number of extracted pixels to the overall number of pixels is equal to or greater than C_th and the operation proceeds to step S517.

In step S516, a projection OK symbol (O mark) indicating that the projection surface is suitable for projection is projected onto the projection surface via the projection unit 110. In step S517, a projection NG symbol (X mark) indicating that the projection surface is not suitable for projection is projected onto the projection surface via the projection unit 110.

In this embodiment, too, with a plurality of combinations of R*_min_th and C_th the projection surface may be judged to be suitable for projection if the ratios of pixels with brightness values Y (R, G, B) thereof satisfying the relationship expressed as Y (R, G, B)_max·R*_min_th>Y (R, G, B) are less than C_th, as in the third embodiment having been described in reference to FIG. 7.

The embodiments described above allow for the following variations.

(1) While the projection surface is evaluated to determine either it is suitable for projection or it is not suitable for projection, the projection surface may instead be subjected to a three-staged evaluation to determine; (i) that the projection surface is suitable for projection, (ii) that while part of the projection surface is not suitable for projection, the remaining area is suitable for projection or (iii) that the projection surface is not suitable for projection at all. In such a case, if the projection surface is judged to be suitable for projection, an O mark may be projected, if part of the projection surface is judged to be unsuitable for projection but the remaining area is determined to be suitable for projection, a triangle mark may be projected and if the projection surface is judged to be completely unsuitable for projection, an X mark may be projected. When the projection surface includes an area not suitable for projection, it is left to the user's discretion to determine whether or not to project an image onto the projection surface in this variation, thereby assuring improved ease of use, since the user may decide that a projection image display with a partial imperfection is acceptable.

(2) A decision is made as to whether or not the projection surface is suitable for projection based upon the maximum value ($Y_{MAX}$) among the brightness values Y indicated within the projection surface photographic image. Instead, a decision as to whether or not the projection surface is suitable for projection may be made based upon the average brightness of the brightness values indicated within the projection surface photographic image. In such a case, if the average brightness for the projection surface photographic image is greater than a predetermined value, the projection surface is judged to be suitable for projection, whereas if the average brightness for the projection surface photographic image is equal to or less than the predetermined value, the projection surface is judged to be unsuitable for projection.

(3) When making a decision, as to whether or not, from the perspective of chroma, the projection surface is suitable for projection, the pixel value data RGB expressing the projection surface photographic image may be converted to data in the XYZ colorimetric system, the data may be further converted to CIELAB data and the decision may then be made by using the value representing the chroma $C=\sqrt{(a^2+b^2)}$. In such a case, a threshold value for C should be stored in advance in correspondence to each luminance level L, since the value for C, dependent upon the luminance L, cannot assume a uniform value.

(4) The numerical values quoted in relation to R*_min_th and C_th in the description of the embodiments are only examples and the present invention is not limited in any way whatsoever to those values quoted in reference to the embodiments, since the optimal numerical values for R*_min_th and C_th change in correspondence to the characteristics of the projector 1 (the range over which uneven illumination, defects or the like may be tolerated) or the specific method adopted for projection image correction. For instance, provided that the extent to which the LED light source 113 is driven can be increased by a factor of x, R*_min_th may assume a value approximately 1/x of the values set in the embodiments.

(5) The user may be notified of the decision-making results indicating whether or not the projection surface is suitable for projection through means other than the X mark 31 projected onto the projection surface 30. For instance, provided that the projector includes a display unit, the condition of the projection surface may be reported to the user through a projection surface OK display or a projection surface NG display at the display unit.

(6) The decision as to whether or not the projection surface is suitable for projection may be made by taking into consideration the specificity of the projection image as well. For instance, if the projection image is a photographic image of blue sky, a pattern or the like on the projection surface is bound to show up in the projection image and accordingly, the decision as to whether or not the projection surface is suitable for projection should be made in reference to more rigorous decision-making criteria. In other words, a projection surface that includes even a small area with a noticeable pattern or the like may be judged unsuitable for projection. If, on the other hand, the projection image is a photographic image of a jungle, the pattern at the projection surface will be practically invisible in the complex projection image and accordingly, the decision as to whether or not the projection surface is suitable for projection may be made by setting less rigorous decision-making criteria. Namely, even a projection surface that includes a small area with a fairly noticeable pattern or the like may be judged to be suitable for projection.

The projection image evaluation, which would affect the decision-making criteria in reference to which the projection surface is judged to be suitable or unsuitable for projection as described above, may be executed as described in (A) or (B) below.

(A) The distribution of frequency components in the projection image data may be investigated. In this case, the decision as to whether or not the projection surface is suitable for projection should be made by setting less rigorous decision-making criteria in conjunction with projection image data with significant presence of a high frequency component, since such image data express an image with fine structural details, e.g., an image of a jungle. However, the decision as to whether or not the projection surface is suitable for projection should be made by setting more rigorous decision-making criteria in conjunction with projection image data without any significant presence of a high frequency component, since such image data are likely to express an image with broad structural features, e.g., an image of blue sky.

The projection image data may be binarized in reference to a predetermined edge intensity threshold value by using, for instance, a Laplacian filter. Based upon the binarized image, the projection image should be judged to be either an image with fine structural details or an image with broad structural features. For instance, the projection image may be judged to be an image with fine structural details if the ratio of the number of pixels with edge intensity levels greater than the threshold value to the number of pixels constituting the overall projection image is equal to or greater than a predetermined value.

(B) The projection image may be judged to be either an image with fine structural details or an image with broad structural features based upon the difference between the projection image and an image obtained by repeatedly reducing and enlarging the projection image. Such processing may be executed by using the Laplacian pyramid model described below.

Namely, a reduced image is created by reducing the projection image by a factor of ½. The image having been reduced by a factor of ½ is then enlarged by a factor of 2 and the difference between the projection image and the enlarged image is determined. The difference thus determined represents a high frequency component. By further repeating the process of obtaining an image representing the difference between an image resulting from repeated reduction by the factor of ½ and enlargement by the factor of 2, and the projection image, specific frequency components can be separated. An image representing the difference between the projection image and an image resulting from a predetermined number of reductions by the factor of ½ and enlargements by the factor of 2, is then binarized in reference to a predetermined threshold value. Then, based upon the binarized image data, the projection image can be judged to be either an image with fine structural details or an image with broad structural features.

The threshold value in reference to which the data are binarized should be adjusted depending upon the desired extent to which edge component data should be extracted or depending upon the noise level in the projection image (which, in turn, depends upon the luminance level at which the photographic image of the projection image is captured). For instance, the threshold value may be set to, for instance, approximately 10 in conjunction with eight-bit gradation data.

The projection image may be divided into image areas with fine structural details and image areas with broad structural features based upon an image having undergone edge enhancement, as described above, and the projection image may be corrected only over the image areas with broad structural features without correcting the projection image over areas with fine structural details.

(7) In the projector achieved in the third embodiment, three different minimum reflectance levels R*_min_th2, R*_min_th3 and R*_min_th4 and three threshold values C_th2, C_th3 and C_th4 are set and a decision as to whether or not the projection surface is suitable for image projection is made in reference to three decision-making reference values, i.e., the first decision-making reference value representing the product R*_min_th2×C_th2, the second decision-making reference value representing the product R*_min_th3×C_th3 and the third decision-making reference value representing the product R*_min_th4×C_th4. However, the number of reference values used as decision-making criteria is not limited to three. In other words, N (N is a natural number equal to or greater than 3) different minimum reflectance values $R_i$ (i=1, 2, . . . N) and N different threshold values $C_i$ (i=1, 2, . . . N) may be set and the decision as to whether or not the projection surface is suitable for image projection may be made in reference to N decision-making reference values each representing a product $R_i \times C_i$(i=1, 2, . . . N). In such a case, the minimum reflectance value $R_j$ corresponding to i set to j should assume a value smaller than the value set for the minimum reflectance $R_{j+1}$ corresponding to i set to j+1 and the threshold value $C_j$ corresponding to i set to j should be smaller than the threshold value $C_{j+1}$ corresponding to i set to j+1 (j=1, 2, . . . N−1).

(8) The projector achieved in the fifth embodiment evaluates the projection surface by projecting an R image ((R, G, B)$_i$=(255, 0, 0)), a G image ((R, G, B)$_i$=(0, 255, 0)) and a B image ((R, G, B)$_i$=(0, 0, 255)) onto the projection surface. However, as long as primary color pixel images of the projector are projected onto the projection surface for projection surface evaluation, the primary color pixel images that may be projected onto the projection surface are not limited to the R image, the G image and the B image.

—Sixth Embodiment—

The following is a description of the sixth embodiment of the present invention, given in reference to drawings. The projector according to the present invention is capable of reporting to the user the presence of any extremely dark (low-brightness) area or any high chroma area (or any highly saturated area) within the projection surface.

The front view of the projector 1 in FIG. 1 and the block diagram showing the structure of the projector 1 in FIG. 2 also apply to the projector in the embodiment and a repeated explanation is not given in reference to these drawings.

In reference to FIG. 12, a projection image that may be displayed by projecting a projection image having undergone image processing is described. The description is given by assuming that there is a stain 121 on a projection surface 30. If an area with extremely low brightness, such as the stained area 121, is present on the projection surface 30, a frame 122 enclosing the stain 121 or an arrow 123 pointing to the stain 121 is brought up on display as a warning, as shown in FIG. 12(a). The warning thus brought up on display will prompt the user to erase the stain 121 if the stain 121 is a mark left on a whiteboard. If the stain 121 cannot be removed, the user will be able to select another location for the projection surface. As a result, a good quality projection image 124 can be projected onto the projection surface 30, as shown in FIG. 12(b). However, if the stain 121 is not removed or another location is not selected for the projection surface, image processing will be executed on the projection source image so as to render the stain 121 less noticeable. As a result, a projection image 125 with an extremely narrow dynamic range and greatly compromised quality will be projected as shown in FIG. 12(c).

Figure 13:
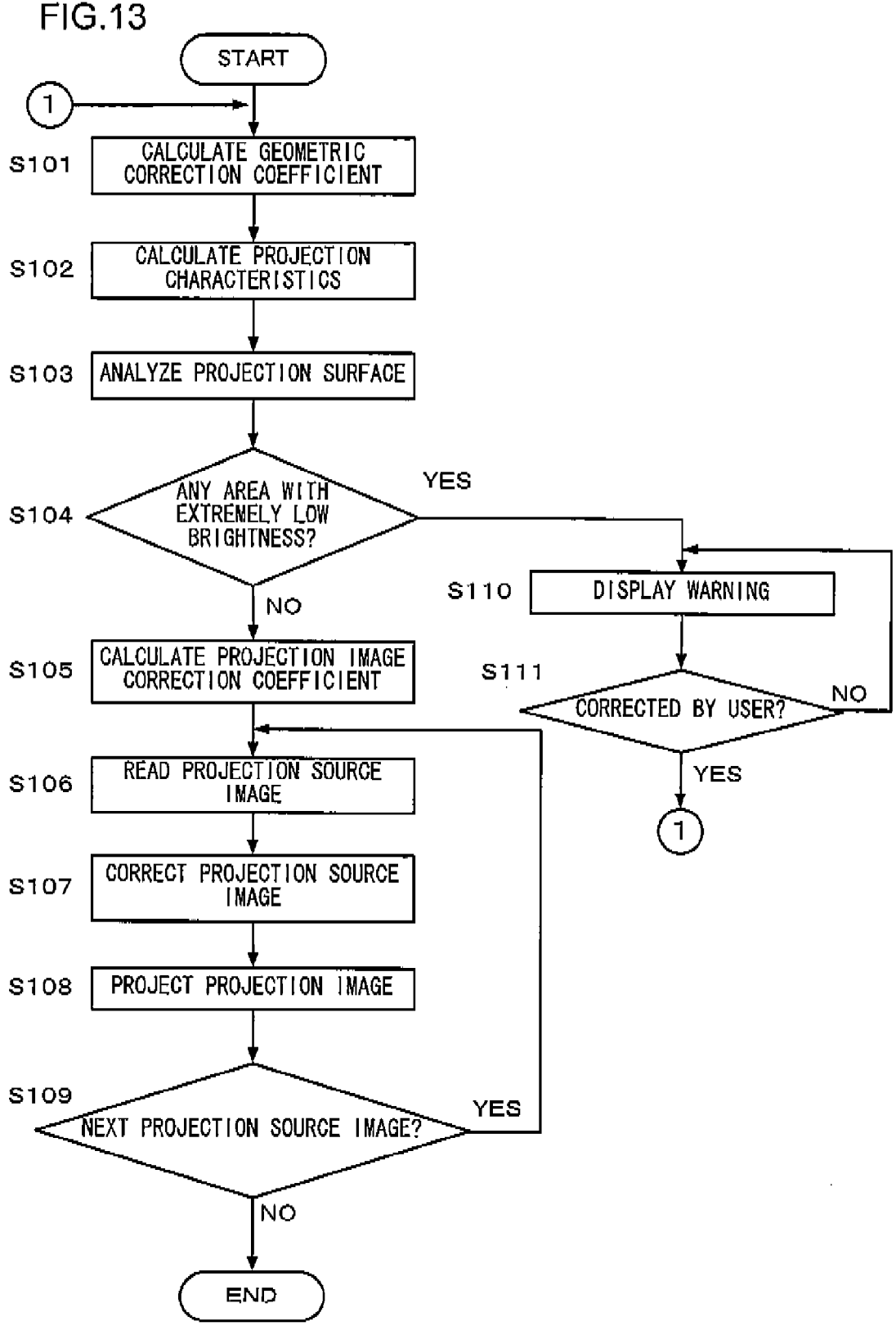

In reference to the flowchart presented in FIG. 13, the image processing executed in the embodiment of the present invention is described. The processing in FIG. 13 is executed by the control circuit 101 based upon a program started up as projection start processing begins.

In step S101, a geometric correction coefficient to be used in geometric correction of the projection source image is calculated. The geometric correction is executed in order to correct flaring, distortion and the like that will occur in the projection image when the optical axis of the imaging optical system 110 fails to extend perpendicular to the projection surface, as well as distortion in the projection image when the optical axis of the projection optical system 111 and the optical axis of the imaging optical system 121 are not in alignment. Since the geometric correction coefficient can be calculated through a method known in the related art, an explanation is not provided.

The image processing unit 101A in the control circuit 101 executes interpolation processing so as to adjust the number of pixels constituting the image having been photographed via the photographic unit 120, to match the resolution of the projector 1. The image processing unit 101A executes interpolation processing so as to adjust the image having been photographed via the photographic unit 120, to match the resolution of the projector 1. The photographic image having undergone the interpolation processing is used in the correction processing as described below to correct the projection source image having undergone the interpolation processing mentioned earlier, and the image thus corrected is projected. The interpolation processing is executed in order to improve the processing speed by clearly defining the correspondence between the pixels constituting the projection image and the pixels constituting the photographic image.

In step S102, the projection characteristics of the projection unit 110 are determined through calculation. The projection characteristics determined in this step indicate the relationship between pixel values (R, G, B) indicated in the input image and colorimetric values (X, Y, Z) detected in the projection image reproduced on the projection surface. The colorimetric values are affected by uneven illumination provided by the projection unit 110, any color or pattern that may be present at the projection surface and the brightness at the projection surface attributable to ambient illumination. Accordingly, a plurality of specific projection images represented by known pixel values (R, G, B) are projected via the projection unit 110, and a photographic image of each projection image projected onto the projection surface is captured with the photographic unit 120. As detailed later, the specific projection images are a white image, a black image, an R image, a G image or a B image. The projection characteristics are calculated by detecting the colorimetric values (X, Y, Z) from the photographed images. The input image is first corrected with a projection image correction coefficient determined based upon the projection characteristics and then the corrected image is projected. Thus, a desirable projection image, unaffected by uneven illumination provided from the projection unit 110, any color or pattern that may be present on the projection surface or the luminance at the projection surface attributable to ambient illumination is obtained. As a result, the user is able to view a projection image expressed similar in appearance to the input image. Specific processing that may be executed to determine the projection characteristics is to be described later.

In step S103, the projection surface is analyzed. A white image is projected from the projection unit 110 onto the projection surface and a photographic image of the projection surface with a white image projected thereupon is captured via the photographic unit 120. The photographed image is analyzed and any area with extremely low brightness is extracted as a warning target area. Specific processing that may be executed in this step will be described later.

In step S104, a decision is made as to whether or not there is any area with extremely low brightness within the projection surface. An affirmative decision is made in step S104 if the projection surface includes an area with extremely low brightness and in this case, the operation proceeds to step S110. However, a negative decision is made in step S104 if there is no area with extremely low brightness within the projection surface, and the operation proceeds to step S105.

In step S105, a projection image correction coefficient is calculated. Namely, based upon the projection characteristics determined in step S102, a correction coefficient to be applied to the projection source image is calculated so as to provide a projection image replicating the projection source image with fidelity, unaffected by the conditions at the projection surface, the ambient illumination conditions or the like. The projection image correction coefficient is calculated by capturing via the photographic unit 120 a projection image projected by the projection unit 110 and analyzing the photographed image. This correction coefficient represents the correction quantity indicating the extent to which the projection source image is to be corrected. This processing, too, is to be described in detail later.

In step S106, the image data expressing the projection source image are read either via the external interface circuit 104 or from the memory card 150 and the image data thus read are stored into the memory 102. In step S107, the projection source image data having been read in step S106 are corrected by using the correction coefficient calculated in step S105. In step S108, the projection source image data having been corrected in step S107 are converted to analog data and the resulting data are projected as the projection image.

In step S109, a decision is made as to whether or not there is another set of projection source image data to be processed for a next projection. If there is another set of projection source image data to be processed for a next projection, an affirmative decision is made in step S109 and the operation returns to step S106. If there are no more projection source image data to be processed for projection, a negative decision is made in step S109 and the processing ends.

In step S110, a warning, in the form of a frame enclosing the area having been extracted in step S103 or an arrow pointing to the extracted area, is brought up on display.

In step S111, a decision is made as to whether or not the user has taken corrective action. The user, having taken action to eliminate the low-brightness area at the projection surface indicated by the warning display, then operates the operation unit 103 in order to input a signal indicating that the low-brightness area has been eliminated to the projector 1. Based upon the signal input thereto, the control circuit 101 is able to judge whether or not the user has taken corrective action. The user may eliminate the area with extremely low brightness within the projection surface by erasing the area with extremely low brightness from a whiteboard or by selecting another location for the projection surface if the area with extremely low brightness cannot be erased. An affirmative decision is made in step S111 if the user has taken corrective action and the operation returns to step S101. If the user has not taken any corrective action, a negative decision is made in step S111 and the operation returns to step S110.

Next, the processing executed in steps S102, S103 and S105 is described in further detail.

—Projection Characteristics Calculation—

The calculation executed in step S102 to determine the projection characteristics is now described.

When a projection image generated based upon projection source image data assuming a pixel value $(R, G, B)_i$ at an ith pixel thereof is projected via the projection unit 110, the colorimetric value $(X, Y, Z)_i$ assumed on the projection surface in correspondence to the pixel value at the ith pixel is expressed as in (11) below.

(Expression 11)

$$\begin{bmatrix} X \\ Y \\ Z \end{bmatrix}_i = R_i^* \cdot \left[ M_{pi} \cdot \begin{bmatrix} R^\gamma \\ G^\gamma \\ B^\gamma \end{bmatrix}_i + \begin{bmatrix} X_{kp} \\ Y_{kp} \\ Z_{kp} \end{bmatrix}_i \right] \qquad (11)$$

$$= M_i \cdot \begin{bmatrix} R^\gamma \\ G^\gamma \\ B^\gamma \end{bmatrix}_i + \begin{bmatrix} X_k \\ Y_k \\ Z_k \end{bmatrix}_i$$

Note that the expression above adopts substitutions expressed in (12) and (13) below.

(Expression 12)

$$M_i = R_i^* \cdot M_{pi} \qquad (12)$$

(Expression 13)

$$\begin{bmatrix} X_k \\ Y_k \\ Z_k \end{bmatrix}_i = R_i^* \cdot \begin{bmatrix} X_{kp} \\ Y_{kp} \\ Z_{kp} \end{bmatrix}_i \qquad (13)$$

$\gamma$ represents the gradation characteristics of the projection unit 110. $M_{pi}$ represents the color conversion matrix used when converting a pixel value $(R^\gamma, G^\gamma, B^\gamma)_i$ corresponding to the projection unit 110 to a colorimetric value representing the illumination provided via the projection unit 110. $(X_{kp}, Y_{kp}, Z_{kp})_i$ represents the illumination conditions at the projection surface including the ambient illumination, under which a black image is projected via the projection unit 110. $R_i^*$ represents the reflectance characteristics manifesting at the projection surface.

The subscript i is used for the following purposes. The projector 1 corrects uneven conditions within the surface attributable to uneven illumination conditions at the projection unit 110, ambient illumination and a black spot, in addition to uneven conditions pertaining to the reflectance at the projection surface attributable to a pattern or the like at the projection surface (these uneven conditions are hereafter collectively referred to as "non-uniformity"), based upon an image of the projection surface captured by projecting an image with known pixel values, such as a white image or a black image. Accordingly, the subscript i is used to indicate the projection characteristics that may vary from one pixel area to another at the projection surface.

$(X_k, Y_k, Z_k)_i$ in expression (11) is determined based upon the projection surface photographic image obtained by projecting a black image $((R, G, B)_i = (0, 0, 0)_i)$. It is to be noted that the colorimetric value assumed in the projection image projected on the projection surface can be calculated through a predetermined type of color conversion processing executed by using the pixel value indicated in the photographic image. Assuming that the photographic image is profiled with sRGB data, $(X_k, Y_k, Z_k)_i$ can be determined by executing standard sRGB conversion processing on the pixel value.

Likewise, 3×3 matrix coefficients in the color conversion matrix $M_i$ are determined based upon photographic images obtained by capturing images of the projection surface onto which an R image $((R, G, B)_i = (255, 0, 0)_i)$, a G image $((R, G, B)_i = (0, 255, 0)_i)$ and a B image $((R, G, B)_i, (0, 0, 255)_i)$ are individually projected. In more specific terms, with $(X_r, Y_r, Z_r)_i$, $(X_g, Y_g, Z_g)_i$ and $(X_b, Y_b, Z_b)_i$ respectively indicating the colorimetric values in the projection surface photographic images obtained by projecting the R image, the G image and the B image, the color conversion matrix $M_i$ may be expressed as in (14) below.

(Expression 14)

$$M_i = \begin{bmatrix} X_r - X_k & X_g - X_k & X_b - X_k \\ Y_r - Y_k & Y_g - Y_k & Y_b - Y_k \\ Z_r - Z_k & Z_g - Z_k & Z_b - Z_k \end{bmatrix}_i \qquad (14)$$

—Projection Surface Analysis—

The processing executed in step S103 to analyze the projection surface is now described.

A photographic image obtained by capturing an image of a projection surface manifesting a non-uniformity or a projection surface with a pattern present thereupon will assume pixel values reflecting the non-uniformity or the pattern instead of uniform pixel values. In other words, the color gamut allowing the maximum level display changes from one pixel to another. In this embodiment, the range of the color gamut over which the maximum level display is enabled is first determined. The brightness $Y_i$ at the projection surface may be calculated as expressed in (15) based upon expression (11).

(Expression 15)

$$Y_i = (Y_r - Y_k) \cdot R_i^\gamma + (Y_g - Y_k) \cdot G_i^\gamma + (Y_b - Y_k) \cdot B_i^\gamma + Y_k \quad (15)$$

Accordingly, the range of brightness over which the image can be displayed is determined in correspondence to the range that may be assumed for $Y_i$ when $0 \leq R_i \leq 255$, $0 \leq G_i \leq 255$ and $0 \leq B_i \leq 255$ in expression (14). Since $Y_r > Y_k$, $Y_g > Y_k$ and $Y_b > Y_k$ under normal circumstances, the range of brightness at which the data at a given pixel can be displayed can be defined by the display brightness assumed when a white image $((R, G, B)_i = (255, 255, 255)_i)$ is projected, which is designated as a display-enabling maximum brightness $Y_{MAX,\,i}$, and the display brightness assumed when a black image is projected, which is designated as the display enabling minimum brightness $Y_{MIN,\,i}$.

For instance, if the projection surface is a white surface that includes a dark area as shown in FIG. 12(a), histograms such as those in FIGS. 14(a) and 14(b) may be calculated for $Y_{MAX,\,i}$ and $Y_{MIN,\,i}$ within the projection surface.

If the projection source image is to be corrected so as to render any non-uniformity or pattern at the projection surface completely invisible, it must be ensured that the maximum brightness $Y_{MAX}$, in the projected image is adjusted to MIN $(Y_{MAX,\,i})$ through correction and that the minimum brightness $Y_{MIN}$ in the projected image is adjusted to MAX($Y_{MIN,\,i}$) through correction. However, the dynamic range of the projection image resulting from such correction will be extremely narrow and thus, the quality of the corrected projection image will be poor (see FIG. 12(c)).

Accordingly, any area on the projection surface with the brightness level thereof lower than a predetermined maximum brightness threshold value $Y_{th}$ is extracted as a warning display area. The maximum brightness threshold value $Y_{th}$ may be a fixed value (e.g., $Y_{th} = 0.2$ relative to the white brightness value Y of 1.0) universally applicable to all types of images, may be the brightness value indicated at a pixel marking a point that represents a ratio equal to or greater than a predetermined ratio counting from the lowest brightness level in the histogram presented in FIG. 14(a), or may be a value indicating a predetermined ratio (e.g., 20%) to the maximum brightness level $Y_{MAX} = \text{MAX}(Y_{MAX,\,i})$ within the plane of the image projected onto the projection surface.

—Calculation of Projection Image Correction Coefficient—

The processing executed in step S105 to calculate the projection image correction coefficient is described.

Assuming that the projection source image is expressed in the sRGB color space, the pixel value (R, G, B), of the corrected image to be input to the projection unit 110 can be calculated as expressed in (16) below relative to the pixel value $(R_0, G_0, B_0)$ assumed in the projection source image.

(Expression 16)

$$\begin{bmatrix} R^\gamma \\ G^\gamma \\ B^\gamma \end{bmatrix}_i = (M_i)^{-1} \cdot \begin{bmatrix} (Y_{MAX} - Y_{k0}) \cdot M_{sRGB \to XYZ} \cdot \begin{bmatrix} R_0^{2.2} \\ G_0^{2.2} \\ B_0^{2.2} \end{bmatrix}_i + \begin{bmatrix} X_{k0} \\ Y_{k0} \\ Z_{k0} \end{bmatrix} - \begin{bmatrix} X_k \\ Y_k \\ Z_k \end{bmatrix}_i \end{bmatrix} \quad (16)$$

The correction coefficient to be used to correct the projection source image as expressed in (16) is calculated by using $M_i$ and $(X_k, Y_k, Z_k)_i$ having been calculated in step S102 and $Y_{MAX}$ having been calculated in step S103. It is to be noted that the pixel value indicated at a pixel position i, at which $Y_{MIN,\,i} = Y_{MIN}$ is true when a black image is projected onto the projection surface, is designated as a black spot pixel value $(X_{k0}, Y_{k0}, Z_{k0})$ in the projection image.

$M_{sRGB \to XYZ}$, represents a conversion matrix used to convert sRGB data to XYZ data, which is predetermined in compliance with the specifications. The expression above is written by assuming that $\gamma = 2.2$ in the sRGB space for purposes of simplification. However, the pixel value may be calculated by combining a linear function and a $\gamma$ set to 2.4 in compliance with the specifications.

It is to be noted that while an explanation is given above on an example in which the operation proceeds to step S111 after bringing up a warning on display in step S110 and an affirmative decision is made in step S111 upon judging that the user has taken corrective action to return to step S101, the operation may instead return to step S101 immediately after bringing up a warning on display in step S110. In the alternative processing routine, if the projection surface includes an area with extremely low brightness, the control circuit 101 will repeatedly execute the processing in steps S101 through S104 and step S110 after the projector 1 enters the power on state, until projection source image signals are input. After the area with extremely low brightness at the projection surface is eliminated through user action or the like, the processing will proceed from step S104 to step S105, enabling the projector 1 to automatically start projection. In this case, better user convenience is assured since the user is not required to indicate via the operation unit 103 that corrective action has been taken.

The following advantage is achieved through the embodiment described above.

If the projection surface includes an area with low brightness, a warning message indicating the presence of a low-brightness area and indicating the location of the low-brightness area is brought up on display at the projection surface. In response, the user is able to take action to eliminate the low-brightness area from the projection surface and thus, it can be ensured that the dynamic range of the corrected projection image as a whole does not become extremely narrow due to the presence of the low-brightness area.

The user may eliminate the low-brightness area from the projection surface by erasing the area indicated by the warning brought up on display from the whiteboard or by shifting the projection surface away from the dark area indicated by the warning brought up on display if the dark area is not erasable.

Elimination of the low-brightness area from the projection surface through user action makes it possible to prevent the dynamic range of the entire projection image from becoming too narrow through correction for the following reason. Namely, if an image was to be projected onto the projection surface 30 shown in FIG. 12(a) (manifesting the brightness distribution shown in FIG. 14(a) when a white image is projected and manifesting the brightness distribution shown in FIG. 14(b) when a black image is projected), the correction attempting to render the pattern on the projection surface less visible would result in a reduced dynamic range due to a limited projection image brightness reproducible range defined by the maximum brightness $Y_{MAX}=$ MIN$(Y_{MAX, i})$=Y2 and the minimum brightness $Y_{MIN}$=MAX$(Y_{MIN, i})$=Y3. However, if the dark area 121 located at an upper right position in FIG. 12(a) is eliminated from the projection surface 30 through corrective user action, the brightness distribution manifesting when the white image is projected will be improved from that shown in FIG. 14(a) to that shown in FIG. 14(c) and thus, the reproducible brightness range can be widened to the range defined by the maximum brightness $Y_{MAX}$=MIN$(Y_{MAX, i})$=Y1 and the minimum brightness $Y_{MIN}$=MAX$(Y_{MIN, i})$=Y3. Namely, by simply extracting the area 121 that cannot be corrected with ease due to low brightness thereat and providing a warning 122 or 123 indicating the area 121 at the projection surface 30, undesirable overcorrection is prevented and a projection image 124 can be reproduced with better fidelity.

—Seventh Embodiment—

In the sixth embodiment, any area with extremely low brightness at the projection surface is eliminated through user action. Such an area with extremely low brightness at the projection surface is eliminated from the projection surface in the seventh embodiment by reducing the projection size, i.e., the areal range of the image plane of the projection image projected via the projection unit 110, instead. Through these measures, any area with extremely low brightness at the projection surface can be eliminated automatically and thus, the projector 1 can be utilized with improved convenience. For instance, there may be a stain 121 present on the projection surface 30, as shown in FIG. 15(a). In such a case, the projection size for a projection image 126 is reduced so that the projection image will not be superimposed on the stain 121, as shown in FIG. 15(b). As a result, since projection source image correction, which would result in a greatly narrowed projection image dynamic range due to the presence of the stain 121, is not executed, the quality of the projection image will not be compromised.

Figure 16:
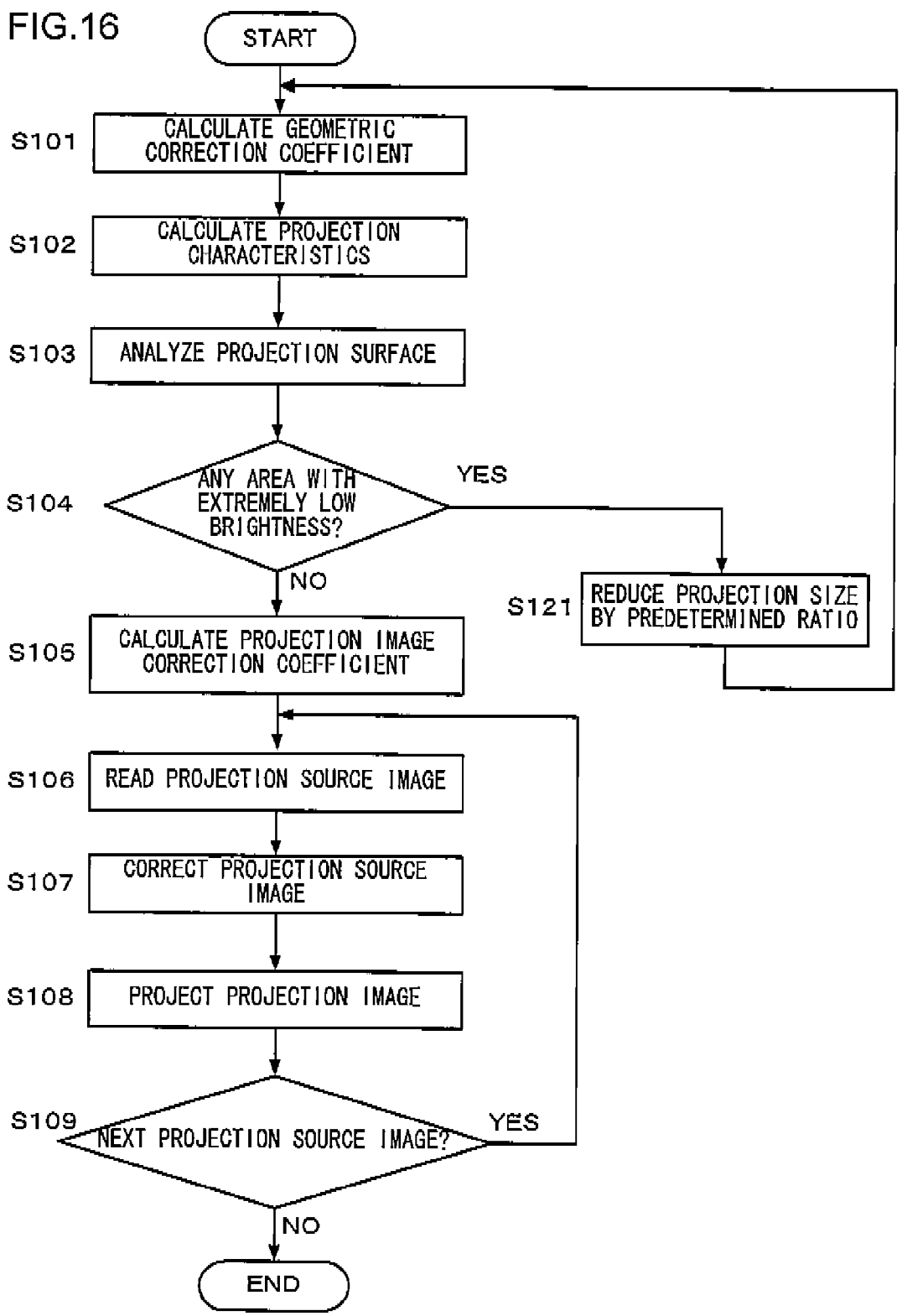

In reference to the flowchart presented in FIG. 16, the image processing executed to reduce the projection size of the projection image is described. The processing in FIG. 16 is executed by the control circuit 101 based upon a program started up as projection start processing begins. The same step numbers are assigned to steps in which processing identical to the processing in FIG. 13 is executed and the following explanation focuses on processing different from that in FIG. 13.

Upon making an affirmative decision in step S104, the operation proceeds to step S121. In step S121, the projection size of the projection image is reduced by a predetermined ratio. The operation then returns to step S101.

If the presence of the area with extremely low brightness cannot be eliminated from the projection surface even after reducing the projection size of the projection image to the predetermined size (e.g., if the area with extremely low brightness is located near the center of the projection surface), a warning indicating the area with extremely low brightness may be brought up on display so as to prompt the user to take action to ensure that a projection surface without any area with extremely low brightness will be used for projection, as in the previous embodiments of the present invention.

—Eighth Embodiment—

In the sixth embodiment, any area with extremely low brightness at the projection surface is eliminated through user action. In the eighth embodiment, such an area with extremely low brightness at the projection surface is eliminated from the projection surface by shifting the projection position at which the projector projects the projection image via the projection unit 110 and also reducing the projection size, i.e., the areal range of the projection image projected via the projection unit 110, instead. Through these measures, any area with extremely low brightness at the projection surface can be eliminated automatically and thus, the projector 1 can be utilized with improved convenience. In addition, the projection image can be projected over a greater projection range, i.e., the projection size, compared to the seventh embodiment. For instance, if there is a stain 121 present on the projection surface 30, as shown in FIG. 17(a), the projection position at which the projection image 127 is projected is shifted and the projection size is reduced so as to ensure that the image will not be superimposed on the stain 121, as shown in FIG. 17(b). As a result, since projection source image correction, which would result in a greatly narrowed projection image dynamic range is not executed, the quality of the projection image will not be compromised. In this embodiment, the projector 1, which needs to determine how the projection image may best be shifted, engages the photographic unit 120 in operation to capture a photographic image of a greater area (hereafter referred to as a wide-range projection area) 40 ranging over a greater area than the projection surface 30 when detecting any area with extremely low brightness.

Figure 18:
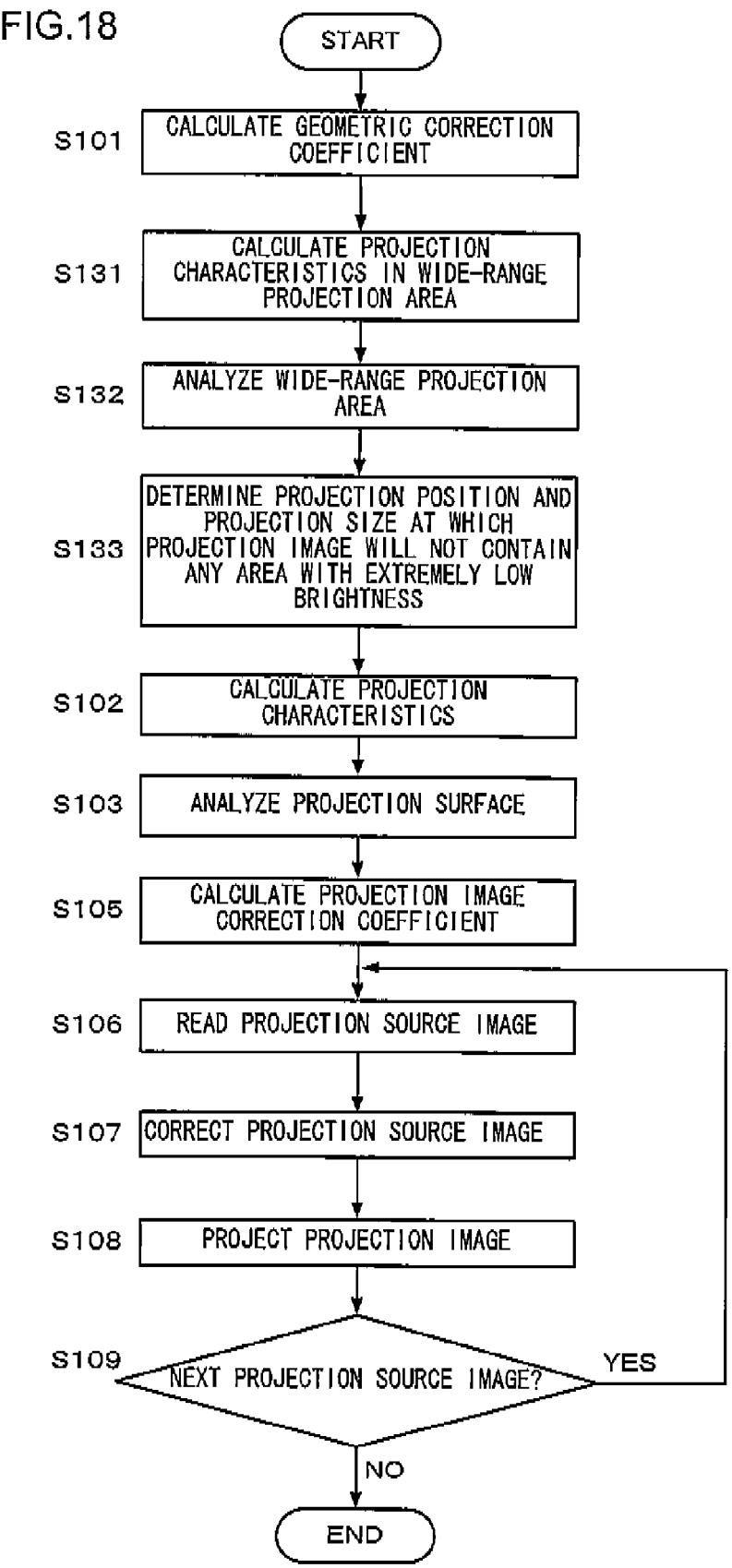

In reference to the flowchart presented in FIG. 18, the image processing executed to shift the projection position for the projection image and reduce the projection size of the projection image is described. The processing in FIG. 18 is executed by the control circuit 101 based upon a program started up as projection start processing begins. The same step numbers are assigned to steps in which processing identical to the processing in FIG. 13 is executed and the following explanation focuses on processing different from that in FIG. 13.

Upon completing the processing in step S101, the operation proceeds to step S131. In step S131, the projection characteristics manifesting over the wide-range projection area are calculated. The projection characteristics over the wide-range projection area are calculated by capturing via the photographic unit 120 a photographic image of a projection image with a greater projection size than normal, i.e., a projection image ranging over the wide-range projection area, projected via the projection unit 110, and by detecting colorimetric values in the photographed image.

In step S132, the wide-range projection area is analyzed. A white image is projected from the projection unit 110 onto the wide-range projection area and a photographic image of the wide-range projection area onto which a white image is projected is captured with the photographic unit 120. Then, any area with extremely low brightness in the wide-range projection area is extracted by analyzing the photographed image.

In step S133, the optimal projection position and the optimal projection size for the projection image, at which any area with extremely low brightness will not be included in the projection image plane, are determined. In more specific terms, the position and the size of a rectangular area with an aspect ratio matching that of the projection image plane are adjusted within the wide-range projection area by ensuring that the rectangular window does not include any area with extremely low brightness. Then, the optimal projection position and projection size for the projection image are determined so that the position and the size of the projection image plane match those of the largest rectangular area among the rectangular areas assuming various positions and sizes. The operation then proceeds to step S102.

Since the projection position and the projection size for the projection image plane have been determined by ensuring that any area with extremely low brightness will not be included in the projection image plane, the operation proceeds from step S103 to step S105.

In this embodiment, too, if the presence of the area with extremely low brightness cannot be eliminated from the projection surface even after reducing the projection size of the projection image to the predetermined size, a warning indicating the area with extremely low brightness may be brought up on display so as to prompt the user to take action.

The embodiments described above allow for the following variations.

(1) In step S103 in the sixth and seventh embodiments and step S132 in the eighth embodiment, a photographic image of the projection surface onto which a white image is projected is captured, the photographic image is analyzed and any area with extremely low brightness is extracted in order to facilitate execution of a brightness correction. As an alternative, any area with extremely low brightness may be extracted by individually projecting an R image (with all pixels invariably assuming pixel values of; R=255, G=B=0), a G image (with all pixels invariably assuming pixel values of; G=255, R=B=0) and a B image (with all pixels invariably assuming pixel values of; B=255, R=G=0) and analyzing photographic images of the projection surface onto which the R, G and B images are projected. Through these measures, any area at the projection surface where effective correction is not likely to be achieved due to a high level of chroma can be extracted with ease. Then, by shifting the projection surface away from the area where effective correction will not be achieved due to high chroma, undesirable overcorrection, which would result in a narrowed chroma dynamic range, can be prevented and a better looking projection image can be realized.

(2) In the sixth embodiment, a warning is brought up on display whenever the presence of an area with extremely low brightness is detected at the projection surface. However, such a warning may be brought up on display by taking into consideration the areal size and/or the position of the area with extremely low brightness. In other words, an area with extremely low brightness taking up a certain areal range or a certain position may not greatly detract from the appearance of the projection image even if it remains visible through the projection image plane. Under such circumstances, the image processing for the projection source image may be executed by disregarding the area with extremely low brightness without bringing up on display a warning to prompt the user to eliminate the dark area, so as to ensure that the dynamic range of the projection image will not become too narrow.

(3) The threshold value $Y_{th}$ used in step S103 in the sixth through eighth embodiments may be adjusted in correspondence to the characteristics of the projection unit 110 (the allowable range over which uneven illumination, defects or the like are tolerated), the specific correction method that is adopted (e.g., whether or not the projection source image is to be corrected to the point where even the darkest area within the projection surface is rendered unnoticeable or whether or not processing for lessening the correction quantity based upon the dark area conditions (the areal site of the dark area, the position of the dark area, the degree of darkness and the like) is to be executed) or the like.

(4) When the projection surface includes an area with extremely low brightness, the luminance at the LED light source 113 may be increased by raising the level of power supplied to the LED light source 113 in the projection unit 110. As explained earlier, image processing executed on the projection source image in order to render an area with extremely low brightness less noticeable is likely to result in a narrower projection image dynamic range. However, the dynamic range of the projection image can be widened by increasing the luminance of the LED light source 113 to assure better quality for the projection image.

—Ninth Embodiment—

The following is a description of the ninth embodiment of the present invention given in reference to drawings. In order to reduce the length of time to elapse before starting the projection operation, the projector according to the present invention projects a projection image corrected by using a predetermined correction coefficient until the calculation of the correction coefficient can be used to correct projection images is completed.

The front view of the projector 1 in FIG. 1 and the block diagram showing the structure of the projector 1 in FIG. 2 also apply to the projector in the embodiment and a repeated explanation is not given in reference to these drawings.

Figure 19:
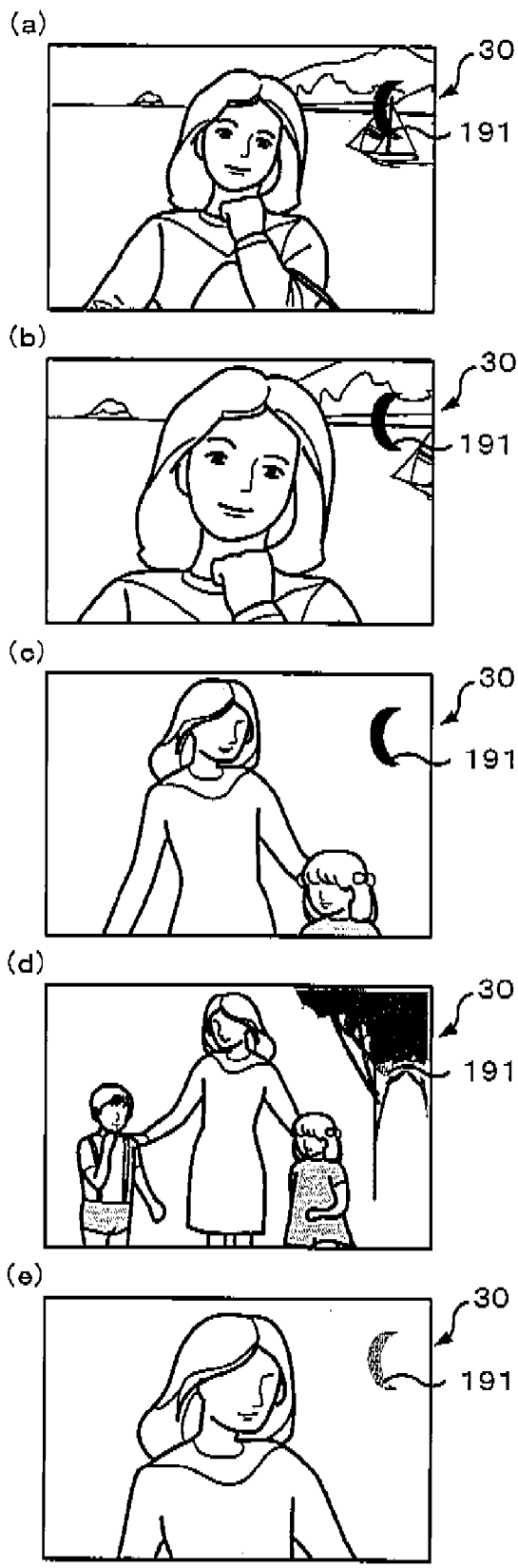

In reference to FIG. 19, the image processing executed in the embodiment of the present invention on projection images is described. FIGS. 19(a) through 19(c) show projection images that are viewed as they are sequentially projected onto a projection surface 30. The description is given by assuming that a stain 191 is present at the projection surface 30. In the image processing executed for projection images in the embodiment of the present invention, a correction coefficient is calculated based upon a photographic image obtained by capturing an image of the projection surface onto which a specific projection image is projected. Then, based upon the correction coefficient, a projection image is corrected so as to render the stain 191 at the projection surface 30 less noticeable. The processing executed to calculate this correction coefficient requires a considerable length of time.

In order to address this issue, a correction coefficient assuming an initial value determined through advance calculation is used to correct projection images until the correction coefficient is calculated. The projection images projected as shown in FIGS. 19(a) through 19(c) before the correction coefficient is calculated are corrected by using the correction coefficient initial value. The stain 191 at the projection surface 30 onto which the projection images are projected appears as shown in FIGS. 19(a) through 19(c). However, since the projection operation is started promptly, the user does not feel frustrated by a lengthy delay in the projection start. Once the correction coefficient has been calculated, projection images are corrected by using the calculated correction coefficient and the corrected projection images are projected as shown in FIGS. 19(d) and is 19(e). As a result, the stain 191 at the projection surface 30 onto which the projection images are projected is rendered less noticeable.

Figure 20:
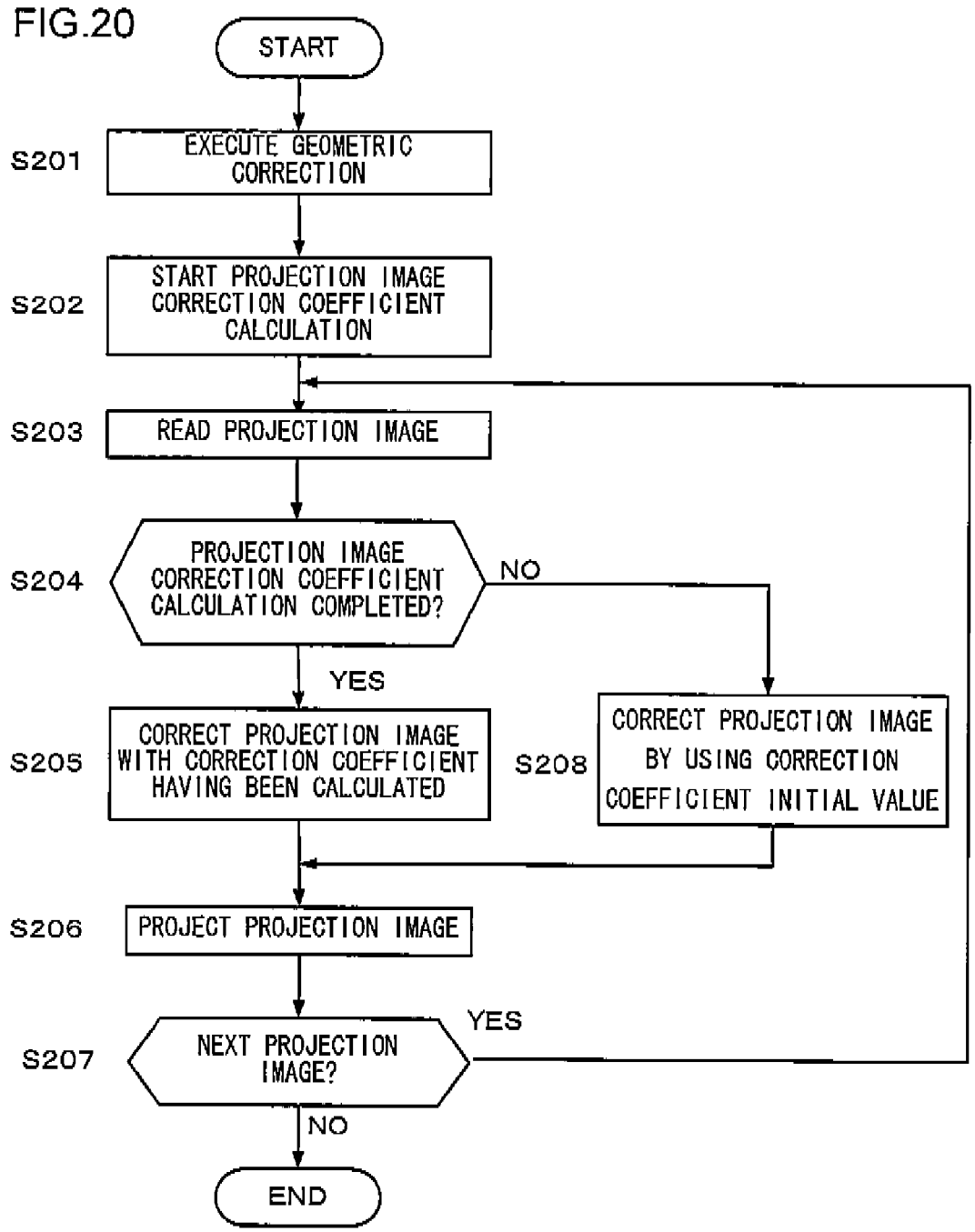

In reference to the flowchart presented in FIG. 20, the image processing executed in the embodiment of the present invention is described. The processing in FIG. 20 is executed by the control circuit 101 based upon a program started up as projection start processing begins.

Instead S201, a geometric correction coefficient to be used in geometric correction of projection images is calculated. The geometric correction is executed in order to correct flaring, distortion or the like that is bound to occur in projection images when the optical axis of the optical system in the projection unit 110 fails to extend perpendicular to the projection surface, as well as distortion that is bound to occur in projection images when the optical axis of the optical system in the projection unit 110 and the optical axis of the optical system in the photographic unit 120 are not in alignment.

Since the geometric correction coefficient can be calculated through a method known in the related art, an explanation is not provided.

At this point, the image processing unit 101A in the control circuit 101 executes interpolation processing so as to adjust the number of pixels constituting the projection image to match the resolution of the projector 1. The image processing unit 101A also executes interpolation processing so as to adjust the number of pixels of a photographic image captured via the photographic unit 120 to match the resolution of the projector 1. The photographic image having undergone the interpolation processing is used when correcting the projection image having undergone the interpolation processing mentioned earlier and the image thus corrected is projected. The interpolation processing is executed in order to improve the processing speed by clearly defining the correspondence between the pixels constituting the projection image and the pixels constituting the photographic image.

In step S202, calculation of the projection image correction coefficient starts. The correction coefficient calculated in this step is used to correct the input image so as to provide a projection image replicating the input image with fidelity, unaffected by the conditions at the projection surface, the ambient illumination conditions or the like. The projection image correction coefficient is calculated by capturing via the photographic unit 120 a projection image projected by the projection unit 110 and analyzing the photographed image. The correction coefficient thus calculated represents the extent to which the projection image is to be corrected. The correction coefficient calculation processing is executed concurrently while the projection image projection processing is in progress. For these purposes, a multi-core type CPU (central processing unit), assuring robust parallel processing, may be installed in the control circuit 101 so as to assure fast parallel processing. A specific method that may be adopted when calculating the projection image correction coefficient is to be described in detail later.

In step S203, the image data expressing a projection image are read either via the external interface circuit 104 or from the memory card 150 and the image data thus read our story into the memory 102.

In step S204, a decision is made as to whether or not the projection image correction coefficient calculation has been completed. An affirmative decision is made in step S204 if the projection image correction coefficient calculation has been completed and the operation proceeds to step S205. However, if the projection image correction coefficient has not been calculated, a negative decision is made in step S204 and the operation proceeds to step S208.

In step S205, the projection image having been read in step S203 is corrected by using the correction coefficient having been calculated. The projection image correction is to be described in detail later.

In step S206, the corrected projection image is converted to analog data and the corrected projection image is projected.

In step S207, a decision is made as to whether or not there is another projection image to be projected. If there is another image to be projected, an affirmative decision is made in step S206 and the operation returns to step S203. If there is no projection image to be projected, a negative decision is made in step S207 and the processing ends.

In step S208, the projection image is corrected by using the correction coefficient initial value and then the operation proceeds to step S206. The projection image correction executed in this step is to be described in detail later.

Next, the projection image correction coefficient calculation method and the projection image correction method adopted in the embodiment are described in further detail.

—Projection Image Correction Coefficient Calculation Method—

First, the projection characteristics of the projection unit 110 are determined through calculation. The projection characteristics indicate the relationship between pixel values (R, G, B) indicated in the input image and colorimetric values (X, Y, Z) of the image reproduced at the projection surface, which is bound to be affected by factors such as uneven illumination conditions at the projection unit 110, any color or pattern at the projection surface and ambient illumination conditions. The projection characteristics are calculated by capturing via the photographic unit 120 a photographic image of a specific projection image projected from the projection unit 110 and detecting colorimetric values in the photographic image.

For instance, when a projection image generated based upon input image data assuming a pixel value $(R, G, B)_i$ at an ith pixel thereof is projected via the projection unit 110, the colorimetric value $(X, Y, Z)_i$ assumed on the projection surface in correspondence to the pixel value at the ith pixel is expressed as in (17) below.

(Expression 17)

$$\begin{bmatrix} X \\ Y \\ Z \end{bmatrix}_i = R_i^* \cdot \left[ M_{pi} \cdot \begin{bmatrix} R^\gamma \\ G^\gamma \\ B^\gamma \end{bmatrix}_i + \begin{bmatrix} X_{kp} \\ Y_{kp} \\ Z_{kp} \end{bmatrix}_i \right] \quad (17)$$

$$= M_i \cdot \begin{bmatrix} R^\gamma \\ G^\gamma \\ B^\gamma \end{bmatrix}_i + \begin{bmatrix} X_k \\ Y_k \\ Z_k \end{bmatrix}_i$$

Note that the expression above adopts substitutions expressed in (18) and (19) below.

(Expression 18)

$$M_i = R_i^* \cdot M_{pi} \quad (18)$$

(Expression 19)

$$\begin{bmatrix} X_k \\ Y_k \\ Z_k \end{bmatrix}_i = R_i^* \cdot \begin{bmatrix} X_{kp} \\ Y_{kp} \\ Z_{kp} \end{bmatrix}_i \quad (19)$$

$\gamma$ represents the gradation characteristics of the projection unit 110. $M_{pi}$ represents the color conversion matrix used when converting a pixel value $(R^\gamma, G^\gamma, B^\gamma)_i$ corresponding to the projection unit 110 to a colorimetric value representing the illumination provided via the projection unit 110. $(X_{kp}, Y_{kp}, Z_{kp})_i$ represents the illumination conditions at the projection surface including the ambient illumination, under which a black image is projected via the projection unit 110. $R^*_i$ represents the reflectance characteristics manifesting at the projection surface.

The subscript i is used for the following purposes. The projector 1 in the embodiment corrects uneven conditions within the surface attributable to uneven illumination conditions at the projection unit 110, ambient illumination and a black spot, in addition to uneven conditions pertaining to the reflectance at the projection surface attributable to a pattern or the like at the projection surface (these uneven conditions are hereafter collectively referred to as "non-uniformity"), based upon an image of the projection surface captured by projecting an image with known pixel values, such as a white image or a black image. Accordingly, the subscript i is used to indicate the projection characteristics that may vary from one pixel area to another at the projection surface.

$(X_k, Y_k, Z_k)_i$ in expression (17) is determined based upon the projection surface photographic image obtained by projecting a black image $((R, G, B)_i=(0, 0, 0)_i)$. It is to be noted that the colorimetric value assumed in the projection image projected on the projection surface can be calculated through a predetermined type of color conversion processing executed by using the pixel value indicated in the photographic image. Assuming that the photographic image is profiled with sRGB data, $(X_k, Y_k, Z_k)_i$ can be determined by executing standard sRGB conversion processing on the pixel value.

Likewise, 3×3 matrix coefficients in the color conversion matrix $M_i$, are determined based upon photographic images obtained by capturing images of the projection surface onto which an R image $((R, G, B)_i=(255, 0, 0)_i)$, a G image $((R, G, B)_i=(0, 255, 0)_i)$, and a B image $((R, G, B)_i=(0, 0, 255)_i)$ are individually projected. In more specific terms, with $(X_r, Y_r, X_r)_i$, $(X_g, Y_g, Z_g)_i$ and $(X_b, Y_b, Z_b)_i$ respectively indicating the colorimetric values in the projection surface photographic images obtained by projecting the R image, a G image and the B image, the color conversion matrix $M_i$ may be expressed as in (20) below.

(Expression 20)

$$M_i = \begin{bmatrix} X_r - X_k & X_g - X_k & X_b - X_k \\ Y_r - Y_k & Y_g - Y_k & Y_b - Y_k \\ Z_r - Z_k & Z_g - Z_k & Z_b - Z_k \end{bmatrix}_i \quad (20)$$

Next, the projection image correction coefficient calculation is described.

A photographic image obtained by capturing an image of a projection surface manifesting a non-uniformity or a projection surface with a pattern present thereupon will assume pixel values reflecting the non-uniformity or the pattern instead of uniform pixel values. In other words, the color gamut allowing the maximum level display changes from one pixel to another. In this embodiment, the range of the color gamut over which the maximum level display is enabled is first determined. The brightness $Y_i$ at the projection surface may be calculated as expressed in (21) based upon expression (17).

(Expression 21)

$$Y_i = (Y_r - Y_k) \cdot R_i^\gamma + (Y_g - Y_k) \cdot G_i^\gamma + (Y_b - Y_k) \cdot B_i^\gamma + Y_k \quad (21)$$

The range of brightness over which the image can be displayed is determined in correspondence to the range that may be assumed for $Y_i$ when $0 \le R_i \le 255$, $0 \le G_i \le 255$ and $0 \le B_i \le 255$ in expression (21). Since $Y_r > Y_k$, $Y_g > Y_k$ and $Y_b > Y_k$ under normal circumstances, the range of brightness at which the data at a given pixel can be displayed can be defined by the display brightness assumed when a white image $((R, G, B)_i=(255, 255, 255)_i)$ is projected, which is designated as a display-enabling maximum brightness $Y_{MAX, i}$, and the display brightness assumed when a black image is projected, which is designated as a display enabling minimum brightness $Y_{MIN, i}$.

—Projection Image Correction in Step S205—

The projection image correction executed in step S205 is described.

Assuming that the projection source image (input image) is expressed in the sRGB color space, the colorimetric value (X, Y, Z)$_i$ assumed at the projection surface in correspondence to a pixel value $(R_0, G_0, B_0)_i$ in the projection image may be calculated as expressed in (22) below.

(Expression 22)

$$\begin{bmatrix} X \\ Y \\ Z \end{bmatrix}_i = (Y_{MAX} - Y_{k0}) \cdot M_{sRGB \to XYZ} \cdot \begin{bmatrix} R_0^{2.2} \\ G_0^{2.2} \\ B_0^{2.2} \end{bmatrix}_i + \begin{bmatrix} X_{k0} \\ Y_{k0} \\ Z_{k0} \end{bmatrix} \quad (22)$$

A pixel achieving the maximum brightness $Y_{MIN}$=MAX $(Y_{MIN, i})$ among all the pixels when a black image is projected is designated as a black spot on the projection image plane and the pixel value at the black spot is notated as the black spot $(X_{k0}, Y_{k0}, Z_{k0})$ on the projection image plane. It is to be noted that $M_{sRGB \to XYZ}$ represents the conversion matrix used to convert the data in the sRGB color space to data in the XYZ color space.

Accordingly, expression (17) may be used to calculate a corrected pixel value $(R, G, B)_i$ that is to be input to the projection unit 110 as expressed in (23) below.

(Expression 23)

$$\begin{bmatrix} R^\gamma \\ G^\gamma \\ B^\gamma \end{bmatrix}_i = (M_i)^{-1} \cdot \left[ (Y_{MAX} - Y_{k0}) \cdot M_{sRGB \to XYZ} \cdot \begin{bmatrix} R_0^{2.2} \\ G_0^{2.2} \\ B_0^{2.2} \end{bmatrix}_i + \begin{bmatrix} X_{k0} \\ Y_{k0} \\ Z_{k0} \end{bmatrix} - \begin{bmatrix} X_k \\ Y_k \\ Z_k \end{bmatrix}_i \right] \quad (23)$$

Expression (23) is written by assuming that γ=2.2 in the sRGB space for purposes of simplification. However, the pixel value may be calculated by combining a linear function and a γ set to 2.4, as defined in the specifications.

—Projection Image Correction in Step S208—

The projection image correction executed in step S208 is described.

The gradation characteristics γ of the projection unit 110, the color conversion matrix $M_p$ used to convert RGB data at the projection unit 110 to colorimetric values XYZ and the black spot pixel value $(X_k, Y_k, Z_k)$ assumed for the projection unit 110 under ideal projection conditions (the projection surface is a white surface with uniform reflectance characteristics $R_i$, the illumination conditions at the projector are perfectly even and an image is projected in a dark room), calculated in advance as expressed in (24) through (27) below based upon expression (17), are stored in the control circuit 101 and these values stored in the control circuit are used as initial values.

(Expression 24)

$$\begin{bmatrix} R^\gamma \\ G^\gamma \\ B^\gamma \end{bmatrix}_i = (M_i)^{-1} \cdot \left[ (Y_{MAX} - Y_{k0}) \cdot M_{sRGB \to XYZ} \cdot \begin{bmatrix} R_0^\gamma \\ G_0^\gamma \\ B_0^\gamma \end{bmatrix}_i + \begin{bmatrix} X_{k0} \\ Y_{k0} \\ Z_{k0} \end{bmatrix} - \begin{bmatrix} X_k \\ Y_k \\ Z_k \end{bmatrix}_i \right] \quad (24)$$

-continued (Expression 25)
$$M_i = M_p \tag{25}$$

(Expression 26)
$$Y_{MAX} - Y_{k0} = 1 \tag{26}$$

(Expression 27)
$$\begin{bmatrix} X_{k0} \\ Y_{k0} \\ Z_{k0} \end{bmatrix} - \begin{bmatrix} X_k \\ Y_k \\ Z_k \end{bmatrix}_i = \begin{bmatrix} X_k \\ Y_k \\ Z_k \end{bmatrix} \tag{27}$$

The following advantage is achieved through the embodiment described above.

Projection images are corrected by using the correction coefficient initial value until the projection image correction coefficient is calculated and once the projection image correction coefficient has been calculated, subsequent projection images are corrected by using the calculated correction coefficient. Since this allows the projection operation to start before the correction coefficient is calculated, the projection operation can be started with minimum delay.

—Tenth Embodiment—

In the 10th embodiment, the correction coefficient assuming an initial value is initially used to correct projection images, is switched to the calculated correction coefficient in steps, instead of switching the initial value to the calculated correction coefficient directly. Through these measures, it is ensured that the quality of the projection image does not change abruptly, and thus, projection images can be displayed without disconcerting the viewer.

Figure 21:
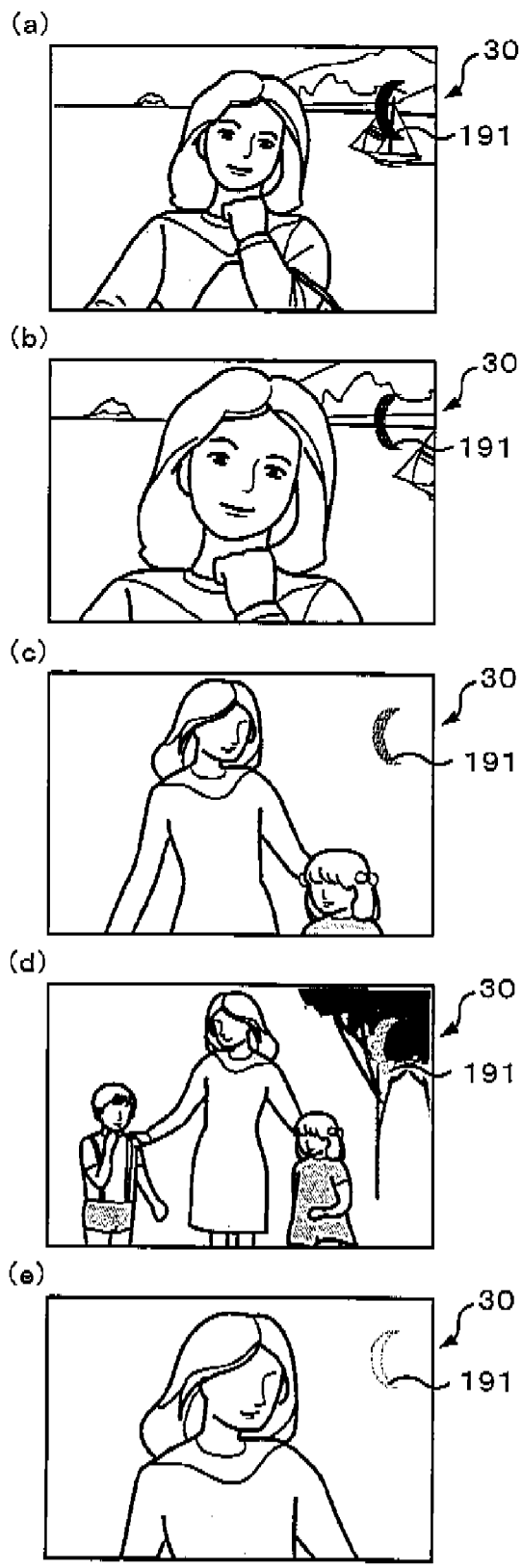

In reference to FIG. 21, the image processing executed for projection images when switching the correction coefficient gradually is described. FIGS. 21(a) through 21(e) show projection images that are viewed as they are sequentially projected onto a projection surface 30. The description is given by assuming that a stain 191 is present at the projection surface 30. In addition, the following description is provided by assuming that the correction coefficient to be used for projection image correction has already been calculated.

n values, calculated by sequentially incrementing, starting with the correction coefficient initial value, the correction coefficient by a value matching 1/(n+1) of the difference between the correction coefficient initial value and the calculated correction coefficient, are designated as correction coefficient interpolation values. The n interpolation values are individually referred to as an interpolation value 1, an interpolation value 2, . . . an interpolation value n, among which the interpolation value 1 is the closest to the initial value, the interpolation value 2 is the second closest to the initial value and so forth. At each projection image switch-over, the correction coefficient used for projection image correction is adjusted to the value at the next stage, e.g., from the initial value to the interpolation value 1, from the interpolation value 1 to the interpolation value 2, . . . or from the interpolation value n to the calculated correction coefficient.

If three interpolation values have been calculated, the correction coefficient used for projection image correction is switched, as described below. A projection image, corrected by using the initial value, is first projected as shown in FIG. 21(a). Then, a projection image, corrected by using the interpolation value 1, and the next projection image, corrected by using the interpolation value 2, are projected respectively, as shown in FIG. 21(b) and FIG. 21(c). Subsequently, a projection image corrected by using the interpolation value 3 is projected as shown in FIG. 21(d) and then a projection image corrected by using the calculated correction coefficient is projected. Any subsequent projection image to be projected is corrected by using the calculated correction coefficient and is projected.

As shown in FIGS. 21(a) through 21(e), the stain 191 on the projection surface becomes gradually less noticeable each time the projection images are switched, and thus, the projection images can be viewed with no unsightly distraction.

Figure 22:
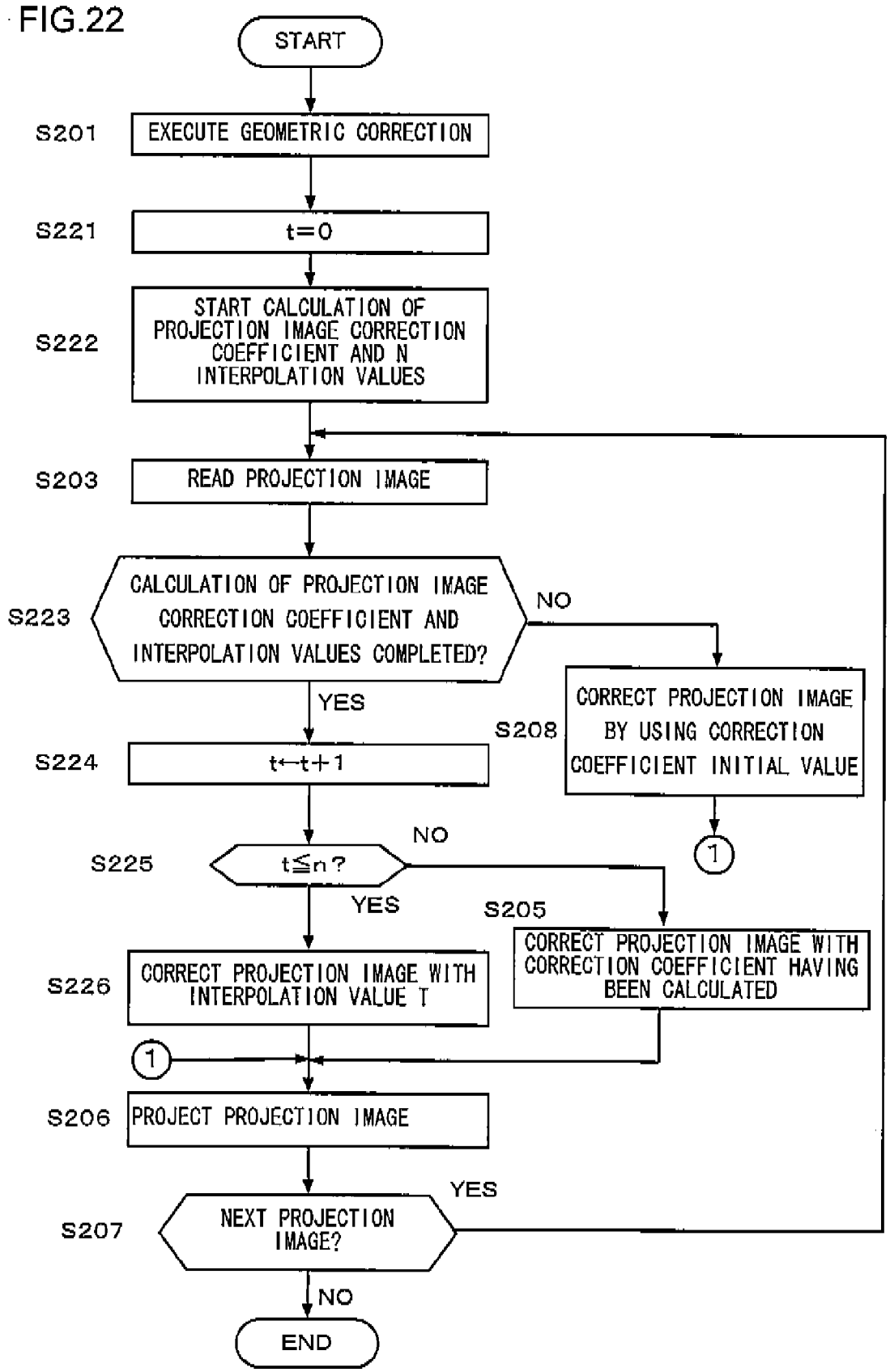

In reference to the flowchart presented in FIG. 22, the image processing executed on projection images to switch the correction coefficient gradually is described. The processing in FIG. 22 is executed by the control circuit 101 based upon a program started up as projection start processing begins. The same step numbers are assigned to steps in which processing identical to the processing in FIG. 20 is executed and the following explanation focuses on processing different from that in FIG. 20.

After executing the processing in step S201, the operation proceeds to step S221. In step S221, the value at a flag t that specifies the interpolation value to be used for projection image correction is set to 0. Assuming that n interpolation values have been calculated, an interpolation value 1 is the closest to the initial value, an interpolation value 2 is the second closest to the initial value, . . . and an interpolation value n is the value furthest removed from the initial value among all the interpolation values. If the flag t indicates a value s, an interpolation value s is used for projection image correction. In step S222, calculation of the projection image correction coefficient and the n interpolation values starts. The interpolation values are calculated by first dividing the value representing the difference between the initial value and the calculated correction coefficient into (n+1) equal parts. Assuming that the initial value is p and the calculated correction coefficient is q, an interpolation value Hs is calculated as expressed in (28) below.

(Expression 28)
$$Hs = p + \left(\frac{q-p}{n+1}\right) \times s \tag{28}$$

The interpolation values are used for the nine parameters of $M_i$, (e.g., the value for $X_r$-$X_k$) in expression (29), in expression (30) and expression (31), all in relation to expression (23) based upon which projection images are corrected. The operation then proceeds to step S203.

(Expression 29)
$$M_i = \begin{bmatrix} X_r - X_k & X_g - X_k & X_b - X_k \\ Y_r - Y_k & Y_g - Y_k & Y_b - Y_k \\ Z_r - Z_k & Z_g - Z_k & Z_b - Z_k \end{bmatrix}_i \tag{29}$$

(Expression 30)
$$Y_{MAX} - Y_{k0} \tag{30}$$

(Expression 31)
$$\begin{bmatrix} X_{k0} \\ Y_{k0} \\ Z_{k0} \end{bmatrix} - \begin{bmatrix} X_k \\ Y_k \\ Z_k \end{bmatrix}_i \tag{31}$$

Upon completing the processing in step S203, the operation proceeds to step S223. In step S223, a decision is made as to whether or not the calculation of the projection image correction coefficient and the interpolation values has been completed. An affirmative decision is made in step S223 if the calculation of the projection image correction coefficient and the interpolation values has been completed and in this case, the operation proceeds to step S224. However, if the calculation of the projection image correction coefficient and the interpolation values has not been completed, a negative decision is made in step S223 and the operation proceeds to step S208. In step S224, the value at the flag t is adjusted to a value t+1.

In step S225, a decision is made as to whether or not the value at the flag t is equal to or smaller than n. If the value at the flag t is equal to or smaller than n, an affirmative decision is made in step S225 and the operation proceeds to step S226. However, if the value at the flag t is greater than n, a negative decision is made in step S225 and the operation proceeds to step S205. In step S226, the projection image is corrected by using the interpolation value t. The operation then proceeds to step S206.

The embodiment described above allows for the following variations.

(1) In order to calculate the correction coefficient, photographing processing for capturing photographic images of the projection surface onto which specific projection images (a white image, a black image, an R image, a G image and a B image) are projected is executed. This processing may be executed during a projection image switch-over period. Such an alternative will allow image projection to start before the processing is completed and thus, the length of time to elapse before starting the projection operation can be further reduced.

For instance, processing for capturing photographic images of the projection surface onto which the specific projection images are projected may be executed as described below. As shown in FIG. 23, a photographic image of the projection surface onto which a white image is projected, as shown in FIG. 23(a), is captured before projecting a projection image, as shown in FIG. 23(b). Next, during the period of time elapsing while switching from the projection image in FIG. 23(b) to the projection image in FIG. 23(d), a photographic image of the projection surface onto which a black image is projected, as shown in FIG. 23(c) is captured. Then, during the period of time elapsing while switching from the projection image in FIG. 23(d) to the projection image in FIG. 23(f), a photographic image of the projection surface onto which an R image is projected, as shown in FIG. 23(e) is captured. Subsequently, during the period of time elapsing while switching from the projection image in FIG. 23(f) to the projection image in FIG. 23(h), a photographic image of the projection surface onto which a G image is projected, as shown in FIG. 23(g) is captured. Finally, during the period of time elapsing while switching from the projection image in FIG. 23(h) to the projection image in FIG. 23(j), a photographic image of the projection surface onto which a B image is projected, as shown in FIG. 23(i) is captured. Through the sequence described above, the photographing processing for capturing photographic images of the projection surface onto which the specific projection images (a white image, a black image, an R image, a G image and a B image) are projected, is completed while image projection operation is underway.

(2) Photographic images of certain walls which are often used as projection surfaces may be captured in advance with a wide-angle camera, the projection characteristics based upon which the correction coefficient is calculated may be determined through calculation in advance and the image data expressing the photographic images of the walls and the corresponding projection characteristics may be stored in a specific memory as wall data. In this variation, a photographic image of a specific wall onto which images are to be projected is captured and the photographic image is compared with the wall data to determine whether or not there is a match among the wall data. If the wall data include data of a wall matching the particular wall, the exact location of the projection surface on the wall may be judged through image matching and the projection characteristics having been calculated for the area of the wall corresponding to the projection surface may be used for correction coefficient calculation. These measures eliminate the need for starting the correction coefficient calculation from scratch, thereby enabling prompt calculation of the correction coefficient, which, in turn, makes it possible to correct projection images with the calculated correction coefficient and project the corrected projection images quickly.

Figure 24:
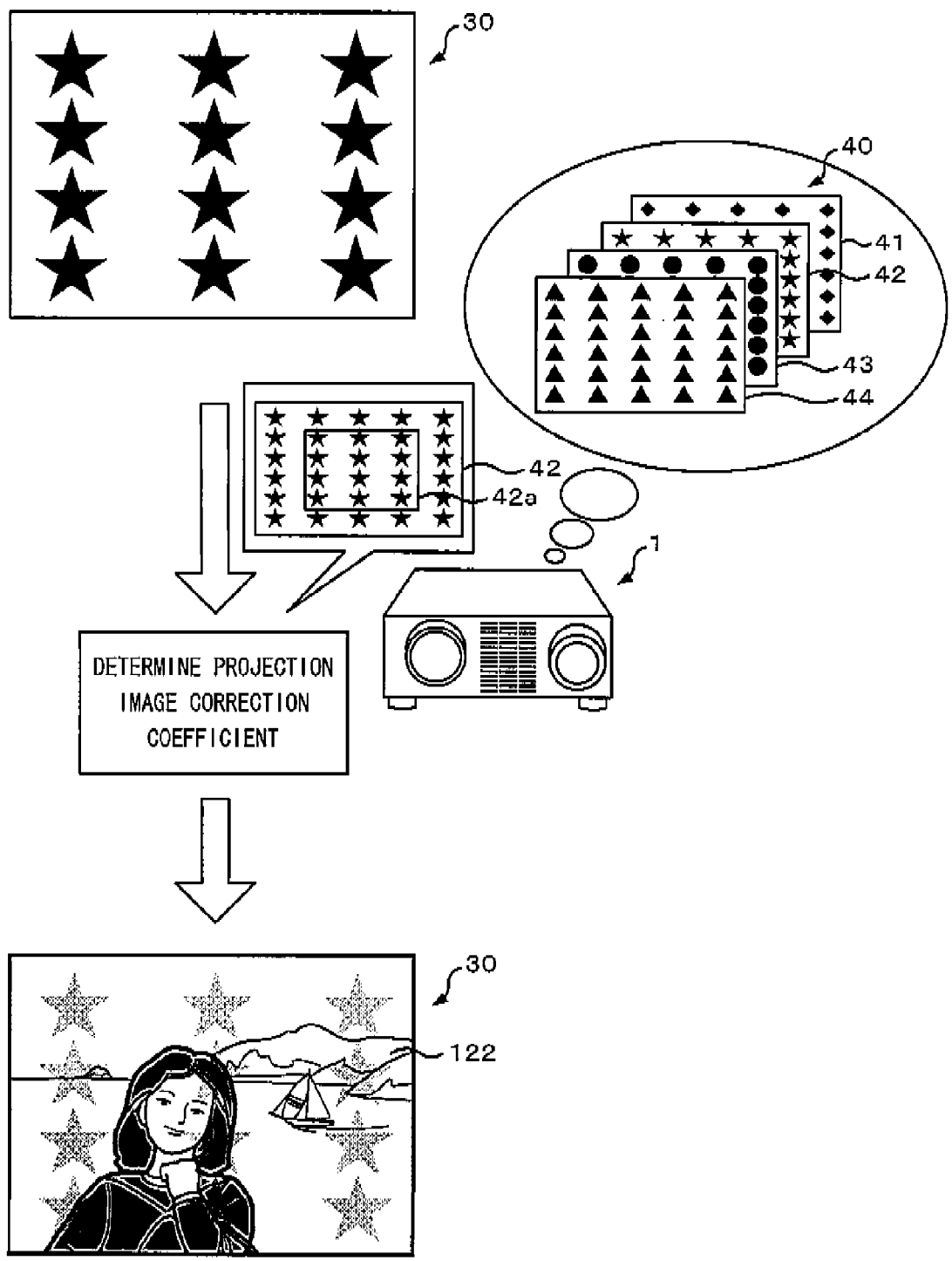

For instance, a star pattern present at the projection surface 30 may be compared with wall data 40, as shown in FIG. 24. Among the sets of wall data 40 expressing walls 41 through 44, the set of wall data for the wall 42 expresses a pattern matching the pattern at the projection surface, and accordingly, the data for the wall 42 are extracted. In addition, an area 42a of the wall 42 is determined to correspond to the projection surface 30 through image matching. The projection characteristics over an area equivalent to the area 42a at the wall 42 are then extracted from the wall data 40 and the extracted projection characteristics are used in the correction coefficient calculation. A projection image 32 corrected by using the correction coefficient thus calculated can then be projected onto the projection surface 30 with the stars in the pattern at the wall rendered less noticeable.

As a further alternative, photographic images of certain walls which are often used as projection surfaces may be captured in advance, the corresponding correction coefficients may be determined through calculation in advance and the image data expressing the photographic images of the walls and the correction coefficients may be stored in a specific memory as wall data. In this variation, a photographic image of a specific wall onto which images are to be projected is captured and the photographic image is compared with the wall data to determine whether or not there is a match among the wall data. If the wall data include a set of data indicating a match, projection images may be projected by using the correction coefficient stored in correspondence to the particular wall. These measures eliminate the need for starting the correction coefficient calculation from scratch, thereby enabling prompt calculation of the correction coefficient, which, in turn, makes it possible to correct projection images with the correction coefficient having been calculated in advance and project the corrected projection images quickly.

(3) When capturing a photographic image of the projection surface in order to calculate the correction coefficient, the photographic image of the projection surface may be captured by emitting flash light from a flash unit that provides flash light for the camera. Since the color temperature of the flash light emitted from the flash unit can be ascertained in advance, the color temperature of the illuminating light can be estimated by comparing the photographic image captured with flash light with a photographic image of the projection surface captured under the illuminating light. Through these measures, the correction coefficient can be calculated by factoring in the influence of the illuminating light. In addition, the conditions at a wall such as a pattern, the reflectance and black spots at a dark location can be ascertained.

For instance, when images are to be projected onto a white wall under yellow illuminating light, it would not be easy to ascertain whether the wall itself is yellow or it looks yellow due to the illuminating light. Under these circumstances, a correction coefficient calculated by erroneously assuming that the wall itself is yellow, may indicate an excessively large yellow-to-white correction quantity, beyond the correction limit. However, by capturing a photographic image of the wall with flash light provided via a flash unit, the color of the wall can be correctly recognized to be white. Thus, by calculating the correction coefficient based upon a photographic image of the projection surface captured with flash light provided from a flash unit, overcorrection can be effectively prevented.

(4) It is desirable that a photographic image of the projection surface onto which a specific projection image is projected, to be captured for purposes of correction coefficient calculation under stable illumination conditions without any destabilizing element such as unnecessary light. However, in reality it may be difficult to capture a photographic image of the projection surface with a predetermined projection image projected thereupon under perfectly stable illumination conditions.

In such a case, the correction coefficient may be calculated a plurality of times and the median or the average of the correction coefficient values thus calculated may be designated as the correction coefficient, so as to minimize the extent to which the correction coefficient is affected by any external disturbance. In addition, when calculating the medium or the average of the correction coefficient values, any abnormal value that deviates greatly from the other values may be excluded. Through such measures, an optimal correction coefficient can be calculated even if the projection surface being photographed for purposes of correction coefficient calculation is lit with nonstandard light such as laser light from a pointer.

(5) A specific rejection image may be projected onto the projection surface with predetermined timing, e.g., at a projection image switch-over, a photographic image of the projection surface with the specific projection image projected thereupon may be captured and a new correction coefficient may be calculated if any change is observed in the photographic image, since the projection operation may not always be executed under steady illumination conditions that remain unchanged throughout the projection operation.

—Eleventh Embodiment—

Figure 25:
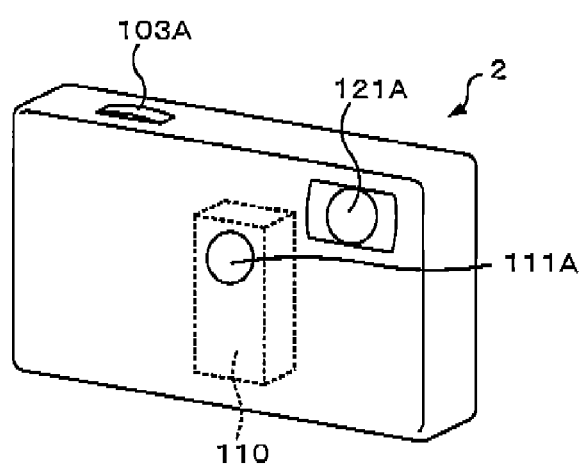

The following is a description of the 11th embodiment of the present invention, given in reference to drawings. FIG. 25 shows a projection-capable camera 2 achieved in the 11th embodiment of the present invention viewed from the front side. FIG. 25 shows a photographic lens 121A constituting an imaging optical system 121 (see FIG. 2) and a projection lens 111A constituting a projection optical system 111 (see FIG. 2), both disposed on the front side of the projection-capable camera 2. The projection-capable camera 2, placed on a desktop or the like or in a handheld state, projects projection information such as an image from a built-in projection unit 110 toward a screen or the like present in front thereof. At the upper surface of the projection-capable camera 2, a shutter release switch 103A is disposed. The projection optical system 111 in the projection unit 110 is disposed with a vertical orientation in the camera projector 2.

Figure 26:
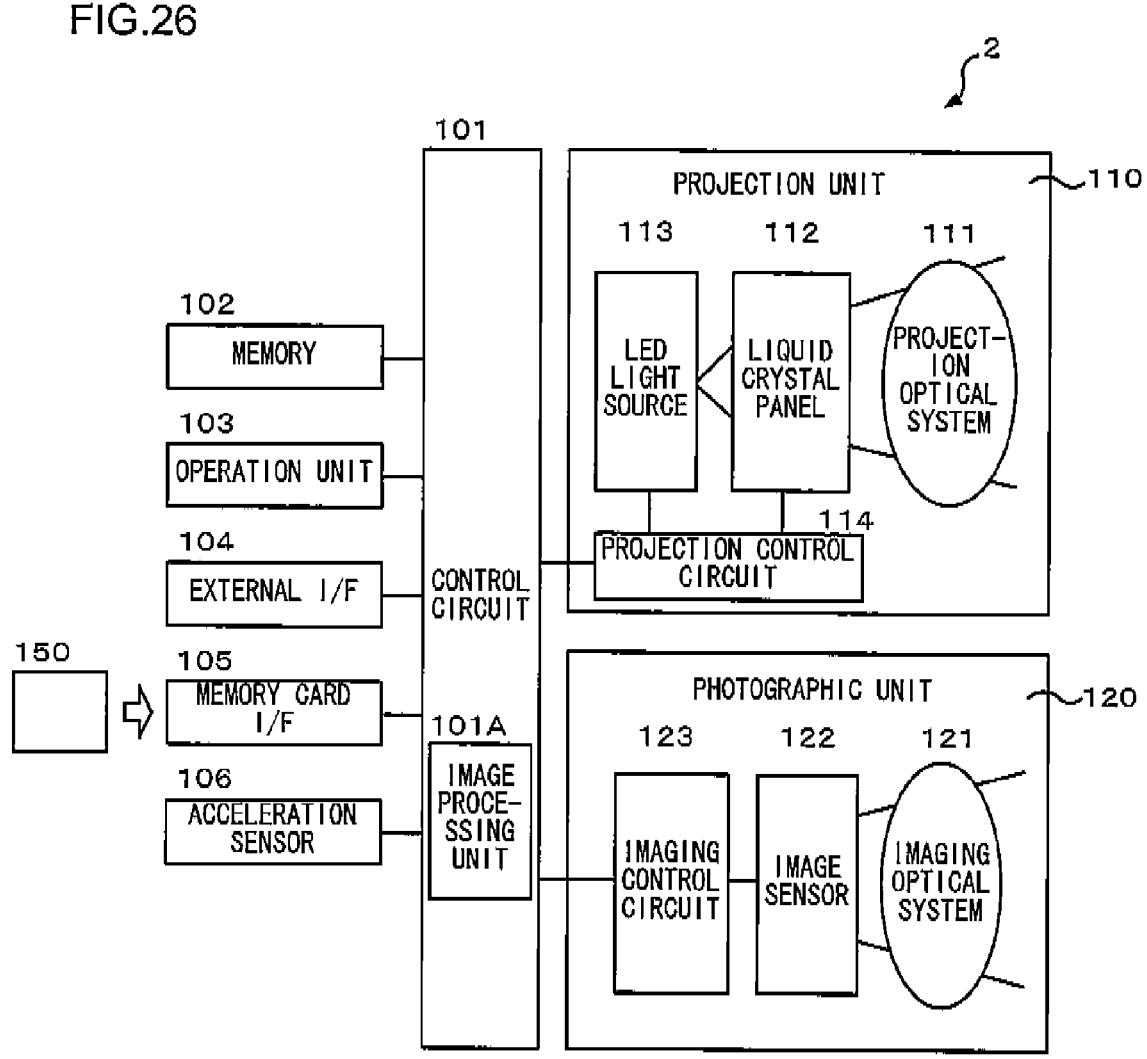

FIG. 26 is a block diagram showing an example of the structure that may be adopted in the projection-capable camera 2. The projection-capable camera 2 in FIG. 26 includes the projection unit 110, a photographic unit 120, a control circuit 101, a memory 102, an operation unit 103, an external interface (I/F) circuit 104, a memory card interface (I/F) 105 and an acceleration sensor 106. A memory card 150 is connected to the memory card interface 105.

The control circuit 101 is constituted with a microprocessor and its peripheral circuits. Based upon a control program, the control circuit 101 executes specific arithmetic operations by using signals input thereto from various internal units in the projection-capable camera 2. The control circuit 101 outputs the arithmetic operation results as control signals to the individual units within the projection-capable camera so as to control a projection operation and an imaging operation executed at the projection-capable camera 2. The control program is stored in a ROM (not shown) within the control circuit 101.

The control circuit 101 includes an image processing unit 101A. The image processing unit 101A executes image processing on image data obtained via the external interface 104 or image data obtained from the memory card 150. The image processing executed at the image processing unit 101A is to be described in detail later.

The memory 102 is used as a work memory by the control circuit 101. The operation unit 103, which includes the shutter release switch 103A, outputs to the control circuit 101 an operation signal corresponding to a specific button or switch having been operated. Data can be written into, saved in and read out from the memory card 150 in response to instructions issued by the control circuit 101.

The projection unit 110 includes the projection optical system 111, a liquid crystal panel 112, an LED light source 113 and a projection control circuit 114. The LED light source 113 illuminates the liquid crystal panel 112 with luminance the level of which corresponds to a supplied current. At the liquid crystal panel 112, an optical image is generated in response to a drive signal provided from the projection control circuit 114. The projection optical system 111 projects the optical image output from the liquid crystal panel 112. In response to an instruction issued by the control circuit 101, the projection control circuit 114 outputs control signals to the LED light source 113 and the liquid crystal panel 112.

The projection unit 110, assuming a structure that allows it to project an image expressed with image data provided from an external device via the external interface circuit 104, as well as an image expressed with image data saved in the memory card 150, projects an image specified by the control circuit 101.

The photographic unit 120, which includes the imaging optical system 121, an image sensor 122 and an imaging control circuit 123, captures an image of the projection surface in response to an instruction issued by the control circuit 101. The imaging optical system 122 forms a subject image on an imaging surface of the image sensor 122. The image sensor 122 may be a CCD image sensor or a CMOS image sensor. The imaging control circuit 123 controls the drive of the image sensor 122 in response to an instruction issued by the control circuit 101 and also executes specific signal processing on the image output from the image sensor 122. Image data resulting from the signal processing are recorded into the memory card 150 as an image file in a predetermined format.

The acceleration sensor 106 is capable of detecting the acceleration of the projection-capable camera 2. Via the acceleration sensor, any movement of the projection-capable camera 2 can be detected.

The image processing executed by the image processing unit 101A in the control circuit 101 is described. The image processing is executed in the embodiment of the present invention in order to correct the color of the projection image based upon a photographic image of the projection surface. The image processing unit 101A is also capable of executing correction in order to correct flaring, distortion or the like occurring in the projection image when the optical axis of the projection optical system 111 fails to extend perpendicular to the projection surface, as well as distortion that is bound to occur in the projection image when the optical axis of the projection optical system 111 and the optical axis of the imaging optical system 121 are not in alignment. Since the image processing executed in the embodiment of the present invention is characterized by the projection image color correction, the following explanation focuses on the color correction.

In reference to FIGS. 27 and 28, a projection image, which may be displayed for viewing by executing the image processing in the embodiment of the present invention on a projection image and projecting the projection image having undergone the image processing, is described. FIG. 27(*a*) illustrates a projection surface 30 onto which the projection image is projected. It is assumed that a round stain 271 is present on the projection surface 30. FIG. 27(*b*) shows a projection image 272 to be projected onto the projection surface 30.

FIG. 28(*a*) shows a projection image 273 displayed for viewing by executing the image processing in the embodiment of the present invention on the projection image 272 and projecting the projection image having undergone the image processing onto the projection surface 30. The projection image 273, in which the stain 271 does not stand out, assures a pleasing appearance. FIG. 28(*b*) shows a projection image 274 displayed for viewing as the projection image obtained by processing the projection image 272 is projected onto a projection surface 30 that has shifted. Since the position of the stain 271 has become offset in the projection surface 30, the stain 271 stands out over a portion 274*a* of the projection image 274 while another portion 274*b* of the projection image 274 is corrected for higher brightness even though the stain 271 is not present in the particular area 274*b*. If the projection surface becomes shifted as in this situation, a photographic image of the projection surface is captured again so as to recalculate the correction coefficient to be used for projection image correction in the 11th embodiment of the present invention. Then, the projection image 272 is corrected by using the recalculated correction coefficient so as to display a projection image 275 assuring a pleasing appearance in which the stain 271 does not stand out, as shown in FIG. 28(*c*).

Figure 29:
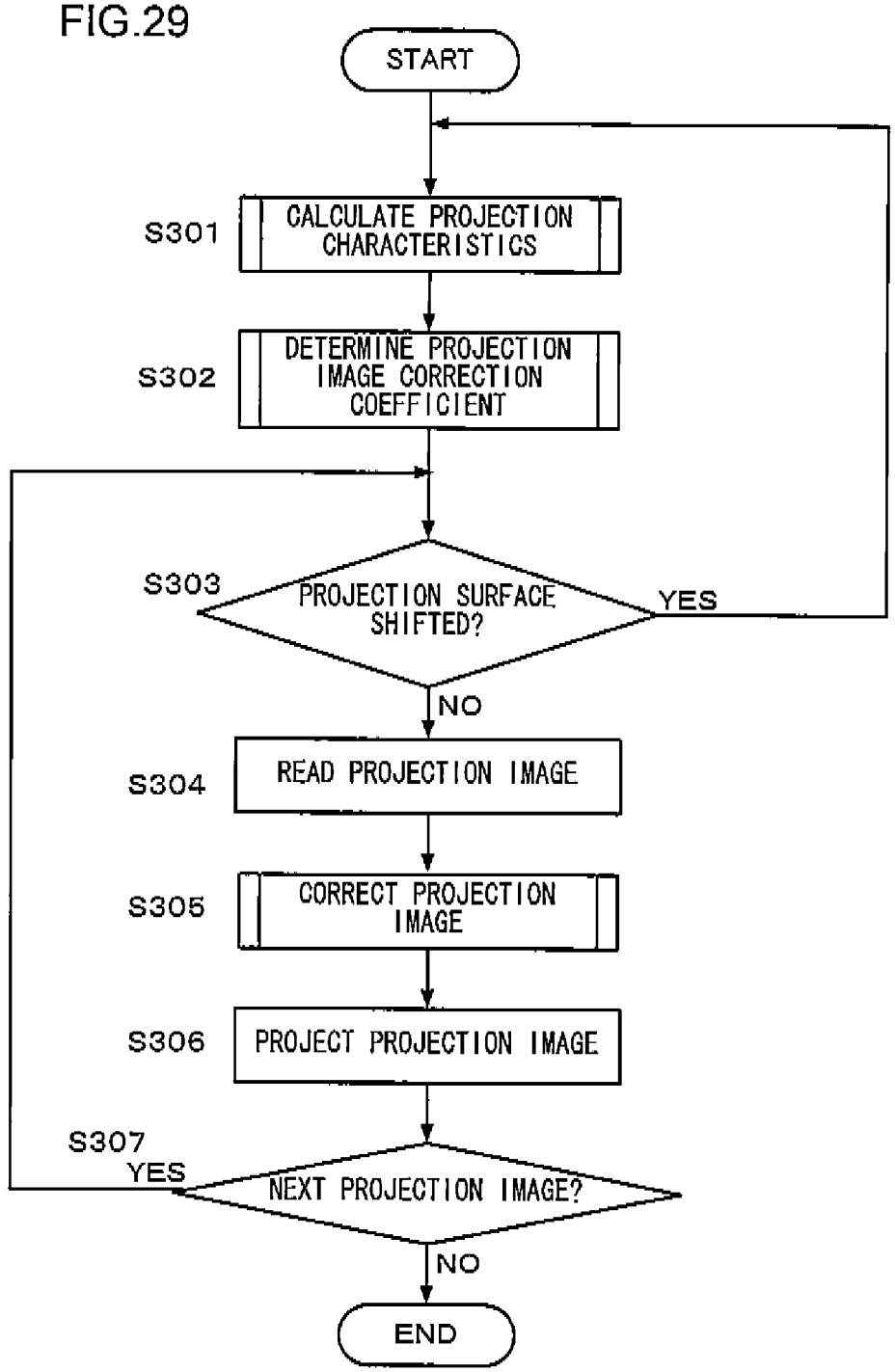

In reference to the flowchart presented in FIG. 29, the image processing executed in the 11th embodiment of the present invention is described. This image processing is executed to adjust the extent of correction to an optimal correction quantity so as to ensure that the dynamic range of the projection image does not become too narrow, as well as to render any pattern or stain present on the wall used as the projection surface less noticeable. The processing in FIG. 29 is executed by the control circuit 101 based upon a program started up as projection start processing begins.

The control circuit 101 executes interpolation processing so as to adjust the number of pixels constituting the projection image to match the resolution of the projection-capable camera 2. The control circuit 101 also executes interpolation processing so as to adjust the number of pixels constituting the photographic image captured by the photographic unit 120 with the resolution of the projection-capable camera 2. The photographic image having undergone the interpolation processing is used when correcting the projection source image having undergone the interpolation processing mentioned earlier and the image thus corrected is projected. The interpolation processing is executed in order to improve the processing speed by clearly defining the correspondence between the pixels constituting the projection image and the pixels constituting the photographic image.

In step S301, the projection characteristics of the projection unit 110 are determined through calculation. The projection characteristics determined in this step indicate the relationship between pixel values (R, G, B) indicated in the input image and colorimetric values (X, Y, Z) detected in the projection image reproduced on the projection surface. The colorimetric values are affected by uneven illumination provided by the projection unit 110, any color or pattern that may be present at the projection surface and the brightness at the projection surface attributable to ambient illumination. Accordingly, a specific projection image represented by known pixel values (R, G, B) is projected via the projection unit 110, a photographic image of the projection image projected onto the projection surface is captured with the photographic unit 120 and the projection characteristics are calculated by detecting the calorimetric values (X, Y, Z) from the photographed image. As detailed later, the specific projection image is a white image, a black image, an R image, a G image or a B image. By first correcting the input image with a projection image correction coefficient determined based upon the projection characteristics and then projecting the corrected image, a desirable projection image, replicating the appearance of the input image with fidelity, unaffected by uneven illumination provided from the projection unit 110, any color or pattern that may be present on the projection surface or the brightness at the projection surface attributable to ambient illumination can be viewed. Specific calculation processing that may be executed to determine the projection characteristics is to be described later.

In step S302, the projection image correction coefficient is determined. Namely, a correction coefficient to be applied to the input image is determined by using the projection characteristics having been determined in step S301, so as to obtain a projection image that faithfully reproduces the input image (projection image) unaffected by the conditions at the projection surface, the ambient illumination conditions and the like. The projection image correction coefficient is determined by photographing via the photographic unit 120 a projection image projected from the projection unit 110 and analyzing the photographic image thus obtained. The correction coefficient thus determined represents a correction quantity indicating the extent to which the projection image is to be corrected. The processing executed in this step is also to be described in detail later.

In step S303, a decision is made as to whether or not the projection surface has shifted. If the projection-capable camera 2 moves, the projection surface shifts. Accordingly, the decision as to whether or not the projection surface has shifted can be made by detecting any movement of the projection-capable camera 2. Any movement of the projection-capable camera 2 is detected via the acceleration sensor 106. Upon detecting movement of the projection-capable camera 2, the projection surface is determined to have shifted. If no movement of the projection-capable camera 2 is detected, it is decided that the projection surface has not shifted. An affirmative decision is made in step S303 if the projection surface has shifted and the operation proceeds to step S304. However, if the projection surface has not shifted, a negative decision is made in step S303 and the operation returns to step S301. Through this sequence, the projection image correction coefficient can be recalculated.

In step s304, the image data expressing the projection image are read either via the external interface circuit 104 or from the memory card 150. The image data thus read are stored into the memory 102. In step S305, the projection image data having been read in step S304 are corrected by using the correction coefficient having been determined in step S302. This processing is also to be described in detail later. In step S306, the projection image data having been corrected in step S304 are converted to analog data and the projection image is projected.

In step S307, a decision is made as to whether or not there are more projection image data for further image projection. If there are more projection image data for projection, an affirmative decision is made in step S307 and the operation returns to step S303. If there are no more projection image data, a negative decision is made in step S307 and the processing ends.

Next, the processing executed in steps S301, S302 and S305 is described in further detail.

—Projection Characteristics Calculation—

The calculation executed in step S301 to determine the projection characteristics is now described.

When a projection image generated based upon input image data assuming a pixel value $(R, G, B)_i$ at an ith pixel thereof is projected via the projection unit 110, the colorimetric value $(X, Y, Z)_i$ assumed on the projection surface in correspondence to the pixel value at the ith pixel is expressed as in (32) below.

(Expression 32)

$$\begin{bmatrix} X \\ Y \\ Z \end{bmatrix}_i = R_i^* \cdot \left( M_{pi} \cdot \begin{bmatrix} R^\gamma \\ G^\gamma \\ B^\gamma \end{bmatrix}_i + \begin{bmatrix} X_{kp} \\ Y_{kp} \\ Z_{kp} \end{bmatrix}_i \right) \quad (32)$$

$$= M_i \cdot \begin{bmatrix} R^\gamma \\ G^\gamma \\ B^\gamma \end{bmatrix}_i + \begin{bmatrix} X_k \\ Y_k \\ Z_k \end{bmatrix}_i$$

Note that the expression above adopts substitutions expressed in (33) and (34) below.

(Expression 33)

$$M_i = R_i^* \cdot M_{pi} \quad (33)$$

(Expression 34)

$$\begin{bmatrix} X_k \\ Y_k \\ Z_k \end{bmatrix}_i = R_i^* \cdot \begin{bmatrix} X_{kp} \\ Y_{kp} \\ Z_{kp} \end{bmatrix}_i \quad (34)$$

γ represents the gradation characteristics of the projection unit 110, $M_{pi}$ represents the color conversion matrix used when converting a pixel value $(R^\gamma, G^\gamma, B^\gamma)_i$ corresponding to the projection unit 110 to a colorimetric value representing the illumination provided via the projection unit 110. $(X_{kp}, Y_{kp}, Z_{kp})_i$ represents the illumination conditions at the projection surface including the ambient illumination, under which a black image is projected via the projection unit 110. $R_i^*$ represents the reflectance characteristics manifesting at the projection surface.

The subscript i is used for the following purposes. The projector in this embodiment corrects uneven conditions within the surface attributable to uneven illumination conditions at the projection unit 110, ambient illumination and a black spot, in addition to uneven conditions pertaining to the reflectance at the projection surface attributable to a pattern or the like at the projection surface (these uneven conditions are hereafter collectively referred to as "non-uniformity"), based upon an image of the projection surface captured by projecting an image with known pixel values, such as a white image or a black image. Accordingly, the subscript i is used to indicate the projection characteristics that may vary from one pixel area to another at the projection surface.

$(X_k, Y_k, Z_k)_i$ in expression (32) is determined based upon a projection surface photographic image obtained by projecting a black image $((R, G, B)_i=(0, 0, 0)_i$. It is to be noted that the colorimetric value assumed in the projection image projected on the projection surface can be calculated through a predetermined type of color conversion processing executed by using the pixel value indicated in the photographic image. Assuming that the photographic image is profiled with sRGB data, $(X_k, Y_k, Z_k)_i$ can be determined by executing standard sRGB conversion processing on the pixel value.

Likewise, 3×3 matrix coefficients in the color conversion matrix $M_i$, are determined based upon photographic images obtained by capturing images of the projection surface onto which an R image $((R, G, B)_i=(255, 0, 0)_i)$, a G image $((R, G, B)_i=(0, 255, 0)_i)$, and a B image $((R, G, B)_i=(0, 0, 255)_i)$ are individually projected. In more specific terms, with $(X_r, Y_r, Z_r)_i$, $(X_g, Y_g, Z_g)_i$ and $(X_b, Y_b, Z_b)_i$ respectively indicating the colorimetric values in the images obtained by projecting the R image, the G image and the B image onto the projection surface (hereafter referred to as projection surface photographic images), the color conversion matrix $M_i$ may be expressed as in (35) below.

(Expression 35)

$$M_i = \begin{bmatrix} X_r - X_k & X_g - X_k & X_b - X_k \\ Y_r - Y_k & Y_g - Y_k & Y_b - Y_k \\ Z_r - Z_k & Z_g - Z_k & Z_b - Z_k \end{bmatrix}_i \quad (35)$$

—Determining the Projection Image Correction Coefficient—

The processing executed in step S302 to determine the correction coefficient is now described.

A photographic image obtained by capturing an image of a projection surface manifesting a non-uniformity or a projection surface with a pattern present thereupon will assume pixel values reflecting the non-uniformity or the pattern instead of uniform pixel values, and for this reason, the color gamut allowing the maximum level display changes from one pixel to another. The range of the color gamut over which the maximum level display is enabled is first determined in the embodiment. The brightness $Y_i$ at the projection surface may be calculated as expressed in (36) based upon expression (32).

(Expression 36)

$$Y_i = (Y_r - Y_k) \cdot R_i^\gamma + (Y_g - Y_k) \cdot G_i^\gamma + (Y_b - Y_k) \cdot B_i^\gamma + Y_k \quad (36)$$

Accordingly, the range of brightness over which the image can be displayed is determined in correspondence to the range that may be assumed for $Y_i$ when $0 \leq R_i \leq 255$, $0 \leq G_i \leq 255$ and $0 \leq B_i \leq 255$ in expression (36). Since $Y_r > Y_k$, $Y_g > Y_k$ and $Y_b > Y_k$ under normal circumstances, the range of brightness at which the data at a given pixel can be displayed can be defined by the display brightness assumed when a white image $((R, G, B)_i = (255, 255, 255)_i)$ is projected, which is designated as a display-enabling maximum brightness $Y_{MAX, i}$, and the display brightness assumed when a black image is projected, which is designated as a display-enabling minimum brightness $Y_{MIN, i}$.

In order to reduce the extent to which the quality of the projection image is adversely affected by non-uniformity or a pattern at the projection surface, the projection image data must be corrected so that the maximum brightness $Y_{MAX}$ of the projection surface photographic image at the projection surface is adjusted to $MIN(Y_{MAX, i})$ and the minimum brightness $Y_{MIN}$ of the projection surface photographic image at the projection surface is adjusted to $MAX(Y_{MIN, i})$. Namely, the projection image data must be corrected so that the maximum brightness $Y_{MAX}$ assumed as the correction target projection image is projected matches the smallest brightness value $MIN(Y_{MAX, i})$ among the values indicated at the plurality of pixels constituting the photographic image obtained by projecting a white image. In addition, the projection image data must be corrected so that the minimum brightness $Y_{MIN}$ assumed as the correction target projection image is projected matches the largest brightness value $MAX(Y_{MIN, i})$ among the values indicated at the plurality of pixels constituting the photographic image obtained by projecting a black image.

However, if the data at all the pixels are corrected as described above in conjunction with a projection surface that includes, for instance, an extremely dark area, the dynamic range will become excessively narrow, which, in turn, will compromise the quality of the corrected projection image. Accordingly, the maximum brightness $Y_{MAX}$ is determined as expressed in (37) below by setting a brightness threshold value $Y_{th}$ and lessening the correction quantity representing the extent of correction for any pixel assuming a brightness value lower than the brightness threshold value $Y_{th}$ in the projected image.

(Expression 37)

$$Y_{MAX} = MAX(Y_{th}, MIN(Y_{MAX, i})) \quad (37)$$

When $Y_{th} > MIN(Y_{MAX, i})$ is true, the maximum brightness $Y_{MAX}$ is adjusted so as to assume the threshold value $Y_{th}$ instead of $MIN(Y_{MAX, i})$. Through these measures, the extent to which the pixel value at a pixel with lower brightness is corrected is lessened.

—Projection Image Correction—

The projection image correction executed in step S305 is now described.

Assuming that the projection image (input image) is expressed in the sRGB color space, the colorimetric value (X, Y, Z)$_i$ assumed at the projection surface in correspondence to a pixel value $(R_0, G_0, B_0)$ in the projection image may be calculated as expressed in (38) below.

(Expression 38)

$$\begin{bmatrix} X \\ Y \\ Z \end{bmatrix}_i = (Y_{MAX} - Y_{k0}) \cdot M_{sRGB \to XYZ} \cdot \begin{bmatrix} R_0^{2.2} \\ G_0^{2.2} \\ B_0^{2.2} \end{bmatrix}_i + \begin{bmatrix} X_{k0} \\ Y_{k0} \\ Z_{k0} \end{bmatrix} \quad (38)$$

A pixel achieving the maximum brightness, i.e., $Y_{MIN} = MAX(Y_{MIN, i})$, among all the pixels when a black image is projected is designated as a black spot on the projection image plane and the pixel value at the black spot is notated as the black spot $(X_{k0}, Y_{k0}, Z_{k0})$ on the projection image plane. It is to be noted that $M_{sRGB \to XYZ}$ represents the conversion matrix used to convert the data in the sRGB color space to data in the XYZ color space.

Accordingly, expression (32) may be used to calculate a corrected pixel value $(R, G, B)_i$ that is input to the projection unit 110 as expressed in (39) below.

(Expression 39)

$$\begin{bmatrix} R^\gamma \\ G^\gamma \\ B^\gamma \end{bmatrix}_i = (M_i)^{-1} \cdot \begin{bmatrix} (Y_{MAX} - Y_{k0}) \cdot M_{sRGB \to XYZ} \cdot \\ \begin{bmatrix} R_0^{2.2} \\ G_0^{2.2} \\ B_0^{2.2} \end{bmatrix}_i + \begin{bmatrix} X_{k0} \\ Y_{k0} \\ Z_{k0} \end{bmatrix} - \begin{bmatrix} X_k \\ Y_k \\ Z_k \end{bmatrix}_i \end{bmatrix} \quad (39)$$

Expression (39) is written by assuming that $\gamma=2.2$ in the sRGB space for purposes of simplification. However, the pixel value may be calculated by combining a linear function and a $\gamma$ set to 2.4, as defined in the specifications.

The following advantages are achieved through the 11th embodiment described above.

(1) Upon detecting that the projection surface 30 has shifted, the projection image correction coefficient is recalculated. Thus, even if the projection-capable camera 2 is inadvertently moved during the projection operation, projection images can be corrected in an optimal manner.

(2) Since any shift of the projection surface 30 is detected via a sensor, such as the acceleration sensor 106, which detects displacement of the projection-capable camera 2, the shift of the projection surface 30 can be detected with a high degree of reliability.

—Twelfth Embodiment—

The calculation of the projection image correction coefficient executed in the 11th embodiment may take a considerable length of time. In such a case, a significant length of time would elapse before the projection operation could be resumed upon recalculating the projection image correction coefficient. Accordingly, a specific projection image (a white image, a black image, an R image, a G image or a B image) is projected and a photographic image of the projection surface with the projection image projected thereupon is captured during a projection image switch-over in the 12th embodiment. This allows the projection operation to resume without keeping the user waiting over an extended period of time.

Figure 30:
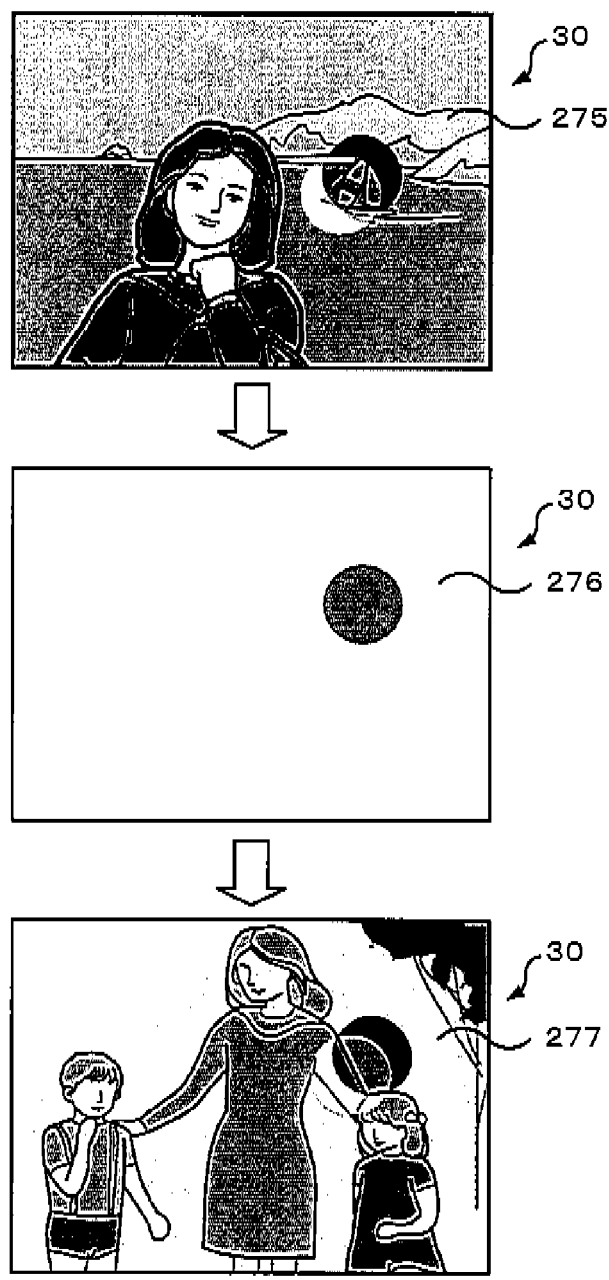

As illustrated in FIG. 30, a photographic image of the projection surface 30 with a white image 276 projected thereupon is captured during a switch-over period elapsing while a projection image 275 projected on the projection surface 30 is switched to a projection image 277. Subsequently, during each projection image switch-over period, a photographic image of the projection surface 30 with a black image, an R image, a G image or a B image projected thereupon is captured. Then, once the new projection image correction coefficient has been calculated, projection images corrected by using the new projection image correction coefficient are projected.

—Thirteenth Embodiment—

In the 11th embodiment, any shift of the projection surface is detected by sensing movement of the projection-capable camera 2. In the 13th embodiment, a shift of the projection surface is detected through comparison of a photographic image of the projection surface with a projection image projected thereupon and an estimated photographic image that is predicted to be obtained by projecting a corrected projection image onto the projection surface and capturing a photographic image of the corrected projection image thus projected. This feature enables detection of a projection surface shift without having to use a sensor such as the acceleration sensor 106.

Figure 31:
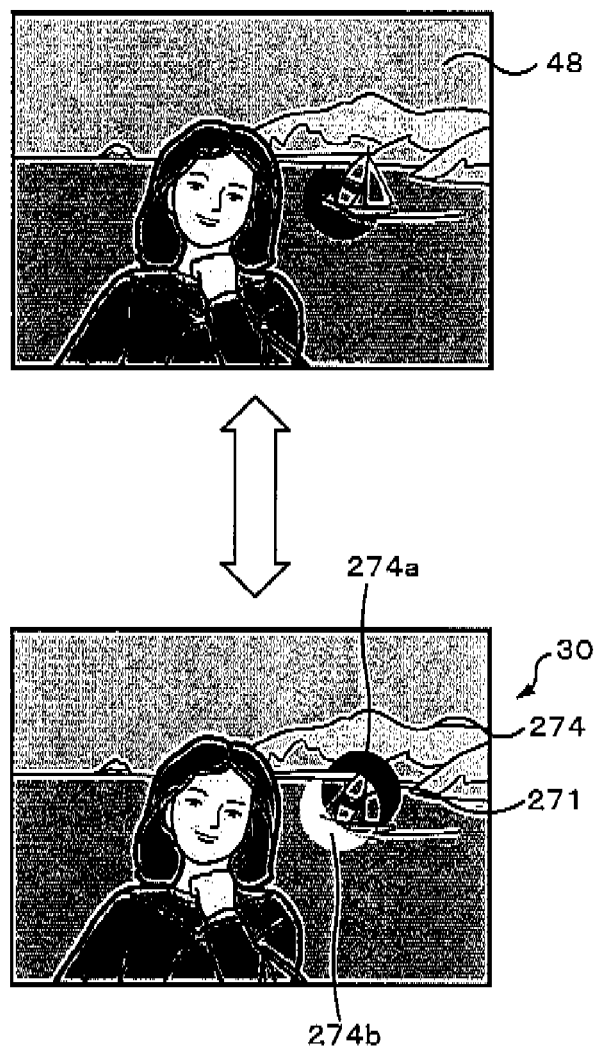

The photographic image and the estimated photographic image are compared with each other as described below. The brightness distribution in an estimated photographic image 48 and the brightness distribution in a photographic image 274 are compared, as illustrated in FIG. 31. Through the comparison, the photographic image 274 is revealed to include a low-brightness area 274a and a high brightness area 274b, which are not present in the estimated photographic image 48. If such areas manifesting a brightness anomaly are detected, the projection surface 30 can be judged to have shifted. In other words, a shift of the projection surface 30 is detected by detecting any high brightness or low-brightness area through the comparison of the photographic image 274 and the estimated photographic image 48, as described above.

The estimated photographic image may be obtained by, for instance, aligning a corrected photographic image over a photographic image of the projection surface captured by projecting a white image or the like thereupon.

The 13th embodiment allows for the following variations. (1) If the pattern at the projection surface is judged to be too prominent to be rendered completely inconspicuous through projection image correction, an image obtained by adjusting the brightness in the projection image in correspondence to a brightness change manifesting in a photographic image of the projection surface with a white image projected thereupon, instead of the estimated photographic image, may be compared with the photographic image for projection surface shift detection, since such an image with the brightness in the projection image altered in correspondence to the brightness change manifesting within the photographic image of the projection surface with a white image projected thereupon, can be obtained through calculation with greater ease than the estimated photographic image.

(2) If the pattern at the projection surface is judged to be inconspicuous enough to allow it to be rendered completely unnoticeable through projection image correction, the initial projection image, which has not been corrected, instead of the estimated photographic image, may be compared with the photographic image, since there will be hardly any difference between the estimated photographic image and the uncorrected original projection image.

(3) As long as the difference between the photographic image and the estimated photographic image can be ascertained, the two images may be compared through a method other than that described above, by, for instance, calculating the difference between or the ratio of each pair of corresponding pixels. Namely, values each representing the difference between the brightness Y value at a given pixel in the photographic image and the brightness Y value at the corresponding pixel in the estimated photographic image may be calculated and the projection surface 30 may be judged to have shifted if the largest value among the calculated values exceeds a predetermined value (e.g., 10% of the maximum brightness Y value). As an alternative, if the average value of the differences between the pairs of corresponding pixels exceeds a predetermined value, the projection surface 30 may be judged to have shifted. Furthermore, RGB pixel values, instead of brightness Y values, may be used for purposes of the comparison. Moreover, the photographic image and the estimated photographic image may be compared with each other over a specific area of the projection surface, centered around a position taken up by a unique pattern motif.

—Fourteenth Embodiment—

In the 13th embodiment, any shift of the projection surface is detected through comparison of the photographic image and the estimated photographic image. In the 14th embodiment, the direction and the extent of a shift of the projection surface are also detected by comparing the photographic image with the estimated photographic image.

The direction and the extent of a shift of the projection surface are detected as described below. First, photographic images of an area 50 (hereafter referred to as a wide-range area), assuming a greater areal range than the projection surface 30 onto which projection images are to be projected, are captured with specific projection images (a white image, a black image, an R image, a G image and a B image) projected thereupon, when determining the projection characteristics and the projection image correction coefficient. The projection characteristics and the projection image correction coefficient are determined by using image portions corresponding to the projection surface 30 within the photographic images of the wide-range area 50.

Next, a low-brightness area 274a and a high brightness area 274b are extracted as shown in FIG. 33(a) by comparing the photographic image 274 and the estimated photographic image 48 as shown in FIG. 31. A low-brightness area 271 is extracted from the photographic image of the projection surface 30 with a white image projected thereupon, as shown in FIG. 33(b).

The level of brightness in the portion of the photographic image 274, over which the dark area 271, having been present before the projection surface 30 shifted, is no longer present after the shift of the projection surface 30, is higher than the brightness over the corresponding portion of the estimated photographic image. However, the level of brightness of the photographic image 274 at the portion which the dark area 271, having been present elsewhere prior to the shift of the projection surface 30, takes up after the shift of the projection surface 30 is lower than the brightness at the corresponding portion in the estimated photographic image. Based upon these relationships pertaining to the brightness and the shape of the low-brightness area 271, the displacement (indicated by an arrow 61) of the dark area 271 over the projection surface attributable to the shift of the projection surface can be detected.

In correspondence to the detected displacement, the image area within the wide-range area 50 to be used for purposes of determining the projection characteristics and the projection image correction coefficient is shifted from the area corresponding to the projection surface 30 to the area corresponding to a projection surface 30A (along the direction indicated by an arrow 51) as shown in FIG. 32(b). The projection characteristics and the projection image correction coefficient are determined by using the images corresponding to the projection surface 30A within the photographic images of the wide-range area 50 and projection images are corrected based upon the projection image correction coefficient thus determined.

Since these measures eliminate the need for capturing photographic images of the projection surface with projection images (a white image, a black image, an R image, a G image and a B image) projected thereupon again, the projection image correction coefficient can be recalculated quickly.

—Fifteenth Embodiment—

Whenever a shift of the projection surface is detected, it is safe to assume that the projection operation is being executed while the projection-capable camera 2 is held by hand. In such a situation, the projection surface may shift yet again and thus, projection images should not be corrected based upon photographic images of the projection surface. Based upon this reasoning, projection image correction is no longer executed once a shift of the projection surface is detected in the 15th embodiment.

In reference to the flowchart presented in FIG. 34, image processing whereby the projection image correction is suspended once a shift of the projection surface is detected, is described. The processing in FIG. 34 is executed by the control circuit 101 based upon a program started up as projection start processing begins at the projection-capable camera 2. The same step numbers are assigned to steps in which image processing identical to that in FIG. 29 is executed and the following explanation focuses on processing different from the image processing shown in FIG. 29.

In step S311, the value at a flag f, based upon which a decision as to whether or not the projection surface has shifted is made, is set to 0. When the flag f indicates a value of 0, the projection surface is determined to have stayed in place without shifting, whereas when the value set at the flag f is 1, the projection surface is determined to have shifted. The operation then proceeds to step S301.

Upon making a negative decision in step S303, the operation proceeds to step S312. In step S312, the flag f is set to 1. The operation then proceeds to step S313. The operation also proceeds to step S313 after executing the processing in step S304.

In step S313, a decision is made as to whether or not the value currently set for the flag f is 0. If the flag f is currently set to 0, an affirmative decision is made in step S313 and the operation proceeds to step S305. However, if the flag f is set to 1, a negative decision is made in step S313 and the operation proceeds to step S306. In the latter case, the projection image is not corrected. It is to be noted that the projection image correction may be suspended only if movement of the projection-capable camera 2 is detected continuously. In other words, the projection image correction may be suspended only after verifying with a high level of reliability that the projection operation is being executed while the projection-capable camera 2 is held by hand.

It is to be noted that the 11th through 15th embodiments may be adopted in dedicated projectors instead of the projection-capable camera 2.

It is to be noted that the embodiments described above simply represent examples and the present invention is in no way limited to these examples as long as the functions characterizing the present invention remain intact.

The disclosures of the following priority applications are herein incorporated by reference:
Japanese Patent Application No. 2008-4219 filed Jan. 11, 2008
Japanese Patent Application No. 2008-4218 filed Jan. 11, 2008
Japanese Patent Application No. 2008-4220 filed Jan. 11, 2008
Japanese Patent Application No. 2008-4221 filed Jan. 11, 2008

The invention claimed is:

1. A projector, comprising:
a projection unit that projects a projection image;
a detection unit that detects a condition at a projection surface by using a photographic image of the projection surface upon which a specific projection image is projected via the projection unit;
a decision-making unit that makes a decision based upon the condition at the projection surface as to whether or not the projection surface is suitable for projection; and
a decision-making result reporting unit that reports results of the decision made by the decision-making unit to a user,
wherein:
based upon a reflectance threshold value $R_i$ (i=1, 2, ... N) assuming a plurality of predetermined values and a pixel ratio threshold value $C_i$ (i=1, 2, ... N) assuming a plurality of predetermined values, the decision-making unit extracts pixels indicating brightness values smaller than a product obtained by multiplying a largest brightness value in the photographic image by the reflectance threshold value $R_i$ among pixels constituting the photographic image, and determines that the projection surface is suitable for projection if a ratio of the extracted pixels to the pixels constituting the photographic image is less than the pixel ratio threshold value $C_i$ for all values taken for i, (i=1, 2, ... N); and
a reflectance threshold value $R_j$ assumed when i=j (j=1, 2, ... N −1) is smaller than a reflectance threshold value $R_{j+1}$ assumed when i=j +1 and a pixel ratio threshold value $C_j$ assumed when i=j (j=1, 2, ... N −1) is smaller than a pixel ratio threshold value $C_{j+1}$ assumed when i=j +1.

2. A projector, comprising:
a projection unit that projects a projection image;
a detection unit that detects a condition at a projection surface by using a photographic image of the projection surface upon which a specific projection image is projected via the projection unit;
a decision-making unit that makes a decision based upon the condition at the projection surface as to whether or not the projection surface is suitable for projection; and
a decision-making result reporting unit that reports results of the decision made by the decision-making unit to a user,
wherein:
the decision-making unit extracts a plurality of successive pixels indicating brightness values smaller than a product obtained by multiplying a largest brightness value in the photographic image by a predetermined minimum reflectance, among pixels constituting the photographic image, and determines that the projection surface is suitable for projection if a ratio of the extracted pixels to the pixels constituting the photographic image is less than a predetermined ratio.

3. A projector, comprising:
a projection unit that projects a projection image;
a detection unit that detects a condition at a projection surface by using a photographic image of the projection surface upon which a specific projection image is projected via the projection unit;
a decision-making unit that makes a decision based upon the condition at the projection surface as to whether or not the projection surface is suitable for projection; and
a decision-making result reporting unit that reports results of the decision made by the decision-making unit to a user,
wherein:
the decision-making unit determines that the projection surface is suitable for projection if a condition whereby a ratio of pixels that indicate brightness values smaller than a product obtained by multiplying a largest brightness value in the photographic image by a predetermined minimum reflectance, extracted from pixels constituting the photographic image, to the pixels constituting the photographic image is less than a predetermined ratio exists for all photographic images obtained by photographing the projection surface onto which pixel primary color images inherent to the projector are individually projected color by color.

4. A projector, comprising:
a correction unit that corrects a projection image based upon a photographic image obtained by photographing a projection surface onto which a specific projection image is projected;
a projection unit that projects the projection image having been corrected by the correction unit;
a detection unit that detects, based upon the photographic image, a low-brightness area or a high chroma area at the projection surface;
a control unit that controls a size of the projection image projected onto the projection surface so as to ensure that the projection image is not superimposed over the low-brightness area or the high chroma area at the projection surface having been detected; and
a reporting unit that reports to a user the low-brightness area or the high chroma area at the projection surface having been detected if the projection image projected onto the projection surface is superimposed over the low-brightness area or the high chroma area at the projection surface having been detected even after the control unit reduces the size of the projection image to a size smaller than a predetermined size.

5. A projector according to claim 4, further comprising:
an input unit via which the user enters information indicating that the low-brightness area or the high chroma area has been eliminated from the projection surface, wherein:
if the information indicating that the low-brightness area or the high chroma area has been eliminated from the projection surface is entered via the input unit, the correction unit corrects the projection image by using a photographic image obtained by photographing the projection surface from which the low-brightness area or the high chroma area has been removed.

6. A projector, comprising:
a correction unit that corrects a projection image based upon a photographic image obtained by photographing a projection surface onto which a specific projection image is projected;
a projection unit that projects the projection image having been corrected by the correction unit;
a detection unit that detects, based upon the photographic image, a low-brightness area or a high chroma area at the projection surface;
a reporting unit that reports to a user the low-brightness area or the high chroma area at the projection surface having been detected; and
an input unit via which the user enters information indicating that the low-brightness area or the high chroma area has been eliminated from the projection surface, wherein:
if the information indicating that the low-brightness area or the high chroma area has been eliminated from the projection surface is entered via the input unit, the correction unit corrects the projection image by using a photographic image obtained by photographing the projection surface from which the low-brightness area or the high chroma area has been removed.

7. A projector, comprising:
a correction unit that corrects a projection image based upon a photographic image obtained by photographing a projection surface onto which a specific projection image is projected;
a projection unit that projects the projection image having been corrected by the correction unit;
a detection unit that detects, based upon the photographic image, a low-brightness area or a high chroma area at the projection surface;
a control unit that controls a projection position and a size of the projection image projected onto the projection surface so as to ensure that the projection image is not superimposed over the low-brightness area or the high chroma area at the projection surface having been detected; and
a reporting unit that reports to a user the low-brightness area or the high chroma area at the projection surface having been detected if the projection image projected onto the projection surface is superimposed over the low-brightness area or the high chroma area at the projection surface having been detected even after the control unit reduces the size of the projection image to a size smaller than a predetermined size.

8. A projector, comprising:
a projection unit that projects a projection image;
a detection unit that detects a condition at a projection surface by using a photographic image of the projection surface upon which a specific projection image is projected via the projection unit;
a decision-making unit that makes a decision based upon the condition at the projection surface as to whether or not the projection surface is suitable for projection; and
a decision-making result reporting unit that reports results of the decision made by the decision-making unit to a user, wherein:
the decision-making unit extracts pixels indicating brightness values smaller than a predetermined value, among pixels constituting the photographic image, and determines that the projection surface is suitable for projection if a ratio of the extracted pixels to the pixels constituting the photographic image is less than a predetermined ratio.

9. A projector according to claim 8, wherein:
the predetermined value represents a product obtained by multiplying a largest brightness value in the photographic image by a predetermined coefficient.

10. A projector according to claim 9, wherein:
the predetermined coefficient represents a minimum reflectance at the projection surface.

* * * * *